(12) United States Patent
Galindo et al.

(10) Patent No.: US 12,354,283 B2
(45) Date of Patent: Jul. 8, 2025

(54) SYSTEMS AND METHODS FOR DYNAMIC OBJECT TRACKING USING A MESH NETWORK OF NODES COUPLED TO CAMERAS

(71) Applicant: Iris Automation, Inc., Reno, NV (US)

(72) Inventors: Patricio Alejandro Galindo, Palo Alto, CA (US); James Howard, Reno, NV (US); Jason Hardy-Smith, San Francisco, CA (US)

(73) Assignee: Iris Automation, Inc.

( * ) Notice: Subject to any disclaimer, the term of this patent is extended or adjusted under 35 U.S.C. 154(b) by 0 days.

(21) Appl. No.: 18/436,865

(22) Filed: Feb. 8, 2024

(65) Prior Publication Data
US 2024/0265553 A1   Aug. 8, 2024

Related U.S. Application Data

(63) Continuation of application No. PCT/US2022/039734, filed on Aug. 8, 2022.
(Continued)

(51) Int. Cl.
*G06T 7/246* (2017.01)
*G06T 7/62* (2017.01)
(Continued)

(52) U.S. Cl.
CPC .............. *G06T 7/246* (2017.01); *G06T 7/62* (2017.01); *G06V 10/764* (2022.01); *G06V 10/774* (2022.01); *G06T 2207/10016* (2013.01); *G06T 2207/20081* (2013.01); *G06T 2207/30241* (2013.01)

(58) Field of Classification Search
None
See application file for complete search history.

(56) References Cited

U.S. PATENT DOCUMENTS 10,373,322 B1 *  8/2019  Buibas .................... G06T 7/246
11,625,838 B1 *  4/2023  Narapureddy ....... G06V 10/454
                                                            382/103
(Continued)

OTHER PUBLICATIONS

International Search Report and Written Opinion for PCT Appl. No. PCT/CN2022/039734, mailed on Jan. 23, 2023.
(Continued)

*Primary Examiner* — Vikkram Bali
(74) *Attorney, Agent, or Firm* — Foley & Lardner LLP

(57) ABSTRACT

Methods and systems for detecting dynamic objects using a mesh network of nodes coupled to cameras are disclosed. The system can receive sequences of frames captured by a first capture device having a first pose and a second capture device having a second pose, and track objects over time across the first sequence of frames and the second sequence of frames. The system can map the objects to three-dimensional (3D) positions in a 3D coordinate space based on correspondences between the indications of the objects. The system can determine a 3D displacement of a subset of the 3D points, and generate a 3D volume surrounding the subset. The system can use the 3D volume to classify and predict a trajectory for the dynamic object, as well as determine a risk the dynamic object poses to a protected volume in the 3D coordinate space.

20 Claims, 22 Drawing Sheets

Related U.S. Application Data

(60) Provisional application No. 63/231,019, filed on Aug. 9, 2021.

(51) Int. Cl.
*G06V 10/764* (2022.01)
*G06V 10/774* (2022.01)

(56) References Cited

U.S. PATENT DOCUMENTS

2019/0004543 A1\* 1/2019 Kennedy ............... B64D 47/08
2021/0158561 A1\* 5/2021 Park ......................... G06T 7/74

OTHER PUBLICATIONS

Price et al., "Deep Neural Network-Based Cooperative Visual Tracking Through Multiple Micro Aerial Vehicles", IEEE Robotics and Automation Letters, Oct. 18, vol. 3, No. 4, pp. 3193-3200.
You et al., "Real-time 3D Deep Multi-Camera Tracking", arxiv, Mar. 26, 2020, Microsoft Cloud & AI, One Microsoft Way, Redmond, WA.

\* cited by examiner

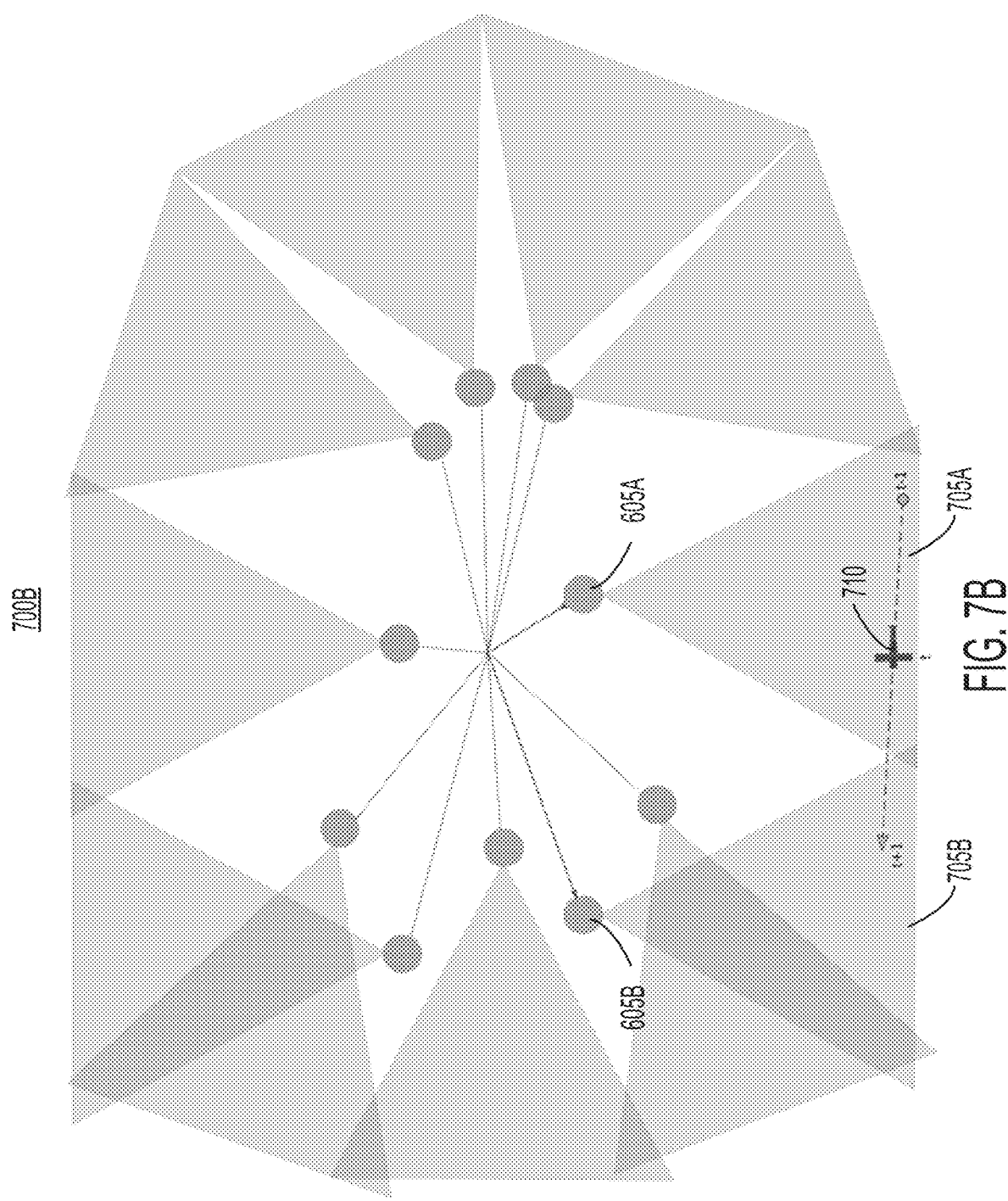

SYSTEMS AND METHODS FOR DYNAMIC OBJECT TRACKING USING A MESH NETWORK OF NODES COUPLED TO CAMERAS

CROSS-REFERENCE TO RELATED APPLICATIONS

The present application is a continuation of International Application No. PCT/US2022/039734, filed Aug. 8, 2022, which claims the benefit of and priority to U.S. Provisional Application No. 63/231,019, filed Aug. 9, 2021, the disclosure of which is incorporated herein by reference in its entirety.

BACKGROUND

Ground-based camera systems can be used to track objects in their field of view. In many cases, objects can be tracked over time to determine characteristics about the objects, such as speed or direction. However, it is challenging to detect and track the motion of dynamic objects in large, three-dimensional (3D) regions of space.

SUMMARY

The systems and methods of this technical solution solve these and other issues by providing a mesh network of nodes coupled to cameras that can be used to analyze image data over a large area. Each camera can include or be in communication with a computing device that performs image analysis techniques to track objects in real-time or near real-time. In some implementations, the computing devices can process images from two or more cameras positioned at predetermined poses relative to one another. Data produced using the image analysis techniques can be exchanged between the computing devices in the mesh network to detect, track, and classify dynamic objects over large volumes of 3D space. In some implementations, maneuvering commands for local aircraft or other flying vehicles can be generated based on the properties of dynamic objects detected in the 3D space. Additional dynamic object tracking techniques using the mesh network of nodes coupled to cameras are described in greater detail herein.

At least one aspect of the present disclosure relates to a method for detecting dynamic objects using a mesh network of nodes coupled to cameras. The method can be performed, for example, by one or more processors coupled to memory. The method may include receiving a first sequence of frames captured by a first capture device having a first pose and a second sequence of frames captured by a second capture device having a second pose. The method may include tracking a first indication of an object across the first sequence of frames over time, and a second indication of the object across the second sequence of frames over time. The method may include mapping the first indication and the second indication to a 3D position in a 3D coordinate space based on at least one corresponding characteristic between the first indication and the second indication. The method may include determining a 3D displacement of the 3D position based on the first sequence of frames and the second sequence of frames. The method may include generating, based on the 3D displacement satisfying a displacement threshold, a 3D volume surrounding the 3D position based on a first frame in the first sequence of frames and a corresponding second frame in the second sequence of frames.

At least one aspect of the present disclosure relates to a system for detecting dynamic objects using a mesh network of nodes coupled to cameras. The system can include one or more processors configured to receive a first sequence of frames captured by a first capture device having a first pose and a second sequence of frames captured by a second capture device having a second pose; track a first indication of an object across the first sequence of frames over time, and a second indication of the object across the second sequence of frames over time; map the first indication and the second indication to a 3D position in a 3D coordinate space based on at least one corresponding characteristic between the first indication and the second indication; determine a 3D displacement of the 3D position based on the first sequence of frames and the second sequence of frames; and generate, based on the 3D displacement satisfying a displacement threshold, a 3D volume surrounding the 3D position based on a first frame in the first sequence of frames and a corresponding second frame in the second sequence of frames.

At least one aspect of the present disclosure relates to a method for detecting dynamic objects using a mesh network of nodes coupled to cameras. The method can be performed, for example, by one or more processors coupled to memory. The method may include receiving a first sequence of frames captured by a first capture device having a first pose and a second sequence of frames captured by a second capture device having a second pose. The method may include tracking a first plurality of points of interest across the first sequence of frames over time, and a second plurality of points of interest across the second sequence of frames over time. The method may include mapping the first plurality of points of interest and the second plurality of points of interest to a plurality of three-dimensional points in a 3D coordinate space based on correspondences between the first plurality of points of interest and the second plurality of points of interest. The method may include determining a 3D displacement of a subset of the plurality of 3D points based on the first sequence of frames and the second sequence of frames. The method may include generating, based on the 3D displacement satisfying a displacement threshold, a 3D volume surrounding the subset of the plurality of 3D points based on a first frame in the first sequence of frames and a corresponding second frame in the second sequence of frames.

In some implementations of the method, generating the 3D volume may further include detecting a first two-dimensional (2D) bounding region for the subset of the plurality of 3D points as represented in the first frame. In some implementations of the method, generating the 3D volume may further include detecting a second 2D bounding region for the subset of the plurality of 3D points as represented in the corresponding second frame. In some implementations of the method, generating the 3D volume may further include generating the 3D volume based on the first 2D bounding region and the second 2D bounding region. In some implementations of the method, tracking the first plurality of points of interest across the first sequence of frames and the second plurality of points of interest across the second sequence of frames may be further based on a first mask applied to the first sequence of frames and a second mask applied to the second sequence of frames.

In some implementations of the method, it may further include determining that the subset of the plurality of 3D points corresponds to a dynamic object. In some implementations of the method, generating the 3D volume surrounding the subset of the plurality of 3D points may be responsive to determining that the subset of the plurality of 3D points corresponds to the dynamic object. In some implementations of the method, it may further include classifying the dynamic object corresponding to the subset of the plurality of 3D points based on the first sequence of frames and the second sequence of frames. In some implementations of the method, it may further include determining a predicted trajectory for the dynamic object.

Another aspect of the present disclosure relates to a system configured for detecting dynamic objects using a mesh network of nodes coupled to cameras. The system may include one or more processors configured by machine-readable instructions. The system can receive a first sequence of frames captured by a first capture device having a first pose and a second sequence of frames captured by a second capture device having a second pose. The system can track a first plurality of points of interest across the first sequence of frames over time, and a second plurality of points of interest across the second sequence of frames over time. The system can map the first plurality of points of interest and the second plurality of points of interest to a plurality of three-dimensional points in a 3D coordinate space based on correspondences between the first plurality of points of interest and the second plurality of points of interest. The system can determine a 3D displacement of a subset of the plurality of 3D points based on the first sequence of frames and the second sequence of frames. The system can generate, based on the 3D displacement satisfying a displacement threshold, a 3D volume surrounding the subset of the plurality of 3D points based on a first frame in the first sequence of frames and a corresponding second frame in the second sequence of frames.

In some implementations of the system, generating the 3D volume may further include detecting a first 2D bounding region for the subset of the plurality of 3D points as represented in the first frame. In some implementations of the system, generating the 3D volume may further include detecting a second 2D bounding region for the subset of the plurality of 3D points as represented in the corresponding second frame. In some implementations of the system, generating the 3D volume may further include generating the 3D volume based on the first 2D bounding region and the second 2D bounding region. In some implementations of the system, tracking the first plurality of points of interest across the first sequence of frames and the second plurality of points of interest across the second sequence of frames may be further based on a first mask applied to the first sequence of frames and a second mask applied to the second sequence of frames.

In some implementations of the system, the system can determine that the subset of the plurality of 3D points corresponds to a dynamic object. In some implementations of the system, generating the 3D volume surrounding the subset of the plurality of 3D points may be responsive to determining that the subset of the plurality of 3D points corresponds to the dynamic object. In some implementations of the system, the system can classify the dynamic object corresponding to the subset of the plurality of 3D points based on the first sequence of frames and the second sequence of frames. In some implementations of the system, the system can determine a predicted trajectory for the dynamic object.

At least one other aspect of the present disclosure relates to a method for detecting, tracking, and maintaining a registry of objects in a sensing volume. The method can be performed, for example, by one or more processors of a first node of a plurality of nodes. The method may include capturing, using a first capture device, a first sequence of frames. The method may include detecting a first dynamic object represented in each frame of the first sequence of frames. The method may include determining a classification of the first dynamic object and a movement profile for the first dynamic object based on the first sequence of frames. The method may include storing the classification and the movement profile in a dynamic object registry in association with an identifier of the first dynamic object. The method may include selecting a second node of the plurality of nodes based on the movement profile of the first dynamic object. The method may include transmitting the classification and the movement profile to the second node of the plurality of nodes.

In some implementations of the method, it may include receiving, from the second node of the plurality of nodes, a second classification of a second dynamic object and a second movement profile of the second dynamic object. In some implementations of the method, it may include updating the second movement profile of the second dynamic object in the dynamic object registry based on a third sequence of frames captured by the first capture device. In some implementations of the method, it may include detecting the second dynamic object in the third sequence of frames. In some implementations of the method, it may include determining an updated second movement profile of the second dynamic object based on the third sequence of frames.

In some implementations of the method, detecting the first dynamic object may further include tracking a first plurality of points of interest across the first sequence of frames and a second plurality of points of interest across a second sequence of frames captured by a second capture device. In some implementations of the method, detecting the first dynamic object may further include mapping the first plurality of points of interest and the second plurality of points of interest to a plurality of three-dimensional points in a 3D coordinate space may be based on correspondences between the first plurality of points of interest and the second plurality of points of interest. In some implementations of the method, detecting the first dynamic object may further include detecting the first dynamic object based on movement of a subset of the plurality of 3D points in the 3D coordinate space.

In some implementations of the method, tracking the first plurality of points of interest across the first sequence of frames and the second plurality of points of interest across the second sequence of frames may be further based on a first mask applied to the first sequence of frames and a second mask applied to the second sequence of frames. In some implementations of the method, determining the classification of the first dynamic object and the movement profile for the first dynamic object may be further based on the second sequence of frames. In some implementations of the method, determining the movement profile for the first dynamic object may further include determining a predicted trajectory of the first dynamic object.

Another aspect of the present disclosure relates to a system configured for detecting, tracking, and maintaining a registry of objects in a sensing volume. The system may include one or more processors of a first node of a plurality of nodes. The system can capture, using a first capture device, a first sequence of frames. The system can detect a first dynamic object represented in each frame of the first sequence of frames. The system can determine a classification of the first dynamic object and a movement profile for the first dynamic object based on the first sequence of frames. The system can store the classification and the movement profile in a dynamic object registry in association with an identifier of the first dynamic object. The system can select a second node of the plurality of nodes based on the movement profile of the first dynamic object. The system can transmit the classification and the movement profile to the second node of the plurality of nodes.

In some implementations of the system, the system can receive, from the second node of the plurality of nodes, a second classification of a second dynamic object and a second movement profile of the second dynamic object. In some implementations of the system, the system can update the second movement profile of the second dynamic object in the dynamic object registry based on a third sequence of frames captured by the first capture device.

In some implementations of the system, the system can detect the second dynamic object in the third sequence of frames. In some implementations of the system, the system can determine an updated second movement profile of the second dynamic object based on the third sequence of frames.

In some implementations of the system, detecting the first dynamic object may further include tracking a first plurality of points of interest across the first sequence of frames and a second plurality of points of interest across a second sequence of frames captured by a second capture device. In some implementations of the system, detecting the first dynamic object may further include mapping the first plurality of points of interest and the second plurality of points of interest to the plurality of three-dimensional points in a 3D coordinate space may be based on correspondences between the first plurality of points of interest and the second plurality of points of interest. In some implementations of the system, detecting the first dynamic object may further include detecting the first dynamic object based on movement of a subset of the plurality of 3D points in the 3D coordinate space.

In some implementations of the system, tracking the first plurality of points of interest across the first sequence of frames and the second plurality of points of interest across the second sequence of frames may be further based on a first mask applied to the first sequence of frames and a second mask applied to the second sequence of frames. In some implementations of the system, determining the classification of the first dynamic object and the movement profile for the first dynamic object may be further based on the second sequence of frames. In some implementations of the system, determining the movement profile for the first dynamic object may further include determining a predicted trajectory of the first dynamic object.

At least one aspect of the present disclosure relates to a method for generating a mask for point of interest detection when tracking sensing volumes. The method can be performed, for example, by one or more processors coupled to memory. The method may include receiving, from a first capture device having a first pose, a first sequence of frames. The method may include tracking a first plurality of points of interest across the first sequence of frames. The method may include receiving, from a computing device in communication with a second capture device having a second pose, a second plurality of points of interest tracked across a second sequence of frames captured by the second capture device. The method may include mapping the first plurality of points of interest and the second plurality of points of interest to a plurality of three-dimensional points in a 3D coordinate space based on correspondences between the first plurality of points of interest and the second plurality of points of interest. The method may include determining an average velocity of each 3D point of the plurality of 3D points. The method may include generating a first mask for frames captured by the first capture device based on the average velocity of each 3D point of the plurality of 3D points.

In some implementations of the method, it may include receiving, from the first capture device, a third sequence of frames. In some implementations of the method, it may include tracking a third plurality of points of interest across the third sequence of frames based on the first mask. In some implementations of the method, it may include detecting a dynamic object based on the third plurality of points of interest.

In some implementations of the method, it may further include mapping the third plurality of points of interest and a fourth plurality of points of interest to a second plurality of 3D points of interest in the 3D coordinate space. In some implementations of the method, detecting the dynamic object may be further based on a subset of the third plurality of points of interest. In some implementations of the method, it may further include classifying the dynamic object further based on the third sequence of frames. In some implementations of the method, it may further include storing the classification of the dynamic object and a movement profile of the dynamic object in a dynamic object registry in association with an identifier of the dynamic object. In some implementations of the method, it may further include determining a predicted trajectory as part of the movement profile for the dynamic object.

Another aspect of the present disclosure relates to a system configured for generating a mask for point of interest detection when tracking sensing volumes. The system may include one or more processors configured by machine-readable instructions. The system can receive, from a first capture device having a first pose, a first sequence of frames. The system can track a first plurality of points of interest across the first sequence of frames. The system can receive, from a computing device in communication with a second capture device having a second pose, a second plurality of points of interest tracked across a second sequence of frames captured by the second capture device. The system can map the first plurality of points of interest and the second plurality of points of interest to a plurality of three-dimensional points in a 3D coordinate space based on correspondences between the first plurality of points of interest and the second plurality of points of interest. The system can determine an average velocity of each 3D point of the plurality of 3D points. The system can generate a first mask for frames captured by the first capture device based on the average velocity of each 3D point of the plurality of 3D points.

In some implementations of the system, the system can receive, from the first capture device, a third sequence of frames. In some implementations of the system, the system can track a third plurality of points of interest across the third sequence of frames based on the first mask. In some implementations of the system, the system can detect a dynamic object based on the third plurality of points of interest. In some implementations of the system, the system can map the third plurality of points of interest and a fourth plurality of points of interest to a second plurality of 3D points of interest in the 3D coordinate space. In some implementations of the system, detecting the dynamic object may be further based on a subset of the third plurality of points of interest.

In some implementations of the system, the system can classify the dynamic object further based on the third sequence of frames. In some implementations of the system, the system can store the classification of the dynamic object and a movement profile of the dynamic object in a dynamic object registry in association with an identifier of the dynamic object. In some implementations of the system, the system can determine a predicted trajectory as part of the movement profile for the dynamic object.

At least one other aspect of the present disclosure relates to a method for classifying dynamic objects using a mesh network of nodes coupled to cameras. The method can be performed, for example, by one or more processors coupled to memory. The method may include receiving a first sequence of frames captured by a first capture device having a first pose and a second sequence of frames captured by a second capture device having a second pose. The method may include tracking a first plurality of points of interest across the first sequence of frames over time, and a second plurality of points of interest across the second sequence of frames over time. The method may include mapping the first plurality of points of interest and the second plurality of points of interest to a plurality of three-dimensional points in a 3D coordinate space based on correspondences between the first plurality of points of interest and the second plurality of points of interest. The method may include detecting a dynamic object corresponding to a subset of the plurality of 3D points. The method may include classifying, using a classification model, the dynamic object based on a first frame of the first sequence of frames and a second frame of the second sequence of frames.

In some implementations of the method, it may further include tracking the first plurality of points of interest across the first sequence of frames and the second plurality of points of interest across the second sequence of frames based on a first mask applied to the first sequence of frames and a second mask applied to the second sequence of frames. In some implementations of the method, detecting the dynamic object corresponding to the subset of the plurality of 3D points may further include determining that a 3D displacement of the subset of the plurality of 3D points satisfies a 3D displacement threshold.

In some implementations of the method, it may further include determining a predicted trajectory of the dynamic object based on the 3D displacement of the subset of the plurality of 3D points. In some implementations of the method, classifying the dynamic object may be further based on the predicted trajectory of the dynamic object. In some implementations of the method, it may further include training the classification model using training data including a plurality of frames each having a respective label indicating a presence of one or more dynamic objects in the plurality of frames.

In some implementations of the method, classifying the dynamic object may further include generating, using the classification model, a first classification of the dynamic object as represented in the first sequence of frames. In some implementations of the method, classifying the dynamic object may further include generating, using the classification model, a second classification of the dynamic object as represented in the second sequence of frames. In some implementations of the method, classifying the dynamic object may be further based on a comparison of the first classification and the second classification.

Another aspect of the present disclosure relates to a system configured for classifying dynamic objects using a mesh network of nodes coupled to cameras. The system may include one or more processors configured by machine-readable instructions. The system can receive a first sequence of frames captured by a first capture device having a first pose and a second sequence of frames captured by a second capture device having a second pose. The system can track a first plurality of points of interest across the first sequence of frames over time, and a second plurality of points of interest across the second sequence of frames over time. The system can map the first plurality of points of interest and the second plurality of points of interest to a plurality of three-dimensional points in a 3D coordinate space based on correspondences between the first plurality of points of interest and the second plurality of points of interest. The system can detect a dynamic object corresponding to a subset of the plurality of 3D points. The system can classify, using a classification model. The dynamic object may be based on a first frame of the first sequence of frames and a second frame of the second sequence of frames.

In some implementations of the system, the system can track the first plurality of points of interest across the first sequence of frames and the second plurality of points of interest across the second sequence of frames based on a first mask applied to the first sequence of frames and a second mask applied to the second sequence of frames. In some implementations of the system, detecting the dynamic object corresponding to the subset of the plurality of 3D points may further include determining that a 3D displacement of the subset of the plurality of 3D points satisfies a 3D displacement threshold.

In some implementations of the system, the system can determine a predicted trajectory of the dynamic object based on the 3D displacement of the subset of the plurality of 3D points. In some implementations of the system, classifying the dynamic object may be further based on the predicted trajectory of the dynamic object. In some implementations of the system, the system can train the classification model using training data including a plurality of frames each having a respective label indicating a presence of one or more dynamic objects in the plurality of frames.

In some implementations of the system, classifying the dynamic object may further include generating, using the classification model, a first classification of the dynamic object as represented in the first sequence of frames. In some implementations of the system, classifying the dynamic object may further include generating, using the classification model, a second classification of the dynamic object as represented in the second sequence of frames. In some implementations of the system, classifying the dynamic object may be further based on a comparison of the first classification and the second classification.

At least one aspect of the present disclosure relates to a method for probabilistically predicting paths of objects detected in a sensing volume. The method can be performed, for example, by one or more processors coupled to memory. The method may include receiving a first sequence of frames captured by a first capture device having a first pose and a second sequence of frames captured by a second capture device having a second pose. The method may include tracking a first plurality of points of interest across the first sequence of frames over time, and a second plurality of points of interest across the second sequence of frames over time. The method may include mapping the first plurality of points of interest and the second plurality of points of interest to a plurality of three-dimensional points in a 3D coordinate space based on correspondences between the first plurality of points of interest and the second plurality of points of interest. The method may include detecting a dynamic object corresponding to a subset of the plurality of 3D points. The method may include determining a predicted trajectory for the dynamic object based on an estimated velocity of the subset of the plurality of 3D points and a classification of the dynamic object.

In some implementations of the method, tracking the first plurality of points of interest across the first sequence of frames and the second plurality of points of interest across the second sequence of frames may be further based on a first mask applied to the first sequence of frames and a second mask applied to the second sequence of frames. In some implementations of the method, detecting the dynamic object may further include determining that a displacement of the subset of the plurality of 3D points in the 3D coordinate space satisfies a predetermined threshold. In some implementations of the method, it may further include determining the estimated velocity of the subset of the plurality of 3D points based on the displacement of the subset of the plurality of 3D points in the 3D coordinate space. In some implementations of the method, the predicted trajectory may indicate a plurality of waypoints in the 3D coordinate space.

In some implementations of the method, it may further include determining the classification of the dynamic object based on a first classification of the dynamic object as represented in the first sequence of frames and a second classification of the dynamic object as represented in the second sequence of frames. In some implementations of the method, mapping the first plurality of points of interest and the second plurality of points of interest to the plurality of 3D points in the 3D coordinate space may be further based on the first pose and the second pose.

Another aspect of the present disclosure relates to a system configured for probabilistically predicting paths of objects detected in a sensing volume. The system may include one or more hardware processors configured by machine-readable instructions. The system can receive a first sequence of frames captured by a first capture device having a first pose and a second sequence of frames captured by a second capture device having a second pose. The system can track a first plurality of points of interest across the first sequence of frames over time and a second plurality of points of interest across the second sequence of frames over time. The system can map the first plurality of points of interest and the second plurality of points of interest to a plurality of three-dimensional points in a 3D coordinate space based on correspondences between the first plurality of points of interest and the second plurality of points of interest. The system can detect a dynamic object corresponding to a subset of the plurality of 3D points. The system can determine a predicted trajectory for the dynamic object based on an estimated velocity of the subset of the plurality of 3D points and a classification of the dynamic object.

In some implementations of the system, tracking the first plurality of points of interest across the first sequence of frames and the second plurality of points of interest across the second sequence of frames may be further based on a first mask applied to the first sequence of frames and a second mask applied to the second sequence of frames. In some implementations of the system, detecting the dynamic object may further include determining that a displacement of the subset of the plurality of 3D points in the 3D coordinate space satisfies a predetermined threshold. In some implementations of the system, the system can determine the estimated velocity of the subset of the plurality of 3D points based on the displacement of the subset of the plurality of 3D points in the 3D coordinate space.

In some implementations of the system, the predicted trajectory may indicate a plurality of waypoints in the 3D coordinate space. In some implementations of the system, the system can determine the classification of the dynamic object based on a first classification of the dynamic object as represented in the first sequence of frames and a second classification of the dynamic object as represented in the second sequence of frames. In some implementations of the system, mapping the first plurality of points of interest and the second plurality of points of interest to the plurality of 3D points in the 3D coordinate space may be further based on the first pose and the second pose.

At least one aspect of the present disclosure relates to a method for assessing risk of objects in a sensing volume using a mesh network of nodes coupled to cameras. The method can be performed, for example, by one or more processors coupled to memory. The method may include receiving a first sequence of frames captured by a first capture device having a first pose and a second sequence of frames captured by a second capture device having a second pose. The method may include tracking a first plurality of points of interest across the first sequence of frames over time, and a second plurality of points of interest across the second sequence of frames over time. The method may include mapping the first plurality of points of interest and the second plurality of points of interest to a plurality of three-dimensional points in a 3D coordinate space based on correspondences between the first plurality of points of interest and the second plurality of points of interest. The method may include detecting a dynamic object corresponding to a subset of the plurality of 3D points. The method may include generating a flightpath score for the dynamic object based on a predicted trajectory of the dynamic object calculated using an estimated velocity of the subset of the plurality of 3D points and based on a predetermined region in the 3D coordinate space.

In some implementations of the method, tracking the first plurality of points of interest across the first sequence of frames and the second plurality of points of interest across the second sequence of frames may be further based on a first mask applied to the first sequence of frames and a second mask applied to the second sequence of frames. In some implementations of the method, it may further include determining the estimated velocity of the subset of the plurality of 3D points based on a 3D displacement of the plurality of 3D points in the 3D coordinate space. In some implementations of the method, it may further include determining the predicted trajectory of the dynamic object based on at least a classification of the dynamic object.

In some implementations of the method, it may further include generating the classification of the dynamic object based on the first sequence of frames and the second sequence of frames. In some implementations of the method, it may further include storing the classification of the dynamic object, the predicted trajectory of the dynamic object, and the flightpath score of the dynamic object in a dynamic object registry in association with an identifier of the dynamic object. In some implementations of the method, it may further include transmitting a warning signal to a computing device via a network responsive to the flightpath score satisfying a flightpath threshold.

Another aspect of the present disclosure relates to a system configured for assessing risk of objects in a sensing volume using a mesh network of nodes coupled to cameras. The system may include one or more hardware processors configured by machine-readable instructions. The system can receive a first sequence of frames captured by a first capture device having a first pose and a second sequence of frames captured by a second capture device having a second pose. The system can track a first plurality of points of interest across the first sequence of frames over time, and a second plurality of points of interest across the second sequence of frames over time. The system can map the first plurality of points of interest and the second plurality of points of interest to a plurality of three-dimensional points in a 3D coordinate space based on correspondences between the first plurality of points of interest and the second plurality of points of interest. The system can detect a dynamic object corresponding to a subset of the plurality of 3D points. The system can generate a flightpath score for the dynamic object based on a predicted trajectory of the dynamic object calculated using an estimated velocity of the subset of the plurality of 3D points and based on a predetermined region in the 3D coordinate space.

In some implementations of the system, tracking the first plurality of points of interest across the first sequence of frames and the second plurality of points of interest across the second sequence of frames may be further based on a first mask applied to the first sequence of frames and a second mask applied to the second sequence of frames. In some implementations of the system, the system can determine the estimated velocity of the subset of the plurality of 3D points based on a 3D displacement of the plurality of 3D points in the 3D coordinate space. In some implementations of the system, the system can determine the predicted trajectory of the dynamic object based on at least a classification of the dynamic object.

In some implementations of the system, the system can generate the classification of the dynamic object based on the first sequence of frames and the second sequence of frames. In some implementations of the system, the system can store the classification of the dynamic object, the predicted trajectory of the dynamic object, and the flightpath score of the dynamic object in a dynamic object registry in association with an identifier of the dynamic object. In some implementations of the system, the system can transmit a warning signal to a computing device via a network responsive to the flightpath score satisfying a flightpath threshold.

At least one aspect of the present disclosure relates to a method for triggering maneuvers for maintaining safe sensing volumes. The method can be performed, for example, by one or more processors coupled to memory. The method may include receiving a first sequence of frames captured by a first capture device having a first pose and a second sequence of frames captured by a second capture device having a second pose. The method may include tracking a first plurality of points of interest across the first sequence of frames over time, and a second plurality of points of interest across the second sequence of frames over time. The method may include mapping the first plurality of points of interest and the second plurality of points of interest to a plurality of three-dimensional points in a 3D coordinate space based on correspondences between the first plurality of points of interest and the second plurality of points of interest. The method may include generating, based on a predetermined region in the 3D coordinate space, a flightpath score for a dynamic object detected based on an estimated velocity of a subset of the plurality of 3D points. The method may include determining maneuver instructions for a movable entity based on the flightpath score and a predicted trajectory of the dynamic object. The method may include transmitting the maneuver instructions to a flight computing system associated with the movable entity.

In some implementations of the method, tracking the first plurality of points of interest across the first sequence of frames and the second plurality of points of interest across the second sequence of frames may be further based on a first mask applied to the first sequence of frames and a second mask applied to the second sequence of frames. In some implementations of the method, it may further include determining the estimated velocity of the subset of the plurality of 3D points based on a 3D displacement of the plurality of 3D points in the 3D coordinate space. In some implementations of the method, it may further include determining the predicted trajectory of the dynamic object based on at least a classification of the dynamic object.

In some implementations of the method, it may further include generating the classification of the dynamic object based on the first sequence of frames and the second sequence of frames. In some implementations of the method, the maneuver instructions may include instructions that cause the flight computing system to present flight instructions for an operator to operate an aerial vehicle associated with the flight computing system. In some implementations of the method, determining the maneuver instructions may further include generating the maneuver instructions based on the predicted trajectory indicating the dynamic object will pass through the predetermined region in the 3D coordinate space.

Another aspect of the present disclosure relates to a system configured for triggering maneuvers for maintaining safe sensing volumes. The system may include one or more processors configured by machine-readable instructions. The system can receive a first sequence of frames captured by a first capture device having a first pose and a second sequence of frames captured by a second capture device having a second pose. The system can track a first plurality of points of interest across the first sequence of frames over time, and a second plurality of points of interest across the second sequence of frames over time. The system can map the first plurality of points of interest and the second plurality of points of interest to a plurality of three-dimensional points in a 3D coordinate space based on correspondences between the first plurality of points of interest and the second plurality of points of interest. The system can generate, based on a predetermined region in the 3D coordinate space, a flightpath score for a dynamic object detected based on an estimated velocity of a subset of the plurality of 3D points. The system can determine maneuver instructions for a movable entity based on the flightpath score and a predicted trajectory of the dynamic object. The system can transmit the maneuver instructions to a flight computing system associated with the movable entity.

In some implementations of the system, tracking the first plurality of points of interest across the first sequence of frames and the second plurality of points of interest across the second sequence of frames may be further based on a first mask applied to the first sequence of frames and a second mask applied to the second sequence of frames. In some implementations of the system, the system can determine the estimated velocity of the subset of the plurality of 3D points based on a 3D displacement of the plurality of 3D points in the 3D coordinate space. In some implementations of the system, the system can determine the predicted trajectory of the dynamic object based on at least a classification of the dynamic object.

In some implementations of the system, the system can generate the classification of the dynamic object based on the first sequence of frames and the second sequence of frames. In some implementations of the system, the maneuver instructions may include instructions that cause the flight computing system to present flight instructions for an operator to operate an aerial vehicle associated with the flight computing system. In some implementations of the system, determining the maneuver instructions may further include generating the maneuver instructions based on the predicted trajectory indicating the dynamic object will pass through the predetermined region in the 3D coordinate space.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of "a," "an," and "the" includes plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7B illustrates an example arrangement of a mesh network of nodes coupled to cameras detecting and tracking a dynamic object, in accordance with one or more implementations;

DETAILED DESCRIPTION

Figure 1:
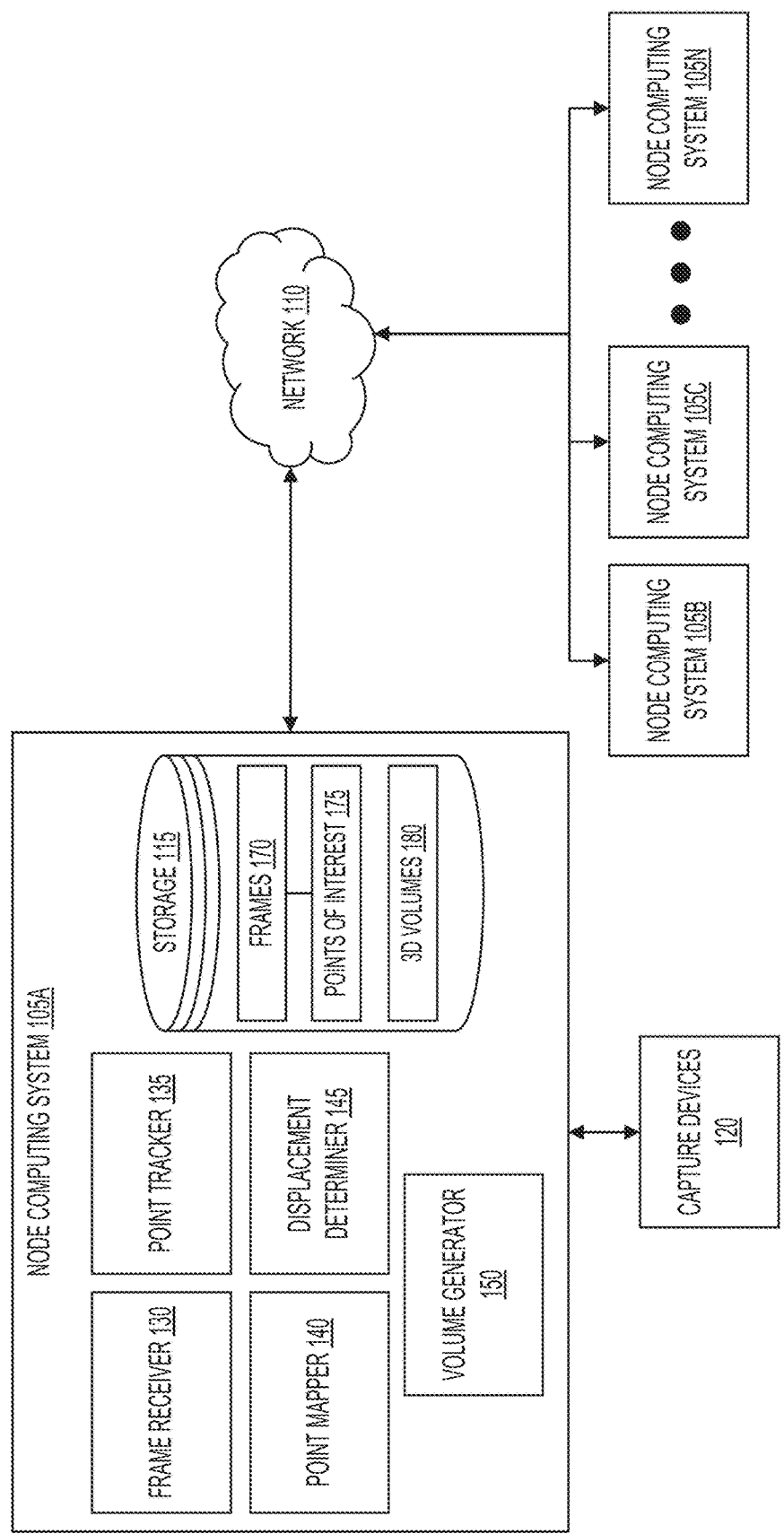
FIG. 1 illustrates a block diagram of an example system for dynamic object tracking using a mesh network of nodes coupled to cameras.

Below are detailed descriptions of various concepts related to, and implementations of, techniques, approaches, methods, apparatuses, and systems for dynamic object tracking using a mesh network of nodes coupled to capture devices. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various embodiments below, the following descriptions of the sections of the Specification and their respective contents can be helpful:

Section A describes techniques for detecting dynamic objects using a mesh network of nodes coupled to cameras;

Section B describes techniques for detecting, tracking, and maintaining a registry of objects in a sensing volume;

Section C describes techniques for generating a mask for point of interest detection when tracking sensing volumes;

Section D describes techniques for classifying dynamic objects using a mesh network of nodes coupled to cameras;

Section E describes techniques for probabilistically predicting paths of objects detected in a sensing volume;

Section F describes techniques for assessing risk of objects in a sensing volume using a mesh network of nodes coupled to cameras;

Section G describes techniques for triggering maneuvers for maintaining safe sensing volumes; and Section H describes a computing environment which can be useful for practicing implementations described herein.

A. Detecting Dynamic Objects Using a Mesh Network of Nodes Coupled to Cameras

In the context of operations of autonomous aerial vehicles, several layers of safety need to be implemented. In particular, the detection, location, and identification of all flying aircraft (and potentially other objects and animals like birds) are fundamental to preserve the safety of a particular airspace. The systems and methods described herein provide techniques that can be used to "sanitize" an airspace of regions where autonomous vehicles operate. The techniques described herein provide a mesh of sensing nodes, each including a computing device and at least two cameras. Each node in the mesh network can individually sense a single-engine aircraft at ranges between 100 meters to 10 km away, for example, and share information about said aircraft between the nodes in the mesh network.

The systems and methods of this section provide techniques for detecting dynamic objects using a mesh network of nodes coupled to cameras. A dynamic object is an object that is moving relative to the environment, such as a flying object. Generally, dynamic objects can be identified and tracked using image processing techniques. However, to maintain safe volumes and improve the accuracy of dynamic object classification, it is important to derive additional information about the dynamic object. The techniques described in this section utilize at least two cameras to estimate a volume in a 3D coordinate space that is occupied by a detected dynamic object. The estimated volume can be used to aid in object classification and provide useful data for other object tracking and estimation techniques described herein. The systems and methods of this section provide a system that utilizes at least two capture devices in communication with a computing device that can detect an aircraft in a predetermined airspace, locate dynamic objects' local coordinates (e.g., relative to the capture devices), and map those local coordinates to real-world coordinates (e.g., relative to a protected or monitored airspace).

Referring now to FIG. 1, illustrated is a block diagram of an example system 100 for detecting dynamic objects using a mesh network of nodes coupled to cameras, in accordance with one or more implementations. The system 100 can include one or more node computing systems 105A-105N (sometimes generally referred to herein as node computing system(s) 105), and at least one network 110. Each node computing system 105 can be in communication with one or more capture devices 120. Each node computing system 105 can include at least one frame receiver 130, at least one point tracker 135, at least one point mapper 140, at least one displacement determiner 145, at least one volume generator 150, and at least one storage 115. The storage 115 can store one or more frames 170 (sometimes referred to as one or more sequence(s) of frames 170), one or more points of interest 175, and one or more 3D volumes 180. In some implementations, the storage 115 can be external to the node computing system 105, for example, as part of one or more servers or other computing devices in communication with the node computing system 105 via the network 110. Various such components of the node computing systems 105 can be implemented as one or more algorithms, computational models, machine learning models, rules, heuristics, code, logic, or various combinations thereof.

Figure 20A:
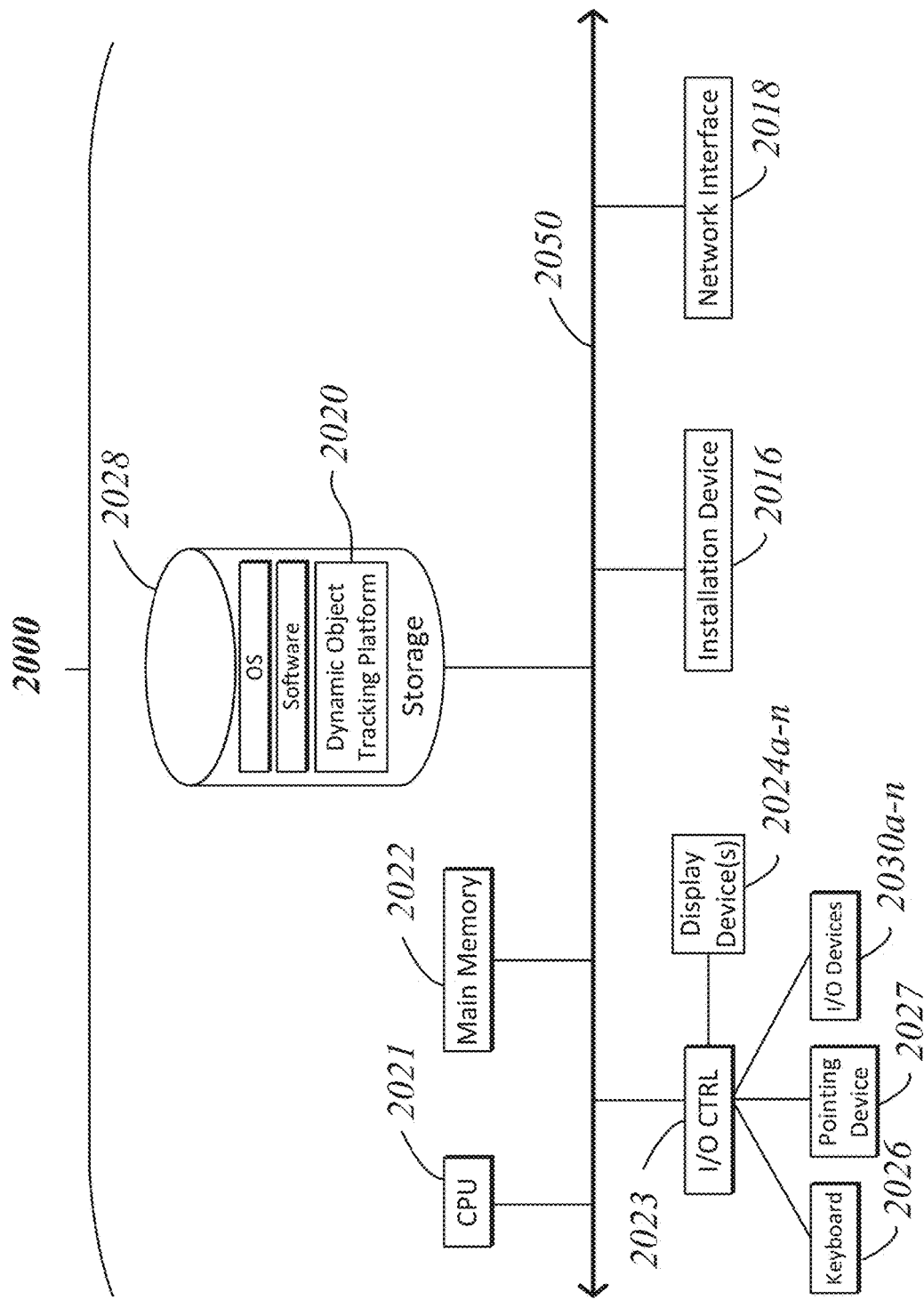
FIGS. 20A and 20B are block diagrams depicting embodiments of computing devices useful in connection with the systems and methods described herein.
Figure 20B:
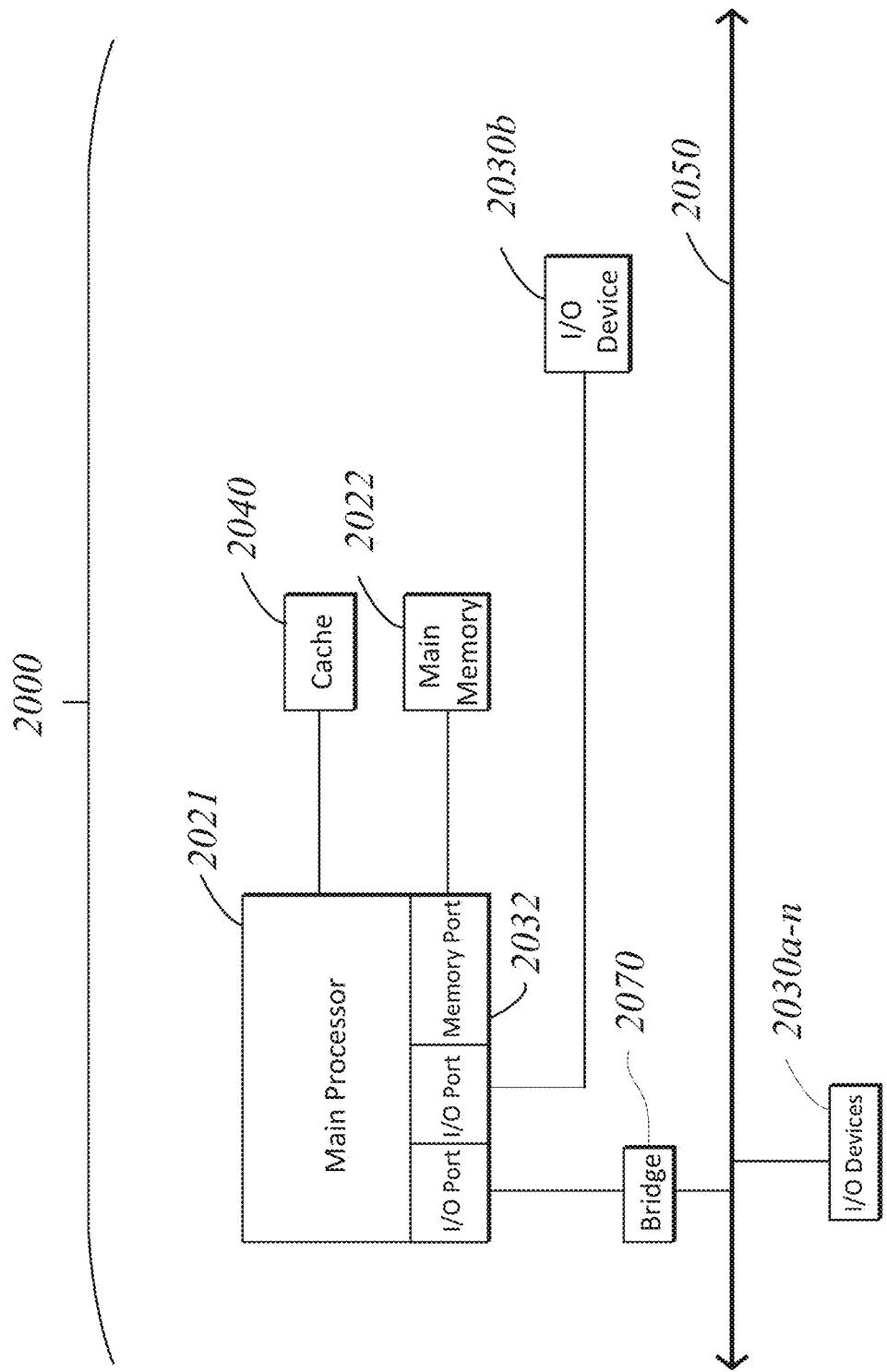

Each of the node computing systems 105, the capture devices 120, the network 110, the storage 115, the frame receiver 130, the point tracker 135, the point mapper 140, the displacement determiner 145, and the volume generator 150 of the system 100 can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 105 can include any of the functionality of the node computing systems 605, the node computing systems 905, the node computing systems 1105, the node computing systems 1305, the node computing systems 1505, and the node computing systems 1805, described herein in connection with FIGS. 6, 9, 11, 13, 15, and 18, respectively. Each of the components of the node computing system 105 can perform the functionalities detailed herein.

The node computing system 105 can include at least one processor and a memory, e.g., a processing circuit. The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The node computing system 105 can include one or more computing devices or servers that can perform various functions as described herein. The node computing system 105 can include any or all of the components and perform any or all of the functions of the computer system 2000 described herein in conjunction with FIGS. 20A and 20B.

The network 110 can include computer networks such as the Internet, local, wide, metro or other area networks, intranets, satellite networks, other computer networks such as voice or data mobile phone communication networks, radio communication interfaces, and combinations thereof. The node computing system 105A of the system 100 can communicate via the network 110, for instance with at least one other node computing system 105B-105N. The network 110 may be any form of computer network that can relay information between the node computing system 105A, the node computing systems 105B-105N, and one or more other computing systems, such as a flight computing system or another remote server in communication with the node computing systems 105.

In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the node computing system 105, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein (e.g., the node computing system 105, the computer system 2000, etc.) may also communicate wirelessly with the computing devices of the network 110 via a proxy device (e.g., a router, network switch, or gateway).

The storage 115 can be a database configured to store and/or maintain any of the information described herein. The storage 115 can maintain one or more data structures, which may contain, index, or otherwise store each of the values, pluralities, sets, variables, vectors, thresholds, or other data used in the processing operations described herein. The storage 115 can be accessed using one or more memory addresses, index values, or identifiers of any item, structure, or region maintained in the storage 115. The storage 115 can be accessed by the components of the node computing system 105, or any other computing device described herein, via the network 110. In some implementations, the storage 115 can be internal to the node computing system 105. In some implementations, the storage 115 can exist external to the node computing system 105 and may be accessed via the network 110. The storage 115 can be distributed across many different computer systems or storage elements and may be accessed via the network 110 or a suitable computer bus interface. The node computing system 105 can store, in one or more regions of the memory of the node computing system 105, or in the storage 115, the results of any or all computations, determinations, selections, identifications, generations, constructions, or calculations in one or more data structures indexed or identified with appropriate values.

The one or more capture devices 120 can be, for example, any sort of camera capable of capturing one or more frames 170. In some implementations, the capture device 120 is a video camera capable of producing a video stream. In some implementations, the capture device 120 is an image capture device that can capture images in response to a condition, such as a capture signal or on a predetermined periodic basis. In some implementations, the capture device 120 can be associated with a respective pose, which can be maintained by the node computing system 105 in communication with the capture device. In some implementations, each of the node computing systems 105A-105N can be in communication with at least two capture devices 120. Each of the at least two capture devices in communication with a node computing system 105 can have its own respective pose in a 3D space (e.g., positioned to capture a portion of a sensing volume). A pose is an absolute (or relative to a known frame of reference) position and rotation in a 3D space. The pose information for each capture device 120 in communication with a node computing system 105 can be used to perform various image analysis techniques described herein. Each of the capture devices 120 can capture one or more sequences of frames 170, which can be communicated to the node computing system 105 corresponding to the capture devices 120. The sequences of frames 170 can be stored, or otherwise maintained, in one or more data structures in the storage 115. Each frame 170 of the sequences of frames 170 can be identified by a respective frame identifier (e.g., a timestamp, a unique identifier, etc.), and a respective identifier of the capture device 120 that captured the respective frame. Said identifiers can be used to index or otherwise access particular frames for the processing operations described herein.

As shown, the storage 115 can store the frames 170 (sometimes referred to as sequence(s) of frames 170) in one or more data structures. Each of the frames 170 can be, for example, an image that is associated with a particular timestamp in a video stream captured from a video camera. In some implementations, each frame can itself be a still image captured by a corresponding capture device 120, for example, on a periodic basis. Each frame 170 can include pixels arranged in a grid that make up the frame 170 (e.g., as an image), where each pixel includes color data and location data that identifies the color and location of the pixel in the frame 170. In some implementations, the capture device 120 can capture the frames 170 in one or more different color channels (e.g., each channel corresponding to a particular color wavelength). In some implementations, the image capture device 120 can be a camera or video capture device that captures non-visible light (e.g., infrared light, etc.). Each color channel in a pixel of a frame 170 can identify the intensity of a particular color of the pixel. These color intensity values (e.g., the color of each pixel in a frame 170, etc.) can be used in one or more point of interest detection techniques, as described herein. In some implementations, the capture devices 120 can be monochrome cameras that capture images or video streams that have a single intensity channel.

In some implementations, the capture devices 120 can form a part of the node computing system. For example, the capture device(s) 120 can be positioned in or on a housing of a corresponding node computing system 105. In some implementations, the capture devices can be external to the corresponding node computing system 105, and can communicate with the components of the node computing system 105 via one or more communication interfaces, as described herein in connection with FIGS. 20A and 20B.

Figure 7A:
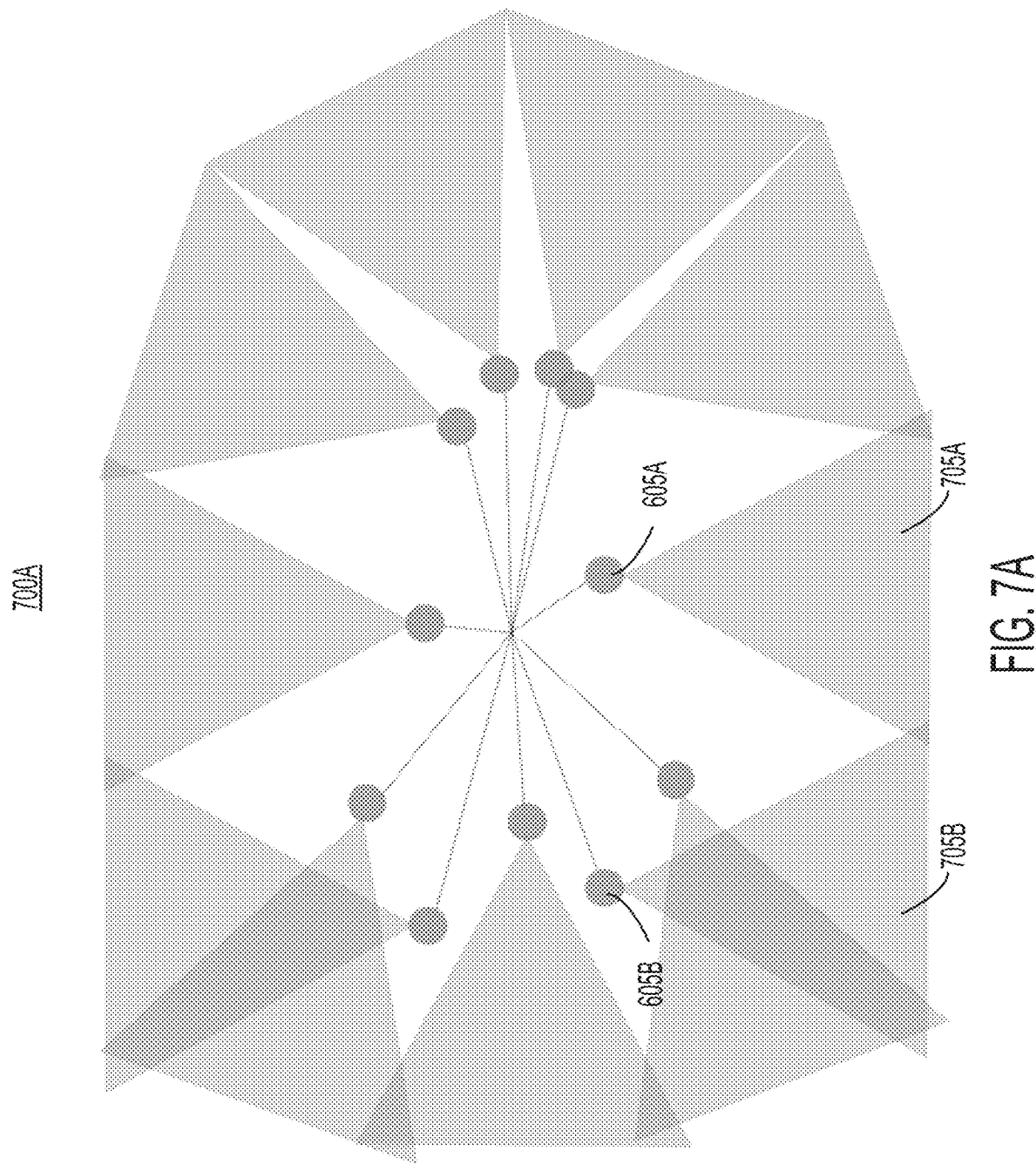
FIG. 7A illustrates an example arrangement of a mesh network of nodes coupled to cameras to provide coverage over a sensing volume, in accordance with one or more implementations.

Each capture device 120 can be positioned (e.g., given a predetermined pose, etc.) such that the capture device 120 captures frames 170 that depict a portion of an environment of a predetermined sensing volume. An example of such sensing volume is shown in FIGS. 7A and 7B. In general, the sensing volume is a predetermined region of airspace that the node computing systems 105 monitor using one or more of the capture devices 120. Each of the capture devices can capture sequences of frames, which depict a portion of the sensing volumes. By performing image analysis techniques on the sequences of frames, the techniques provided herein can detect, classify, and estimate characteristics of dynamic objects in the sensing volume. To do so, the node computing systems 105 can track points of interest across each sequence of frames 170. These points of interest can be stored in one or more data structures association with the respective sequence of frames 170 in the storage 115.

The storage 115 can store one or more sets of points of interest 175 in association with a respective sequence of frames 170 captured by a corresponding capture device 120. In other words, each of the capture devices 120 can be associated with a respective set of points of interest 175, which are detected and tracked across the sequences of frames 170 captured by the capture device 120. Each point of interest 175 can be a point in a frame 170 that is detected based on using a detection technique, such as a corner detection technique, an edge detection technique, a blob detection technique, a ridge detection technique, or other feature detection techniques. Each point of interest 175 can correspond to one or more pixel coordinates in a frame, and can include parameters that indicate an intensity of one or more pixels in a frame 170 that correspond to the point of interest. In some implementations, a point of interest 175 can be tracked across one or more sequences of frames.

For example, by performing a feature tracking technique, movement of points of interest 175 (e.g., changes in pixel coordinates across consecutive frames) can be calculated. Some examples of feature tracking techniques include, for example, a Kanade-Lucas-Tomasi (KLT) feature tracker, machine learning models trained to detect particular features as part of object detection processes, or other point feature matching techniques. Each point of interest 175, including the parameters (e.g., pixel color values in a window, etc.) of each point of interest 175 and coordinates of each point of interest across frames, and amount of movement of the point of interest in the pixel coordinate space, can be stored in one or more data structures in the storage 115. The positions of the points of interest 175 can be correlated with points of interest 175 detected in other sequences of frames 170 to detect volumes in a 3D coordinate space that correspond to detected dynamic objects. These 3D volumes 180 can be stored in one or more data structures in the storage 115.

In some implementations, the node computing system(s) 105 can perform various operations described herein, including detecting and tracking objects using data from multiple capture devices 120, using one or more machine learning models. The machine learning models can be one or more of various machine learning models, including but not limited to neural networks, decision trees, support vector machines, and ensemble models.

For example, the node computing system 105 can have a machine learning model, such as a deep learning model (e.g., neural network model), trained to detect characteristics of objects from image data. The machine learning model can be trained using training data that includes images of objects, which may be labeled with identifiers of the objects, such as classes, characteristics, or other features of the objects, and from multiple poses. For example, the images can include multiple images of the same object detected from multiple poses and distances, such that the machine learning model can be trained to detect objects using similar data as that provided by the capture devices 120. The data provided to the machine learning model (during training and during operation) can include position data associated with the capture devices 120 that detected the images, such as relative or absolute positions and/or relative or absolution orientations of the capture devices 120.

As such, the machine learning model can receive, from the capture devices 120 (e.g., during operation), image data that may be representative of objects, which the machine learning model can use to detect the objects. For example, the machine learning model can detect and/or output indications of objects for each respective sequence of frames 170 from respective capture devices 120. The indications can be identifiers of objects, characteristics of objects (e.g., shape, color, structural features or segments), as well as features or outputs of one or more layers of the machine learning model. For example, the indications can include identifiers or other characteristics that may identify a class or type of the object (e.g., semantic indications, such as "plane," "bird," or "helicopter"), as well as indications associated with object recognition processes, such as structural features of at least a portion of the detected objects (e.g., non-semantic indications, such as points, corners, edges, colors, segments), or various combinations thereof.

For example, the machine learning model can be a deep learning model. The machine learning model can be a neural network. The neural network can include a plurality of layers, such as an input layer to receive input data (e.g., input images; position information of capture devices), one or more hidden layers, and an output layer to output an indication of a detected object.

Figure 2:
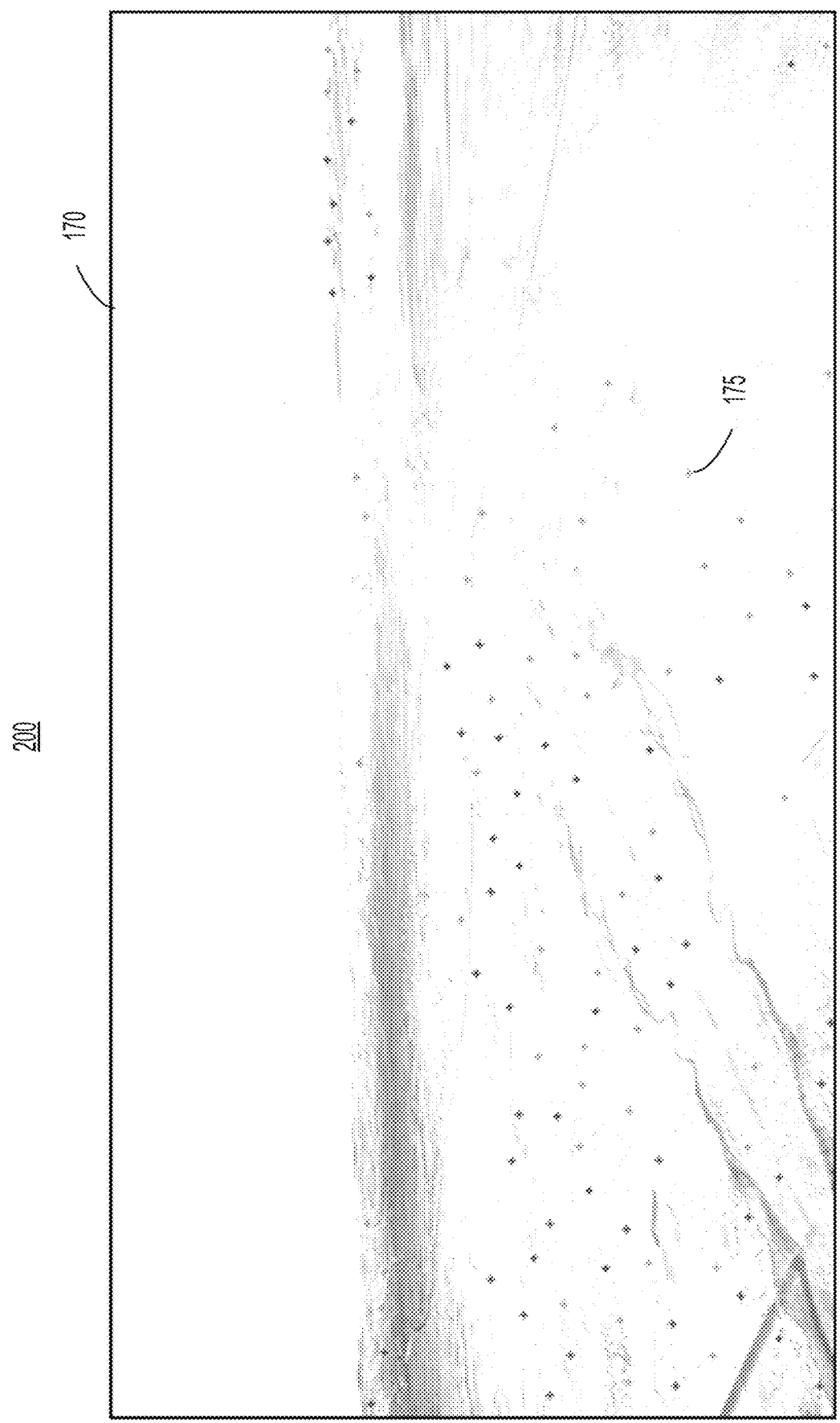
FIG. 2 illustrates an example frame including identifications of a number of points of interest, in accordance with one or more implementations.

Referring briefly now to FIG. 2, depicted is a view 200 of a frame 170. The frame 170 is captured, for example, by a capture device 120 that is positioned such that the frame 170 depicts an environment in a sensing volume. As shown, there are multiple points of interest 175 identified in the frame 170. These points of interest 175 are rendered as points positioned on the frame 170. Reference numbers for each point of interest are omitted in the image for ease of understanding. As shown, the points of interest 175 can correspond to groupings of pixels in the frame 170 and can be associated with respective pixel coordinates of the frame 170. In addition, the points of interest can be correlated and tracked across consecutive frames 170 captured by the capture device, and each point of interest 175 can be stored in association with a motion vector, which can define a change in the pixel coordinates of the point of interest 175 over time. Because the rate at which the frames 170 captured by the capture device 120 are known, and because the capture device 120 is assumed to be static (or otherwise have a known pose), the overall velocity of a point of interest 175 in the coordinate space of the frame 170 (e.g., the pixel coordinate space) can be calculated. This velocity can be referred to herein as a 2D velocity, and it is specific to the sequence of frames 170 in which the point of interest 175 is detected. As such, a 3D position of the object can be detected and tracked using the points of interest 175 or other indications or characteristics of the objects that the node computing system 105 detects in the frames 170.

Referring back now to FIG. 1, the storage 115 can store one or more 3D volumes that correspond to dynamic objects. Using the techniques described in greater detail herein below, the node computing system 105 can identify correspondences between indications of objects, such as points of interest in two sequences of frames 170 captured by two capture devices 120 having known poses. Based on the difference in pose between the two capture devices, and based on the positions of the points of interest 175 that correspond across both sequences of frames 170, the node computing system can map the corresponding points of interest 175 into a 3D coordinate space (e.g., the coordinate space of the sensing volume). The mapped points of interest can be referred to as 3D points of interest. As additional frames 170 are captured by and included in each sequence of frames 170 by the two capture devices 120, the corresponding points of interest can be continuously mapped to the 3D coordinate space and tracked over time.

Movement (e.g., displacement) of the 3D position of the objects, such as 3D points of interest, in the 3D coordinate space can be tracked by the node computing system. If the 3D points of interest satisfy a movement condition (e.g., appear to exhibit motion corresponding to a dynamic object), the 3D points (and the points of interest in each frame 170 captured by each capture device 120) can be identified as corresponding to a dynamic object. Using a trained model, the node computing system can regress a bounding box around a region of each frame in both sequence of frames having points of interest 175 that correspond to the 3D points of interest that satisfy the movement condition. If a bounding region is regressed in both frames, the dimensions of the bounding regions, as well as the known pose of each capture device 120, can be used to estimate a 3D volume 180 surrounding the dynamic object in the 3D coordinate space. This process is described in further detail below, and shown in FIGS. 3A and 3B. Coordinates of the 3D volume 180 can be stored in one or more data structures in the storage 115. The 3D volume 180 can be stored in association with the frames 170 used to detect the 3D volume 180, and in association with an identifier of the dynamic object (and the 3D points in the 3D coordinate space) to which the dynamic object corresponds.

Referring now to the operations of a node computing system 105, the frame receiver 130 can receive a first sequence of frames 170 captured by a first capture device 120 having a first pose and a second sequence of frames 170 captured by a second capture device 120 having a second pose. As described herein, the pose of each capture device 120 in communication with the node computing system 105 can be stored in association with an identifier of the respective capture device 120, and the frames 170 captured by the respective capture device, in the storage 115. The sequences of frames 170 can be any number of frames 170. In some implementations, two corresponding frames can each be captured and provided by the capture devices 120 in communication with the node computing system 105 before the next frame 170 in the sequence is retrieved, thereby synchronizing each sequence of frames 170 captured by the capture devices 120. Each of the frames 170 in each sequence of frames 170 can be consecutive frames 170 captured by a respective capture device 120. For example, the frames 170 can be consecutive frames captured as part of a video stream. In some implementations, the frames 170 can be consecutively captured images (e.g., images captured periodically at a predetermined time interval by the capture device). Upon receiving the frames 170, the frame receiver 130 can store each frame 170 in one or more data structures (e.g., a list, a queue, etc.) of frames corresponding to the capture device 120 used to capture the respective frame 170.

Upon receiving the sequences of frames 170 from each capture device, the point tracker 135 can track an object, such as by tracking an indication (e.g., characteristic) of the object. The indication can represent at least a portion of the object. For example, the indication can be an identifier of the object, a segment or other structural feature of the object, a class of the object, a shape of the object, or a color of the object, among various other characteristics. The tracker 135 can track, as the indication, a first set of points of interest 175 across the first sequence of frames 170 and a second set of points of interest 175 across the second sequence of frames 170. Each point of interest 175 can be a point in a frame 170 that is detected based on using a feature detection technique, such as a corner detection technique, an edge detection technique, a blob detection technique, or a ridge detection technique, on a frame 170 in a sequence of frames captured by a capture device. Each frame provided by each capture device 120 can be provided as input to a feature detection technique, such as a corner detection technique, which can provide pixel coordinates in the input frame 170 that correspond to detected points of interest 175 as output. In addition, each detected point of interest 175 can include parameters that indicate an intensity of one or more pixels in a frame 170 that correspond to the point of interest.

The point tracker 135 can detect the indication, such as by detecting a set of points of interest 175 for each frame in each sequence of frames captured by the capture devices 120. Each set of points of interest can be stored in a data structure, such as a list, which can be stored in association with the frame 170 in which the points were detected. In addition, the point tracker 135 can track similar points of interest temporally as additional frames 170 are captured and provided as part of the sequence of frames 170. To do so, the point tracker 135 can identify parameter correspondences between the pixels (e.g., a predetermined window size) of a point of interest 175 in one frame 170 and the pixels (e.g., the predetermined window size) in a point of interest 175 in a consecutive frame 170. The correspondence can be calculated as a correspondence score that reflects a likelihood that the point of interest 175 in one frame 170 depicts the same feature identified by a second point of interest 175 in a consecutive frame 170. If the score satisfies a predetermined threshold, the points of interest 175 can be linked temporally and assigned the same identifier. The two-dimensional displacement (e.g., difference in pixel coordinates, etc.) of the point of interest 175 from the first frame 170 to the next consecutive frame can be tracked and determined by the point tracker 135, and stored in association with a timestamp of each frame and the identifier of the point of interest 175.

In some implementations, tracking the points of interest across the sequences of frames can utilize a first mask applied to each of the first sequence of frames 170 and a second mask applied to each of the second sequence of frames 170. In some circumstances, a capture device 120 may be positioned such that the frames 170 captured by the capture device 120 include portions that cannot depict, or are very unlikely to depict, dynamic objects of interest (e.g., aircraft, birds, other aerial objects, etc.). For example, a capture device may partially capture the ground as part of its field of view, even though portions of the ground cannot depict aerial vehicles or aerial objects of interest. To improve processing efficiency, the point tracker 135 can forego processing these regions of the frames 170 by applying a mask that is generated based on the field-of-view of the respective capture device 120. The mask can eliminate portions of a frame 170 by indicating that points of interest are not present in the indicated portions. The point of interest detection techniques described herein can ignore the regions of the frames 170 that are indicated in the mask, thereby reducing overall processing applied to each frame 170 and improving computational efficiency. In some implementations, the mask is applied following the detection of points of interest 175 in a frame 170, such that any points of interest that correspond to coordinates that fall within a region indicated in the mask are filtered from the list of points of interest 175 associated with that frame 170, which are used in the further processing operations described herein.

The point mapper 140 can map the first set of points of interest 175 and the second set of points of interest 175 to a set of 3D points of interest in a 3D coordinate space based on correspondences between the first set of points of interest and the second set of points of interest. As described herein, each of the capture devices 120 has a respective pose in a 3D space and is generally stationary while capturing the frames 170. Using the known pose information for two capture devices 120 capturing an overlapping environment at the same time, the point mapper 140 can map one or more points of interest 175 identified in each frame 170 to a corresponding 3D point. To do so, the point mapper 140 can identify a list of corresponding points of interest 175 detected in a first frame captured by a first capture device 120 and a corresponding second frame captured by a second capture device 120 at substantially the same time. The set of 3D points can represent at least a portion of the object, such as one or more pixels of the frames 170 that correspond with a detected shape of the object.

Identifying point correspondences can include comparing a predetermined window between each point of interest detected in a first frame and each point of interest detected in a second frame. In some implementations, the point mapper 140 may utilize one or more constraints on correspondence mapping. For example, the point mapper 140 may only attempt to identify corresponding points of interest in similar positions in both frames captured by the separate capture devices. To identify a point correspondence, the point mapper 140 can compare the pixels in the predetermined region surrounding a point of interest 175 in a first frame 170 with a predetermined region surrounding a candidate point of interest in a second frame 170 and calculate a similarity score indicating the similarity between the two regions. If the score for the pair of points satisfies a threshold, the two points across both frames 170 can be considered corresponding points for the purposes of 3D mapping. If the score of the pair does not satisfy a threshold, the point mapper 140 can select a second candidate point in the second frame 170 captured by the second capture device 120 in accordance with any restrictions.

If the point mapper 140 fails to identify correspondences between a predetermined number of the points of interest 175 in a first frame 170 captured by a first capture device 120 and the points of interest 175 in the second frame captured by the second capture device 120, the point mapper 140 can relax any constraints by searching for candidate matches anywhere in the second frame. In some implementations, identifying corresponding points can be performed using a fitting algorithm, such as a random sample consensus (RANSAC) algorithm. Points that are co-registered with one another using the fitting algorithm are stored as corresponding points of interest 175. The correspondences between the points of interest 175 detected in the first frame 170 captured by the first capture device 120 and the points of interest 175 detected in the second frame 170 captured by the second capture device 120 can be used to map each set of points of interest 175 to a 3D coordinate space.

Because the rotation and position of each capture device 120 are known at least relative to each other, the point mapper 140 can determine a location for a 3D point for each point correspondence identified between the points of interest 175 captured by the first capture device 120 and the points of interest 175 captured by the second capture device. In particular, the point mapper 140 can identify the location of a first point of interest 175 of a point correspondence within the field of view of the first capture device 120. Because the direction and position of the first capture device 120 are known in the 3D coordinate space, in some implementations, the field of view of the first capture device can itself be represented in the 3D coordinate space. In addition, the field of view of a second capture device 120 can be represented in the 3D coordinate space. By using epipolar geometry, and by matching the corresponding points of interest 175 between in the first frame 170 from the first capture device 120 and the second frame 170 from the second capture device 120, the 3D location of each correspondence can be mapped to a 3D coordinate space.

Because each 3D point is determined from a point correspondence, differences in position in the point correspondences over time can be translated into corresponding changes in 3D position in the 3D coordinate space. The displacement determiner 145 can determine a 3D displacement of a subset of the plurality of 3D points based on the first sequence of frames and the second sequence of frames. For example, as a dynamic object moves in the field of view of each of the first capture device 120 and the second capture device 120, the movement of the dynamic object is captured chronologically across a sequence of frames by each capture device 120. The points of interest 175 that correspond to the dynamic object as represented in each sequence also change in coordinates over time and are tracked by the point tracker 135 as described herein.

As each point of interest 175 changes in position over time, the point mapper 140 can map changes in position of the corresponding 3D point of interest in the 3D coordinate space. Therefore, the displacement determiner 145 can iteratively (e.g., each time new frames are captured by the first and second capture devices) determine changes in position of each tracked 3D point in the 3D coordinate space. These changes in position can be stored in association with any relevant data for further processing, including identifiers of frames 170 from which the 3D points of interest were determined, timestamps, identifiers of individual points of interest 175 in corresponding frames 170, or identifiers of point correspondences identified by the point tracker 135. The subset of the 3D points of interest can be the points of interest in the sequences of frames that have a displacement that exceeds a displacement amount threshold, suggesting that the 3D points of interest represent a dynamic object. In some implementations, the displacement determiner 145 can group subsets of the 3D points of interest mapped from the sequences of frames 170 based on average velocity and proximity. For example, if a group of 3D points of interest are close to one another in the 3D coordinate space and exhibit a similar displacement over time, the displacement determiner 145 can group these 3D points of interest as a subset (e.g., by storing them in a data structure of variable size, etc.).

Figure 3B:
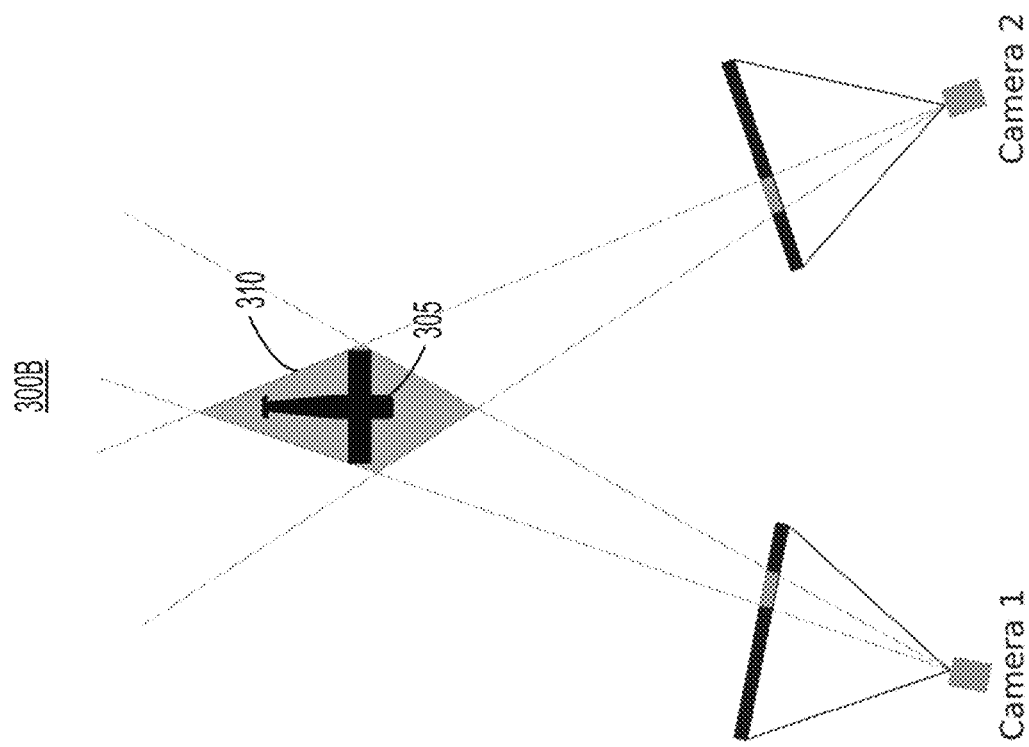
FIGS. 3A and 3B illustrate a stereo-camera arrangement used to determine a dynamic object volume, in accordance with one or more implementations.
Figure 3A:
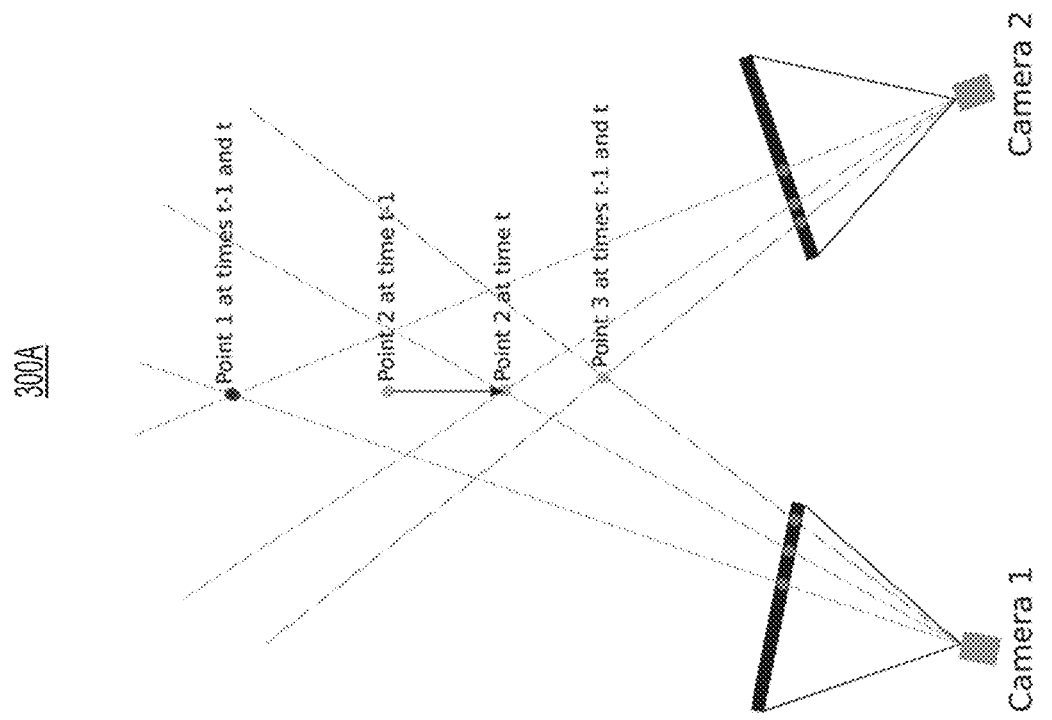

An example of a determination of a displacement of a 3D point of interest is shown in FIG. 3A. As shown in FIG. 3A, "camera 1" (e.g., a first capture device 120) and "camera 2) (e.g., a second capture device 120) capture two frames in their respective field of views. In FIG. 3A, each of "point 1" (e.g., a 3D point of interest) and "point 2" (e.g., a second point of interest) remain stationary relative to the capture devices at times t−1 and t. The difference between times t−1 and t can correspond to any amount of time, including, for example, the time between two consecutive frames, or the time between more than two consecutive frames, among other periods of time. However, in contrast, "point 2" (e.g., a 3D point of interest corresponding to a dynamic object) does not remain stationary during the time period between t−1 and t. Instead, point 2 moves towards each of the capture devices, which respectively capture the movement of point 2 in their respective fields of view, as shown. The node computing system in communication with the cameras shown in FIG. 3A can track the position of point 2 over time in the 3D coordinate space, as described herein.

Referring back now to FIG. 1, in some implementations, the displacement determiner 145 can determine that the subset of the plurality of 3D points corresponds to a dynamic object. A dynamic object is any object that moves relative to its environment. Examples of dynamic objects can include, for example, aircraft, birds, autonomous aerial vehicles, or other moving aerial objects. As described above, the displacement determiner 145 can determine the displacement of the 3D points of interest mapped from the sequences of frames captured by the capture devices 120. In addition, the displacement determiner 145 can identify subsets of 3D points of interest that have similar displacements and that are proximate to one another and group these 3D points of interest into subsets. In some implementations, the displacement determiner 145 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold.

Once the 3D displacement of the subset of the 3D points of interest has been determined to satisfy the displacement threshold, the volume generator 150 can generate a volume surrounding the subset of the 3D points of interest. The volume generator 150 can generate the volume based on a first frame in the sequence of frames captured by the first capture device 120, and a corresponding second frame in the sequence of frames captured by the second capture device 120. To do so, the volume generator 150 can regress a bounding box around the pixels in the first frame to which the subset of the 3D points of interest correspond. An example of a bounding box regression is shown in FIG. 4.

Figure 4:
FIG. 4 illustrates the detection of a dynamic object in a frame captured by a capture device, in accordance with one or more implementations.

Referring briefly now to FIG. 4, depicted is an example frame showing a bounding box regression around a dynamic object depicted in the frame. In this example, the dynamic object is an aircraft flying in the top portion of the frame 400. As shown, after the application of a bounding box regression technique, the bounding region 405 has been regressed around the pixels in frame 400 that represent the aircraft. In some implementations, the frame 400 shown in FIG. 4 can be used as part of a training data set to train a bounding box regression model, which can be trained to regress bounding boxes around dynamic objects depicts in frames 175.

Referring back now to FIG. 1, the volume generator 150 can generate the 3D volume for a dynamic object based on the bounding regions regressed around the dynamic object in each frame 170. In doing so, the volume generator can detect a first bounding region for the subset of the plurality of 3D points as represented in the first frame 170 using, for example, a bounding box regression model. The bounding box regression model can be a machine-learning model that is trained using backpropagation techniques. For example, the bounding box regression model can be a convolutional neural network trained on labeled training data (e.g., images having known bounding regions). Backpropagation includes modifying the weights and biases of the bounding box regression model based on the determined error between the output of the model and the label of the item of training data, when the item of training data is provided as input to the bounding box regression model. In some implementations, the volume generator 150 can train the bounding box regression model using many sets of labeled training images, thereby training the bounding box regression model to regress bounding boxes that surround aerial objects of interest, such as airplanes, helicopters, drones, or other dynamic aerial objects.

To generate a 3D volume that surrounds a dynamic object (e.g., the subset of 3D points that correspond to the dynamic object), the volume generator 150 can use the bounding regions regressed around a first frame captured by the first capture device 120 and a corresponding second frame captured by the second capture device. First, the volume generator 150 can detect a first bounding region that surrounds the dynamic object in the first frame and a second bounding region that surrounds the dynamic object in the second frame (which depicts the same dynamic object at the same time, but from a different perspective, or pose). The bounding regions can be detected using the bounding box regression model, as described herein.

The volume generator 150 can then map each of the detected bounding regions to the 3D coordinate space, such that each bounding box represents a rectangular prism that extends outward from the front of each capture device 120. An example representation of this mapping is shown in FIG. 3B. As shown in FIG. 3B, the "camera 1" (e.g., the first capture device 120) and the "camera 2" (e.g., the second capture device 120) each capture the dynamic object 305 at the same time but from different perspectives. The bounding regions surrounding the dynamic object are represented as light gray bars in the field of view of each capture device 120. To determine the boundaries of the 3D volume, a four-sided pyramid can be generated in the 3D coordinate space, such that the top point of the 3D pyramid begins at the focal point of the respective capture device, and the four sides of the pyramid shape are the four sides of the bounding region. Other shapes for the base of the pyramid can be generated if different bounding region shapes are used. This is shown in FIG. 3B as the top view 300B, which appears two-dimensional, for simplicity of representation. The volume in which each of the 3D pyramids intersect in the 3D coordinate space can be the 3D volume 310 generated that surrounds the dynamic object, as shown.

Referring back now to FIG. 1, the volume generator 150 can generate the 3D volume by identifying the overlapping portion of each pyramid shape in the 3D coordinate space. In some implementations, each dimension of the 3D volume can be determined based on the size of each bounding region in each frame. For example, the width and height of one bounding region can be used to determine the width and height of one face of the 3D volume that surrounds the dynamic object, and the other bounding region can be used to determine another face of the 3D volume. If there are inconsistences between the two faces, the volume generator 150 can resolve the difference based on one or more policies. For example, if the heights of each face are different, the volume generator 150 may determine the average of the heights, and use the average height value as the height of the bounding region. In some implementations, the volume generator 150 may select one height value or the other (e.g., select the largest height value, select the smallest height value, etc.). Once the dimensions of the two adjacent faces of the 3D volume are determined (in FIG. 3B, these faces would be the two edges of the 3D volume that are closest to each respective capture device), the volume generator 150 can determine the dimensions of the remaining faces of the 3D volume 180 through an induction process. For example, the volume generator 150 may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

Once the 3D volume 180 is generated, it can be stored in association with one or more data structures in the storage 115. The 3D volume 180 can be stored, for example, in association with any related data described herein, including the respective subset of 3D points of interest, each frame 170 used to generate the 3D volume, or any other relevant data. The 3D volume 180 data can be used, as described in greater detail herein, to classify the dynamic object, or to determine a predicted trajectory for the dynamic object in the 3D coordinate space. As described in greater detail herein below, the classification of the dynamic object can be determined, for example, based on the size of one or more faces of the 3D volume, by using a classification model, or a combination thereof.

Figure 5:
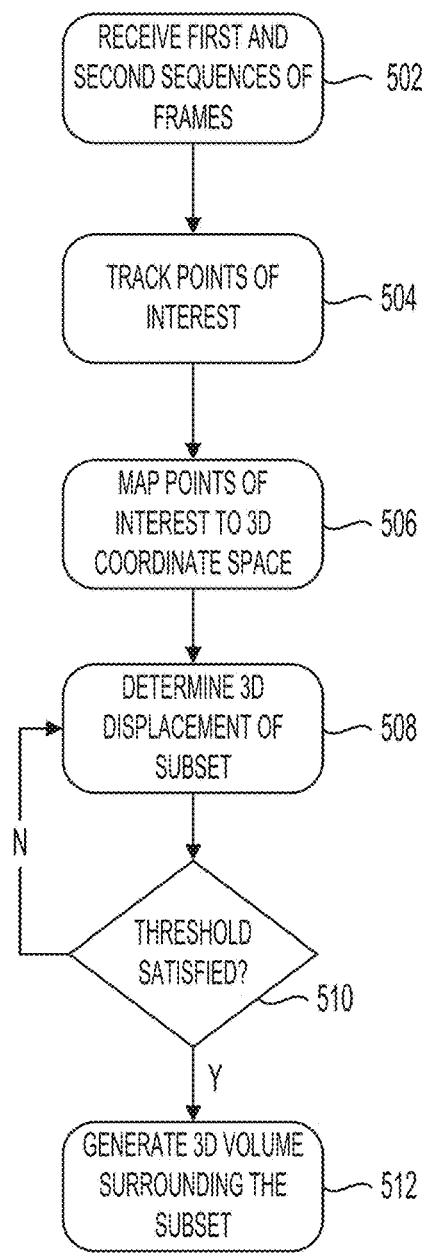
FIG. 5 illustrates an example flow diagram of a method for detecting dynamic objects using a mesh network of nodes coupled to cameras, in accordance with one or more implementations.

Referring now to FIG. 5, depicted is an illustrative flow diagram of a method 500 for detecting dynamic objects using a mesh network of nodes coupled to cameras. The method 500 can be executed, performed, or otherwise carried out by the node computing system 105, the computer system 2000 described herein in conjunction with FIGS. 20A and 20B, or any other computing devices described herein. In brief overview, the node computing system (e.g., the node computing system 105, etc.) can receive the first and second sequences of frames (STEP 502), track the points of interest (STEP 504), map the points of interest to a 3D coordinate space (STEP 506), determine a 3D displacement of a subset of the 3D points of interest (STEP 508), determine whether a displacement threshold is satisfied by the 3D displacement (STEP 510), and generate a 3D volume surrounding the subset of the points of interest (STEP 512).

In further detail, the node computing system can receive the first and second sequences of frames (STEP 502). The node computing system can receive a first sequence of frames (e.g., the frames 170) captured by a first capture device (e.g., a capture device 120) having a first pose and a second sequence of frames captured by a second capture device having a second pose. As described herein, the pose of each capture device in communication with the node computing system 105 can be stored in association with an identifier of the respective capture device, and the frames captured by the respective capture device, in the storage of the node computing system. The sequences of frames can be any number of frames. In some implementations, two corresponding frames can each be captured and provided by the capture devices in communication with the node computing system before the next frame in the sequence is retrieved, thereby synchronizing each sequence of frames captured by the capture devices. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track the points of interest (e.g., the points of interest 175) (STEP 504). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

In some implementations, tracking the points of interest across the sequences of frames can utilize a first mask applied to each of the first sequence of frames and a second mask applied to each of the second sequence of frames. In some circumstances, a capture device may be positioned such that the frames captured by the capture device include portions that cannot depict, or are very unlikely to depict, dynamic objects of interest (e.g., aircraft, birds, other aerial objects, etc.). For example, a capture device may partially capture the ground as part of its field of view, even though portions of the ground cannot depict aerial vehicles or aerial objects of interest. To improve processing efficiency, the node computing system can forego processing these regions of the frames by applying a mask that is generated based on the field-of-view of the respective capture device. The mask can eliminate portions of a frame by indicating that points of interest are not present in the indicated portions. The point of interest detection techniques described herein can ignore the regions of the frames that are indicated in the mask, thereby reducing overall processing applied to each frame and improving computational efficiency. In some implementations, the mask is applied following the detection of points of interest in a frame, such that any points of interest that correspond to coordinates that fall within a region indicated in the mask are filtered from the list of points of interest associated with that frame, which are used in the further processing operations described herein.

The node computing system can map the points of interest to a 3D coordinate space (STEP 506). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, identifying corresponding points can be performed using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can determine a 3D displacement of a subset of the 3D points of interest (STEP 508). Because each 3D point is determined from a point correspondence, differences in position in the point correspondences over time can be translated into corresponding changes in 3D position in the 3D coordinate space. The node computing system can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein.

As each point of interest changes in position over time, the point mapper can map changes in position of the corresponding 3D point of interest in the 3D coordinate space. Therefore, the node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

The node computing system can determine whether a displacement threshold is satisfied by the 3D displacement (STEP 510). As described above, the node computing system can determine the displacement of the 3D points of interest mapped from the sequences of frames captured by the capture devices. In addition, the node computing system can identify subsets of 3D points of interest that have similar displacements and that are proximate to one another and group these 3D points of interest into subsets. In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. If the threshold has been satisfied, the node computing system can execute STEP 512. If the threshold has not been satisfied, the node computing system can continue to determine the 3D displacement based on subsequently captured frames in STEP 508.

The node computing system can generate a 3D volume surrounding the subset of the points of interest (STEP 512). The node computing system can generate the volume based on a first frame in the sequence of frames captured by the first capture device, and a corresponding second frame in the sequence of frames captured by the second capture device. To do so, the volume determiner can regress a bounding box around the pixels in the first frame to which the subset of the 3D points of interest correspond. To generate a 3D volume that surrounds a dynamic object (e.g., the subset of 3D points that correspond to the dynamic object), the node computing system can use the bounding regions regressed around a first frame captured by the first capture device and a corresponding second frame captured by the second capture device. First, the node computing system can detect a first bounding region that surrounds the dynamic object in the first frame and a second bounding region that surrounds the dynamic object in the second frame (which depicts the same dynamic object at the same time, but from a different perspective, or pose). The bounding regions can be detected using the bounding box regression model, as described herein.

The node computing system can then map each of the detected bounding regions to the 3D coordinate space, such that each bounding box represents a rectangular prism that extends outward from the front of each capture device. The node computing system can generate the 3D volume by identifying the overlapping portion of each pyramid shape in the 3D coordinate space. In some implementations, each dimension of the 3D volume can be determined based on the size of each bounding region in each frame. For example, the width and height of one bounding region can be used to determine the width and height of one face of the 3D volume that surrounds the dynamic object, and the other bounding region can be used to determine another face of the 3D volume. If there are inconsistences between the two faces, the node computing system can resolve the difference based on one or more policies. For example, if the heights of each face are different, the node computing system may determine the average of the heights, and use the average height value as the height of the bounding region. In some implementations, the node computing system may select one height value or the other (e.g., select the largest height value, select the smallest height value, etc.). Once the dimensions of the two adjacent faces of the 3D volume are determined (in FIG. 3B, these faces would be the two edges of the 3D volume that are closest to each respective capture device), the node computing system can determine the dimensions of the remaining faces of the 3D volume through an induction process. For example, the node computing system may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

Once the 3D volume is generated, it can be stored in association with one or more data structures in the storage of the node computing system. The 3D volume can be stored, for example, in association with any related data described herein, including the respective subset of 3D points of interest, each frame used to generate the 3D volume, or any other relevant data. The 3D volume data can be used, as described in greater detail herein, to classify the dynamic object, or to determine a predicted trajectory for the dynamic object in the 3D coordinate space. As described in greater detail herein below, the classification of the dynamic object can be determined, for example, based on the size of one or more faces of the 3D volume, by using a classification model, or a combination thereof.

B. Detecting, Tracking, and Maintaining a Registry of Objects in a Sensing Volume Detecting unauthorized or unknown aircraft is important to the security of sensing volumes. In general, sensing volumes are predetermined volumes of space that may be occupied by aerial vehicles or other aircraft, such as airplanes, helicopters, or drones, among others. The systems and methods of this technical solution provide techniques to utilize a mesh network of nodes that are each in communication with at least two capture devices. Each node can monitor a portion of the sensing volume using the dynamic object tracking techniques described herein. In addition, each of the nodes in the mesh network can communicate information with one another regarding the detection and tracking of dynamic objects across the sensing volume.

For example, a first node can detect a flying aircraft independently, or cued by a second node in the mesh network that predicts and communicates that the flying aircraft detected will potentially appear in other nodes in the mesh. The predictions can be probabilistic in nature and can be time-based. In some implementations, the first node can dedicate more resources to re-detect the flying aircraft and to assign the same identification number to the aircraft. In addition, the second node can carry out a fusion process, in which location, velocity, appearance, area, and volume are used to determine whether an aircraft detected by the first node corresponds to an aircraft pre-detected by other nodes in the mesh network. These and other features of the mesh network are described herein in greater detail below.

Figure 6:
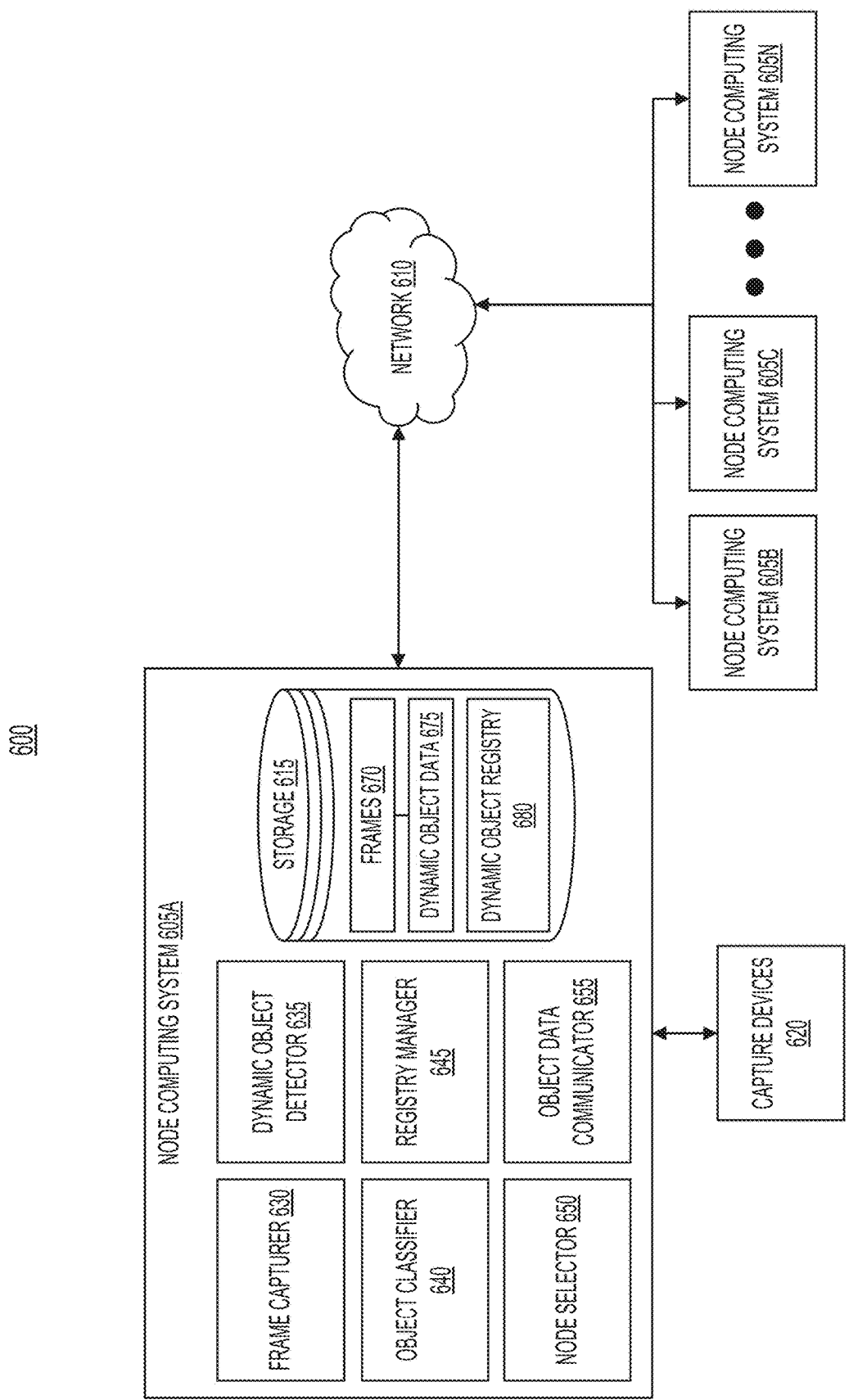
FIG. 6 illustrates a block diagram of an example system for detecting, tracking, and maintaining a registry of objects in a sensing volume, in accordance with one or more implementations.

Referring now to FIG. 6, illustrated is a block diagram of an example system 600 for detecting, tracking, and maintaining a registry of objects in a sensing volume, in accordance with one or more implementations. The system 600 can include one or more node computing systems 605A-605N (sometimes generally referred to herein as node computing system(s) 605), and at least one network 610. Each node computing system 605 can be in communication with one or more capture devices 620. Each node computing system 605 can include at least one frame capturer 630, at least one dynamic object detector 635, at least one object classifier 640, at least one registry manager 645, at least one node selector 650, at least one object data communicator 655, and at least one storage 615. The storage 615 can store one or more frames 670 (sometimes referred to as one or more sequence(s) of frames 670), dynamic object data 675, and a dynamic object registry 680. In some implementations, the storage 615 can be external to the node computing system 605, for example, as part of one or more servers or other computing devices in communication with the node computing system 605 via the network 610.

Each of the node computing systems 605, the capture devices 620, the network 110, the storage 615, the frame capturer 630, the dynamic object detector 635, the object classifier 640, the registry manager 645, the node selector 650, and the object data communicator 655 of the system 600, can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 605 can include any of the functionality of the node computing systems 105, the node computing systems 905, the node computing systems 1105, the node computing systems 1305, the node computing systems 1505, and the node computing systems 1805, described herein in connection with FIGS. 1, 9, 11, 13, 15, and 18, respectively. Each of the components of the node computing system 605 can perform the functionalities detailed herein.

The node computing system 605 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 605 can include one or more computing devices or servers that can perform various functions as described herein. The node computing system 605 can include any or all of the components and perform any or all of the functions of the computer system 2000 described herein in conjunction with FIGS. 20A and 20B.

The network 610 can include computer networks such as the Internet, local, wide, metro or other area networks, intranets, satellite networks, other computer networks such as voice or data mobile phone communication networks, radio communication interfaces, and combinations thereof. The node computing system 605A of the system 600 can communicate via the network 610, for instance with at least one other node computing system 605B-605N. The network 610 may be any form of computer network that can relay information between the node computing system 605A, the node computing systems 605B-605N, and one or more other computing systems, such as a flight computing system or another remote server in communication with the node computing systems 605.

In some implementations, the network 610 may include the Internet and/or other types of data networks, such as a LAN, a WAN, a cellular network, a satellite network, or other types of data networks. The network 610 may also include any number of computing devices (e.g., computers, servers, routers, network switches, etc.) that are configured to receive and/or transmit data within the network 610. The network 610 may further include any number of hardwired and/or wireless connections. Any or all of the computing devices described herein (e.g., the node computing system 605, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 610. Any or all of the computing devices described herein (e.g., the node computing system 605, the computer system 2000, etc.) may also communicate wirelessly with the computing devices of the network 610 via a proxy device (e.g., a router, network switch, or gateway).

The storage 615 can be a database configured to store and/or maintain any of the information described herein. The storage 615 can maintain one or more data structures, which may contain, index, or otherwise store each of the values, pluralities, sets, variables, vectors, thresholds, or other data used in the processing operations described herein. The storage 615 can be accessed using one or more memory addresses, index values, or identifiers of any item, structure, or region maintained in the storage 615. The storage 615 can be accessed by the components of the node computing system 605, or any other computing device described herein, via the network 610. In some implementations, the storage 615 can be internal to the node computing system 605. In some implementations, the storage 615 can exist external to the node computing system 605, and may be accessed via the network 610. The storage 615 can be distributed across many different computer systems or storage elements, and may be accessed via the network 610 or a suitable computer bus interface. The node computing system 605 can store, in one or more regions of the memory of the node computing system 605, or in the storage 615, the results of any or all computations, determinations, selections, identifications, generations, constructions, or calculations in one or more data structures indexed or identified with appropriate values.

The one or more capture devices 620 can be, for example, any sort of camera capable of capturing one or more frames 670. In some implementations, the capture device 620 is a video camera capable of producing a video stream. In some implementations, the capture device 620 is an image capture device that can capture images in response to a condition, such as a capture signal or on a predetermined periodic basis. In some implementations, the capture device 620 can be associated with a respective pose, which can be maintained by the node computing system 605 in communication with the capture device. In some implementations, each of the node computing systems 605A-605N can be in communication with at least two capture devices 620. Each of the at least two capture devices in communication with a node computing system 605 can have its own respective pose in a 3D space (e.g., positioned to capture a portion of a sensing volume, such as the sensing volume depicted in FIG. 7A or 7B).

A pose can be an absolute (or relative to a known frame of reference) position and rotation in a 3D space. The pose information for each capture device 620 in communication with a node computing system 605 can be used to perform various image analysis techniques described herein. Each of the capture devices 620 can capture one or more sequences of frames 670, which can be communicated to the node computing system 605 corresponding to the capture devices 620. The sequences of frames 670 can be stored, or otherwise maintained, in one or more data structures in the storage 615. Each frame 670 of the sequences of frames 670 can be identified by a respective frame identifier (e.g., a timestamp, a unique identifier, etc.), and a respective identifier of the capture device 620 that captured the respective frame. Said identifiers can be used to index or otherwise access particular frames for the processing operations described herein.

As shown, the storage 615 can store the frames 670 (sometimes referred to as sequence(s) of frames 670) in one or more data structures. Each of the frames 670 can be, for example, an image that is associated with a particular timestamp in a video stream captured from a video camera. In some implementations, each frame can itself be a still image captured by a corresponding capture device 620, for example, on a periodic basis. Each frame 670 can include pixels arranged in a grid that makes up the frame 670 (e.g., as an image), where each pixel includes color data and location data that identifies the color and location of the pixel in the frame 670. In some implementations, the capture device 620 can capture the frames 670 in one or more different color channels (e.g., each channel corresponding to a particular color wavelength). In some implementations, the image capture device 620 can be a camera or video capture device that captures non-visible light (e.g., infrared light, etc.). Each color channel in a pixel of a frame 670 can identify the intensity of a particular color of the pixel. These color intensity values (e.g., the color of each pixel in a frame 670, etc.) can be used in one or more point of interest detection techniques, as described herein. In some implementations, the capture devices 620 can be monochrome cameras that capture images or video streams that having a single intensity channel.

Each capture device 620 can be positioned (e.g., given a predetermined pose, etc.) such that the capture device 620 captures frames 670 that depict a portion of an environment of a predetermined sensing volume. An example of such sensing volume is shown in FIG. 7A. As shown in FIG. 7A, each of the node computing systems 605A and 605B (reference numbers of other node computing systems are omitted for clarity) include capture devices that view a corresponding portion of the sensing volume 705A and 705B, respectively. Collectively, each of the portions 705A and 705B form an entire sensing volume 705 that is monitored by all of the node computing systems in the mesh network. As shown, the node computing systems are connected in a start configuration. However, it should be understood that other networking configurations are possible to enable each of the node computing systems 605 to communicate with one another. For example, the node computing systems 605 can be arranged in a hybrid topology, a bus topology, a ring topology, a tree topology, a fully-connected mesh topology, or any other type of network topology.

Referring back now to FIG. 6, the storage 615 can store the dynamic object data 675 in one or more data structures. In some implementations, the dynamic object data 675 can be stored in association with the frames 670 or the sequences of frames 670 from which the dynamic object data 675 was determined. The dynamic object data 675 can include any information about dynamic objects detected by the node computing system 605, including a dynamic object classification, a dynamic object speed, a location of the dynamic object in the sensing volume (e.g., in the 3D coordinate space), an identifier of the dynamic object, or other dynamic object data 675. The dynamic object data 675 can be a working region of memory used by the node computing system 605 to perform analysis on any dynamic objects detected in the frames 670. If a detected dynamic object is determined to be a previously unseen or unknown dynamic object, the corresponding dynamic object data 675 can be added to the dynamic object registry 680, which can be accessed by other node computing systems 605 when performing the analysis techniques described herein. Likewise, if the dynamic object data 675 is determined to correspond to an existing dynamic object in the dynamic object registry 680, the node computing system 605 can update the dynamic object registry 680 with new or updated information relating to the dynamic object, as described herein.

The storage 615 can store the dynamic object registry 680 in one or more data structures. In some implementations, the dynamic object registry 680 can be external to a node computing system 605, for example, in a remote network location accessible via the network 610 by each of the node computing systems 605. In some implementations, each of the node computing systems 605 maintains a local copy of the dynamic object registry 680 and updates the dynamic object registry 680 with new information received from other node computing systems 605 as described herein. The dynamic object registry 680 can include a list of dynamic objects, with each entry in the list of dynamic objects corresponding to a respective dynamic object detected by any of the node computing systems 605. In this way, the node computing systems 605 can maintain and access a stored record of each dynamic object that has been detected in the sensing volume.

Each entry in the dynamic object registry 680 can include any information about the dynamic object to which it corresponds, including a timestamp corresponding to when the dynamic object was last detected, an identifier of the last node computing system 605 that detected the dynamic object, a dynamic object classification, a 3D volume that was generated to surround the dynamic object (e.g., as described in section A), a predicted trajectory of the dynamic object, area of any detected bounding regions in the frames 670 that correspond to the dynamic object, average velocity of the dynamic object, location of the dynamic object in the sensing volume (e.g., the 3D coordinate space, etc.), or any other dynamic object information described herein. The node computing systems 605 can use the information in the dynamic object registry 280 to determine whether a dynamic object detected in the sequences of frames 670, as described herein, is a newly encountered dynamic object (e.g., a new aircraft flying in the sensing volume, etc.) or a dynamic object that has been previously encountered.

Referring now to the operations of the node computing system 605, the frame capturer 630 can capture a first sequence of frames 670 using a first capture device 620. As described herein, each node computing system 605 can be in communication with at least two capture devices 620, with each capture device 620 having a known pose in a 3D coordinate space that corresponds to the environment captured by the capture devices 620. The sequences of frames 670 can include any number of frames 670. In some implementations, two corresponding frames can each be captured and provided by a first capture device 620 and a second capture device 620 in communication with the node computing system 605 before the next frame 670 in the sequences are retrieved, thereby synchronizing each sequence of frames 670 captured by each capture device 620. Each of the frames 670 in each sequence of frames 670 can be consecutive frames 670 captured by a respective capture device 620. For example, the frames 670 can be consecutive frames captured as part of a video stream. In some implementations, the frames 670 can be consecutively captured images (e.g., images captured periodically at a predetermined time interval by the capture device). Upon receiving the frames 670, the frame capturer 630 can store each frame 670 in one or more data structures (e.g., a list, a queue, etc.) of frames corresponding to the capture device 620 used to capture the respective frame 670.

The dynamic object detector 635 can detect a first dynamic object represented in each frame of the first sequence of frames. In some implementations, the dynamic object detector can detect the dynamic object based on a second sequence of frames captured by the second capture device 620 in communication with the node computing system 605. As detailed herein, detecting a dynamic object in the sequence of frames 670 can include tracking a set of points of interest in a first sequence of frames 670 captured by a first capture device 620 and a second set of points of interest in a second sequence of frames captured by a second capture device 620. The first and second sets of points of interest can each depict points of interest from the respective perspectives of each capture device 620. As described herein, each set of points of interest can be stored in a data structure, such as a list, which can be stored in association with the frame 670 in which the points were detected. In addition, the dynamic object detector 635 can track similar points of interest temporally as additional frames 670 are captured and provided as part of the sequence of frames 670.

To do so, the dynamic object detector 635 can identify parameter correspondences between the pixels (e.g., a predetermined window size) of a point of interest in one frame 670 and the pixels (e.g., the predetermined window size) in a point of interest in a consecutive frame 670. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the dynamic object detector 635 and stored in association with a timestamp of each frame and the identifier of the point of interest.

In some implementations, tracking the first plurality of points of interest across the first sequence of frames and the second plurality of points of interest across the second sequence of frames may be further based on a first mask applied to the first sequence of frames and a second mask applied to the second sequence of frames. In some circumstances, a capture device 620 may be positioned such that the frames 670 captured by the capture device 620 include portions that cannot depict, or are very unlikely to depict, dynamic objects of interest (e.g., aircraft, birds, other aerial objects, etc.). For example, a capture device may partially capture the ground as part of its field of view, even though portions of the ground cannot depict aerial vehicles or aerial objects of interest. To improve processing efficiency, the dynamic object detector 635 can forego processing these regions of the frames 670 by applying a mask that is generated based on the field-of-view of the respective capture device 620. The mask can eliminate portions of a frame 670 by indicating that points of interest are not present in the indicated portions. The point of interest detection techniques described herein can ignore the regions of the frames 670 that are indicated in the mask, thereby reducing overall processing applied to each frame 670 and improving computational efficiency. In some implementations, the mask is applied following the detection of points of interest in a frame 670, such that any points of interest that correspond to coordinates that fall within a region indicated in the mask are filtered from the list of points of interest associated with that frame 670, which are used in the further processing operations described herein.

Detecting a dynamic object in the sequences of frames 670 can include mapping the first set of points of interest and the second set of points of interest to a set of 3D points of interest in a 3D coordinate space. As described herein, each of the capture devices 620 has a respective pose in a 3D space and is generally stationary while capturing the frames 670. Using the known pose information for two capture devices 670 capturing an overlapping environment at the same time, the dynamic object detector 635 can map one or more points of interest identified in each frame 670 to a corresponding 3D point of interest in the 3D coordinate space. To do so, the dynamic object detector 635 can identify a list of corresponding points of interest detected in a first frame captured by a first capture device 620 and a corresponding second frame captured by a second capture device 620 at substantially the same time. Identifying point correspondences can include comparing a predetermined window between each point of interest detected in a first frame 670 and each point of interest detected in a second frame 670.

In some implementations, the dynamic object detector 635 may utilize one or more constraints on correspondence mapping. For example, the dynamic object detector 635 may only attempt to identify corresponding points of interest in similar positions in both frames captured by the separate capture devices. To identify a point correspondence, the dynamic object detector 635 can compare the pixels in the predetermined region surrounding a point of interest in a first frame 670 with a predetermined region surrounding a candidate point of interest in a second frame 670 and calculate a similarity score indicating the similarity between the two regions. If the score for the pair of points satisfies a threshold, the two points across both frames 670 can be considered corresponding points for the purposes of 3D mapping. If the score of the pair does not satisfy a threshold, the dynamic object detector 635 can select a second candidate point in the second frame 670 captured by the second capture device 620 in accordance with any restrictions.

If the dynamic object detector 635 fails to identify correspondences between a predetermined number of the points of interest in a first frame 670 captured by a first capture device 620 and the points of interest in the second frame 670 captured by the second capture device 620, the dynamic object detector 635 can relax any constraints by searching for candidate matches anywhere in the second frame. In some implementations, corresponding points can be identified using a fitting algorithm, such as a RANSAC algorithm. Points that are co-registered with one another using the fitting algorithm are stored as corresponding points of interest. The correspondences between the points of interest detected in the first frame 670 captured by the first capture device 620 and the points of interest detected in the second frame 670 captured by the second capture device 620 can be used to map each set of points of interest to a 3D coordinate space. Because the rotation and position of the first capture device 620 and the second capture device 620 are known in the 3D coordinate space, in some implementations, the fields of view of the first capture device and the second capture device 620 can be represented in the 3D coordinate space. By using epipolar geometry, and by matching the corresponding points of interest between the first frame 670 from the first capture device 620 and the second frame 670 from the second capture device 620, the 3D location of each correspondence can be mapped to a 3D coordinate space.

Detecting the first dynamic object can be based on movement of a subset of the 3D points in the 3D coordinate space. Because each 3D point is determined from a point correspondence, differences in position in the point correspondences over time can be translated into corresponding changes in 3D position in the 3D coordinate space. The dynamic object detector 635 can determine a 3D displacement of a subset of the plurality of 3D points based on the first sequence of frames and the second sequence of frames. For example, as a dynamic object moves in the field of view of each of the first capture device 620 and the second capture device 620, the movement of the dynamic object is captured chronologically across a sequence of frames by each capture device 620. The points of interest that correspond to the dynamic object as represented in each sequence also change in coordinates over time and are tracked by the dynamic object detector 635 as described herein. As each point of interest changes in position over time, the dynamic object detector 635 can map changes in position of the corresponding 3D point of interest in the 3D coordinate space.

The dynamic object detector 635 can iteratively (e.g., each time new frames are captured by the first and second capture devices) determine changes in position of each tracked 3D point in the 3D coordinate space. These changes in position can be stored in association with any relevant data for further processing, including identifiers of frames 670 from which the 3D points of interest were determined, timestamps, identifiers of individual points of interest in corresponding frames 670, or identifiers of point correspondences identified by the dynamic object detector 635. The subset of the 3D points of interest can be the points of interest in the sequences of frames that have a displacement that exceeds a displacement amount threshold, suggesting that the 3D points of interest represent a dynamic object. In some implementations, the dynamic object detector 635 can group subsets of the 3D points of interest mapped from the sequences of frames 670 based on average velocity and proximity. For example, if a group of 3D points of interest are close to one another in the 3D coordinate space, and exhibit a similar displacement over time, the dynamic object detector 635 can group these 3D points of interest as a subset (e.g., by storing them in a data structure of variable size, etc.).

In some implementations, the dynamic object detector 635 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The object classifier 640 can determine a classification of a detected dynamic object and a movement profile for the detected dynamic object based on the first sequence of frames. The classification of the dynamic object can be determined based on, for example, the size of the dynamic object as represented by the first sequence of frames captured by the first capture device 620 or the second sequence of frames captured by the second capture device 620. For example, upon determining the presence of a dynamic object in one or more of the frames 670 (e.g., based on the 3D displacement of 3D points of interest), the object detector can provide the frames 670 from a sequence of frames into a classification model. The classification model can be, for example, any type of neural network model capable of classifying objects detected in images. The classification model can be a trained model, such as a convolutional neural network model that is trained on sets of labeled training images that depict dynamic objects of interest. The dynamic objects of interest depicted and labeled in the training images can be, for example, airplanes, helicopters, drones, or any other type of relevant flying object. The classification model can be trained, for example, using backpropagation techniques, in which a training image is applied to and propagated through the classification model, and the output is compared to the label assigned to the item of training data. The difference between the output of the model and the label assigned to the training data can be propagated through the layers of the convolutional network model, and the weights and biases of each layer can be modified based on backpropagation techniques. Other training techniques can also be used to train the classification model, such as unsupervised learning techniques or semi-supervised learning techniques.

In some implementations, the object classifier 640 can train the model using the training data. In some other implementations, the classification model can be trained in an offline process, and subsequently provided to and executed by the object classifier 640 to classify dynamic objects in the training data. In some implementations, if two or more capture devices 620 are used to determine the presence of a dynamic object, the classification model can be provided with a first frame captured by the first capture device 620, and a second corresponding frame 670 (e.g., captured at the same time as the first frame 670) captured by the second capture device 620. If the classifications produced from each frame 670 match, the object classifier can determine that the classification of the dynamic object is the output of the classification model. If the classifications of each frame 670 do not match, then in some implementations the object classifier 640 may disregard or suppress the detection of the dynamic object in the sequences of frames 670 and perform no further processing for that dynamic object. In some implementations, when classifying a dynamic object, the object classifier 640 can generate a 3D volume that surrounds the dynamic object, as described in greater detail herein in Section A. In some implementations, classifying the dynamic object can include comparing the 3D volume to a predetermined 3D volume size (e.g., comparing overall volume in 3D coordinate space, or comparing the area of any face of the generated 3D volume to a predetermined area threshold, etc.). If the size of the 3D volume does not satisfy the predetermined size, the object classifier 640 can classify the dynamic object as "not interesting," or otherwise cease further processing on the dynamic object. If the size of the 3D volume does satisfy the predetermined size, the object classifier 640 can further classify the object as "of interest," and continue performing the processing operations described herein.

The movement profile of a detected dynamic object can be determined based on the velocity of the 3D points of interest that correspond to a dynamic object in the 3D coordinate space, and based on the classification of the dynamic object determined using the classification model. In general, the movement profile can include a predicted trajectory for the dynamic object, as well as average velocity values for the dynamic object in the 3D coordinate space that have already been tracked. To predict a trajectory for the dynamic object, the object classifier 640 may use the determined classification for the dynamic object to perform a lookup in a lookup table that includes a set of movement rules for various dynamic objects such as airplanes, helicopters, and drones. For example, airplanes are generally less maneuverable than helicopters or drones, and therefore the expected motion of an airplane may differ from other types of aerial vehicles. Using the rules in the lookup table, and the previous position and velocity values of the dynamic object determined by the dynamic object detector 635, the object classifier 640 can predict where in the 3D coordinate space the dynamic object is likely to travel over time. The classification information of the dynamic object and the movement profile of the dynamic object can be stored collectively with an identifier of the dynamic object as the dynamic object data 675. An example diagram showing this functionality is shown in FIG. 7B.

Referring briefly now to FIG. 7B, depicted is an example arrangement of a mesh network of nodes coupled to cameras detecting and tracking a dynamic object, in accordance with one or more implementations. As shown, the dynamic object 710 was captured by the capture devices in communication with the node computing system 605A at time t−1 and time t. In this case, the dynamic object 710 is classified by the node computing system 605A as an airplane. Because the dynamic object 710 is determined to be an airplane, the movement profile for the dynamic object 710 can be generally predicted to move forward, consistent with its previously observed pathway. In this example, the dynamic object 710 is captured in the field of view 705A as moving in a generally straight line. Therefore, using the information related to the classification of the dynamic object 710, and based on the tracked pathway of the dynamic object 710, the node computing system 605A can determine a predicted trajectory for the dynamic object 710 at time t+1, as shown. In addition, and as explained in further detail herein, the node computing system 605A can determine that the dynamic object 710 is likely to intersect with the sensing volume 705B, which is associated with the node computing system 605B, as shown. In such circumstances, the node computing system 605A can communicate the classification of the dynamic object 710 and the movement profile of the dynamic object 710 (which includes current and previous position data, velocity information, predicted trajectory, etc.) to the node computing system 605B. In other words, the node computing system 605A can determine one or more sensing volumes 705 that the dynamic object 710 is predict to intersect, identify (e.g., based on a lookup table, etc.) the node computing systems 605 responsible for monitoring said sensing volumes, and transmit the dynamic object data 675 related to the detected dynamic object 710 to those node computing systems 605.

Referring back now to FIG. 6, the registry manager 645 can store the classification and the movement profile of the dynamic object in the dynamic object registry 680 in association with an identifier of the detected dynamic object. In doing so, the registry manager 645 can determine whether the dynamic object has already been detected, for example, by another node computing system 605, or by the same node computing system 605A during a previous time period. To do so, the registry manager 645 can compare the dynamic object data 675 (e.g., the classification, the movement profile, etc.) of the dynamic object to each entry in the dynamic object registry 680. Each of the attributes of the dynamic object in the dynamic object data 675 (e.g., the movement profile including previous positions, current positions, velocity, and predicted trajectory, the classification of the dynamic object including the size of a 3D volume for the dynamic object, and the output of the classification model, etc.) can be compared to corresponding aspects of each entry in the dynamic object registry to determine a match score.

The match score can be calculated by comparing one or more attributes of the dynamic object data to each corresponding attribute for an entry in the dynamic object registry. In some implementations, if an attribute matches, a counter can be incremented by a predetermined weight value assigned to that attribute type. For example, the weight value for the classification of the dynamic object or the size of the 3D volume surrounding the dynamic object in the 3D coordinate space may be assigned larger weights than an average velocity of the dynamic object. The counter can be incremented each time an attribute matches, and can be incremented, for example, by the amount of the predetermined weight value assigned to each attribute. The total value of the counter can be the match score, which can be compared to a predetermined threshold. If the match score satisfies (e.g., is greater than, greater than or equal to, etc.) the predetermined threshold, the registry manager 645 can determine that the dynamic object is present in the dynamic object registry and update any attributes of the entry corresponding to the dynamic object with the new values detected by the node computing system 605. If the match score does not satisfy the threshold, a new entry in the dynamic object registry 680 and a new identifier for the dynamic object can be generated. The new entry can be stored in association with each of the attributes of the dynamic object data 675 for the dynamic object.

As briefly described above, if the movement profile for a detected dynamic object indicates that the dynamic object will likely intersect with another sensing volume monitored by another node computing system in the mesh network (e.g., any of the node computing systems 605B-605N, etc.), the dynamic object data 675 for the dynamic object can be transmitted to the corresponding node computing systems that monitor those sensing volumes. To do so, the node selector 650 can identify one or more sensing volumes that the dynamic object is predicted to intersect. The node selector 650 can identify these sensing volumes by comparing the predicted pathway of the dynamic object in the 3D coordinate space to the predetermined sensing volumes monitored by the other node computing systems 605 in the mesh network. If the dynamic object is predicted to intersect with one or more sensing volumes, the node selector can identify (e.g., based on a lookup table, etc.) the node computing systems 605 responsible for monitoring those sensing volumes. The node selector 650 can then select the identified node computing systems 605 to which the dynamic object data 675 will be transmitted.

Once the nodes have been selected, the object data communicator 655 can transmit dynamic object data 675 (e.g., including the classification and the movement profile of the dynamic object) to the selected node computing systems 605. Transmitting the dynamic object data 675 can include transmitting the unique identifier corresponding to the entry for the detected dynamic object in the dynamic object registry 680. In some implementations, the transmission can be accompanied by an expected location in the field of view of the node system that the detected object is likely to appear in (e.g., from the left, from the top, from the right, etc.).

The recipient node computing system can receive the dynamic object data 675 (e.g., including the classification, the movement profile, and any other information described herein, etc.) from the node computing system 605, and use the information to track and detect the dynamic object over time, and update the dynamic object registry 680 with any new or updated information. Doing so can alert the node computing system that a dynamic object is present in one or more sensing volumes of the mesh network, and cause the node computing system to begin monitoring its own sensing volume to detect the dynamic object. If a dynamic object is then detected by the node computing system, the dynamic object data 675 generated from the detection (e.g., as described herein above) can be compared to the received dynamic object data to determine whether there is a match (e.g., using the matching techniques described herein). This process can allow the node computing system to more quickly determine a matching dynamic object identifier, rather than scanning through all the recently detected objects in the dynamic object registry 680, thereby improving overall computation performance of the system.

If the dynamic object data 675 is a match to the received dynamic object data 675, the dynamic object data 675 can be assigned the same unique identifier and used to update the attributes of the dynamic object in the dynamic object registry 680 (e.g., using the dynamic object data 675 determined based on a sequence of frames captured by the capture device 620 of the node computing system). In doing so, the movement profile (e.g., including the tracked position over time of the dynamic object and the predicted trajectory of the dynamic object) can be updated in the dynamic object registry 680. As above, if the predicted trajectory for the dynamic object indicates it will intersect with another sensing volume, the updated dynamic object data 675 can be transmitted to the node computing systems that monitor the other sensing volume, as described herein.

Figure 8:
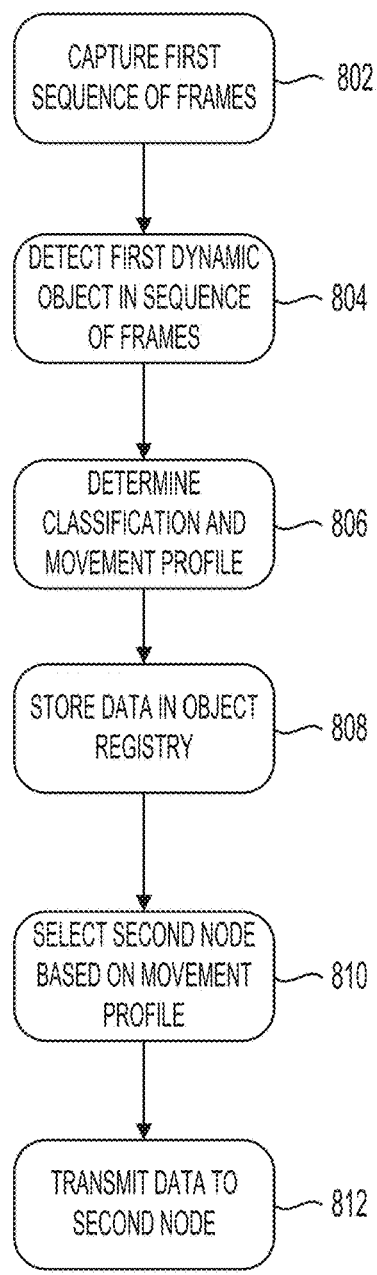
FIG. 8 illustrates an example flow diagram of a method for detecting, tracking, and maintaining a registry of objects in a sensing volume, in accordance with one or more implementations.

Referring now to FIG. 8, depicted is an illustrative flow diagram of a method 800 for detecting dynamic objects using a mesh network of nodes coupled to cameras. The method 800 can be executed, performed, or otherwise carried out by the node computing system 605, the computer system 2000 described herein in conjunction with FIGS. 20A and 20B, or any other computing devices described herein. In brief overview, the node computing system (e.g., the node computing system 605, etc.) can capture a first sequence of frames (STEP 802), detect a first dynamic object in the sequence(s) of frames (STEP 804), determine a classification and a movement profile for the dynamic object (STEP 806), store the dynamic object data (e.g., the dynamic object data 675) in a dynamic object registry (e.g., the dynamic object registry 680) (STEP 808), select a second node computing system based on the movement profile (STEP 810), and transmit the dynamic object data to the second node computing system (STEP 812).

In further detail, the node computing system (e.g., the node computing system 105, etc.) can capture a first sequence of frames (e.g., the frames 670) (STEP 802). As described herein, each node computing system can be in communication with at least two capture devices (e.g., the capture devices 620), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can detect a first dynamic object in the sequence(s) of frames (STEP 804). In some implementations, the node computing system can detect the dynamic object based on a second sequence of frames captured by the second capture device in communication with the node computing system. As detailed herein, detecting a dynamic object in the sequence of frames can include tracking a set of points of interest in a first sequence of frames captured by a first capture device and a second set of points of interest in a second sequence of frames captured by the second capture device. The first and second sets of points of interest can each depict points of interest from the respective perspectives of each capture device. As described herein, each set of points of interest can be stored in a data structure, such as a list, which can be stored in association with the frame in which the points were detected. In addition, the node computing system can track similar points of interest temporally as additional frames are captured and provided as part of the sequence of frames.

To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

In some implementations, tracking the first plurality of points of interest across the first sequence of frames and the second plurality of points of interest across the second sequence of frames may be further based on a first mask applied to the first sequence of frames and a second mask applied to the second sequence of frames. In some circumstances, a capture device may be positioned such that the frames captured by the capture device include portions that cannot depict, or are very unlikely to depict, dynamic objects of interest (e.g., aircraft, birds, other aerial objects, etc.). For example, a capture device may partially capture the ground as part of its field of view, even though portions of the ground cannot depict aerial vehicles or aerial objects of interest. To improve processing efficiency, the node computing system can forego processing these regions of the frames by applying a mask that is generated based on the field-of-view of the respective capture device. The mask can eliminate portions of a frame by indicating that points of interest are not present in the indicated portions. The point of interest detection techniques described herein can ignore the regions of the frames that are indicated in the mask, thereby reducing overall processing applied to each frame and improving computational efficiency. In some implementations, the mask is applied following the detection of points of interest in a frame, such that any points of interest that correspond to coordinates that fall within a region indicated in the mask are filtered from the list of points of interest associated with that frame, which are used in the further processing operations described herein.

Detecting a dynamic object in the sequences of frames can include mapping the first set of points of interest and the second set of points of interest to a set of 3D points of interest in a 3D coordinate space. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point of interest in the 3D coordinate space. To do so, the node computing system can identify a list of corresponding points of interest detected in a first frame captured by a first capture device and a corresponding second frame captured by a second capture device at substantially the same time. Identifying point correspondences can include comparing a predetermined window between each point of interest detected in a first frame and each point of interest detected in a second frame.

In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, identifying corresponding points can be identified using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space. Because the rotation and position of the first capture device and the second capture device are known in the 3D coordinate space, in some implementations, the fields of view of the first capture device and the second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

Detecting the first dynamic object can be based on movement of a subset of the 3D points in the 3D coordinate space. Because each 3D point is determined from a point correspondence, differences in position in the point correspondences over time can be translated into corresponding changes in 3D position in the 3D coordinate space. The node computing system can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein. As each point of interest changes in position over time, the node computing system can map changes in position of the corresponding 3D point of interest in the 3D coordinate space.

The node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The node computing system can determine a classification and a movement profile for the dynamic object (STEP 806). The node computing system can determine a classification of a detected dynamic object and a movement profile for the detected dynamic object based on the first sequence of frames. The classification of the dynamic object can be determined based on, for example, the size of the dynamic object as represented by the first sequence of frames captured by the first capture device or the second sequence of frames captured by the second capture device. For example, upon determining the presence of a dynamic object in one or more of the frames (e.g., based on the 3D displacement of 3D points of interest), the object detector can provide the frames from a sequence of frames into a classification model. The classification model can be, for example, any type of neural network model capable of classifying objects detected in images. The classification model can be a trained model, such as a convolutional neural network model that is trained on sets of labeled training images that depict dynamic objects of interest. The dynamic objects of interest depicted and labeled in the training images can be, for example, airplanes, helicopters, drones, or any other type of relevant flying object. The classification model can be trained, for example, using backpropagation techniques, in which a set of training images is applied to and propagated through the classification model, and the output is compared to the label assigned to the item of training data. The difference between the output of the model and the label assigned to the training data can be propagated through the layers of the convolutional network model, and the weights and biases of each layer can be modified based on backpropagation techniques. Other training techniques can also be used to train the classification model, such as unsupervised learning techniques or semi-supervised learning techniques.

In some implementations, the node computing system can train the model using the training data. In some other implementations, the classification model can be trained in an offline process, and subsequently provided to and executed by the node computing system to classify dynamic objects in the training data. In some implementations, if two or more capture devices are used to determine the presence of a dynamic object, the classification model can be provided with a first frame captured by the first capture device, and a second corresponding frame (e.g., captured at the same time as the first frame) captured by the second capture device. If the classifications produced from each frame match, the node computing system can determine that the classification of the dynamic object is the output of the classification model. If the classifications of each frame do not match, then in some implementations the node computing system may disregard or suppress the detection of the dynamic object in the sequences of frames and perform no further processing for that dynamic object. In some implementations, when classifying a dynamic object, the node computing system can generate a 3D volume that surrounds the dynamic object, as described in greater detail herein in Section A. In some implementations, classifying the dynamic object can include comparing the 3D volume to a predetermined 3D volume size (e.g., comparing overall volume in 3D coordinate space, or comparing the area of any face of the generated 3D volume to a predetermined area threshold, etc.). If the size of the 3D volume does not satisfy the predetermined size, the node computing system can classify the dynamic object as "ignore," or otherwise cease further processing on the dynamic object. If the size of the 3D volume does satisfy the predetermined size, the node computing system can further classify the object as "of interest," and continue performing the processing operations described herein.

The movement profile of a detected dynamic object can be determined based on the velocity of the 3D points of interest that correspond to a dynamic object in the 3D coordinate space, and based on the classification of the dynamic object determined using the classification model. In general, the movement profile can include a predicted trajectory for the dynamic object, as well as average velocity values for the dynamic object in the 3D coordinate space that have already been tracked. To predict a trajectory for the dynamic object, the node computing system may use the determined classification for the dynamic object to perform a lookup in a lookup table that includes a set of movement rules for various dynamic objects such as airplanes, helicopters, and drones. For example, airplanes are generally less maneuverable than helicopters or drones, and therefore the expected motion of an airplane may differ from other types of aerial vehicles. Using the rules in the lookup table, and the previous position and velocity values of the dynamic object determined by the node computing system, the node computing system can predict where in the 3D coordinate space the dynamic object is likely to travel over time. The classification information of the dynamic object and the movement profile of the dynamic object can be stored collectively with an identifier of the dynamic object.

The node computing system can store the dynamic object data (e.g., the dynamic object data 675) in a dynamic object registry (e.g., the dynamic object registry 680) (STEP 808). The node computing system can store the classification and the movement profile of the dynamic object in the dynamic object registry in association with an identifier of the detected dynamic object. In doing so, the node computing system can determine whether the dynamic object has already been detected, for example, by another node computing system, or by the same node computing system during a previous time period. To do so, the node computing system can compare the dynamic object data (e.g., the classification, the movement profile, etc.) of the dynamic object to each entry in the dynamic object registry. Each of the attributes of the dynamic object in the dynamic object data (e.g., the movement profile including previous positions, current positions, velocity, and predicted trajectory, the classification of the dynamic object including the size of a 3D volume for the dynamic object, and the output of the classification model, etc.) can be compared to corresponding aspects of each entry in the dynamic object registry to determine a match score.

The match score can be calculated by comparing one or more attributes of the dynamic object data to each corresponding attribute for an entry in the dynamic object registry. In some implementations, if an attribute matches, a counter can be incremented by a predetermined weight value assigned to that attribute type. For example, the weight value for the classification of the dynamic object or the size of the 3D volume surrounding the dynamic object in the 3D coordinate space may be assigned larger weights than an average velocity of the dynamic object. The counter can be incremented each time an attribute matches, and can be incremented, for example, by the amount of the predetermined weight value assigned to each attribute. The total value of the counter can be the match score, which can be compared to a predetermined threshold. If the match score satisfies (e.g., is greater than, greater than or equal to, etc.) the predetermined threshold, the node computing system can determine that the dynamic object is present in the dynamic object registry and update any attributes of the entry corresponding to the dynamic object with the new values detected by the node computing system. If the match score does not satisfy the threshold, a new entry in the dynamic object registry and a new identifier for the dynamic object can be generated. The new entry can be stored in association with each of the attributes of the dynamic object data for the dynamic object.

The node computing system can select a second node computing system based on the movement profile (STEP 810). If the movement profile for a detected dynamic object indicates that the dynamic object will likely intersect with another sensing volume monitored by another node computing system in the mesh network (e.g., any of the other node computing systems in the mesh network, etc.), the dynamic object data for the dynamic object can be transmitted to the corresponding node computing systems that monitor those sensing volumes. To do so, the node computing system can identify one or more sensing volumes that the dynamic object is predicted to intersect. The node computing system can identify these sensing volumes by comparing the predicted pathway of the dynamic object in the 3D coordinate space to the predetermined sensing volumes monitored by the other node computing systems in the mesh network. If the dynamic object is predicted to intersect with one or more sensing volumes, the node computing system can identify (e.g., based on a lookup table, etc.) the node computing systems responsible for monitoring those sensing volumes. The node computing system can then select the identified node computing systems to which the dynamic object data will be transmitted.

The node computing system can transmit the dynamic object data to the second node computing system (STEP 812). Once the nodes have been selected, the node computing system can transmit dynamic object data (e.g., including the classification and the movement profile of the dynamic object) to the selected node computing systems. Transmitting the dynamic object data can include transmitting the unique identifier corresponding to the entry for the detected dynamic object in the dynamic object registry. In some implementations, the transmission can be accompanied by an expected location in the field of view of the node computing system that the detected object is likely to appear in (e.g., from the left, from the top, from the right, etc.).

C. Generating a Mask for Point of Interest Detection when Tracking Sensing Volumes When performing the image analysis techniques described herein, it is useful to employ masks over regions of captured frames to improve computational performance of the system. For example, the computational performance of the system would be improved if regions of a captured frame that are very unlikely to depict a dynamic object (such as a portion of an image that depicts the ground or another static object) are ignored during image processing. However, because capture devices are deployed in a variety of locations that can depict irregular terrain or otherwise unpredictable obstacles, the use of predetermined regions often results in unintended results, such as portions of a frame that can depict dynamic objects being ignored during image processing.

The systems and methods of this technical solution provide techniques for generating a mask for point of interest detection when tracking sensing volumes. The mask can be applied to the frames captured by a capture device, such as a camera, to indicate regions of the frame that do not include any points of interest. To do so, the systems and methods described herein can analyze points of interest depicted in at least two sequences of frames and map the points of interest to a 3D coordinate space. Over time, the systems and methods described herein can monitor the 3D displacement of the points of interest to determine an average velocity of the points of interest in the 3D coordinate space.

If the average velocity of the 3D points of interest in particular portions of the field of view of each capture device do not satisfy a threshold, a mask can be generated for each capture device. The mask can occlude or otherwise cause the system to forgo processing on portions of frames that do not include any dynamic points of interest for long periods of time. In some implementations, the mask generation process can take place in response to a request, regenerated at predetermined intervals, or regenerated in response to a detected event. These and other features are described in greater detail herein below.

Figure 9:
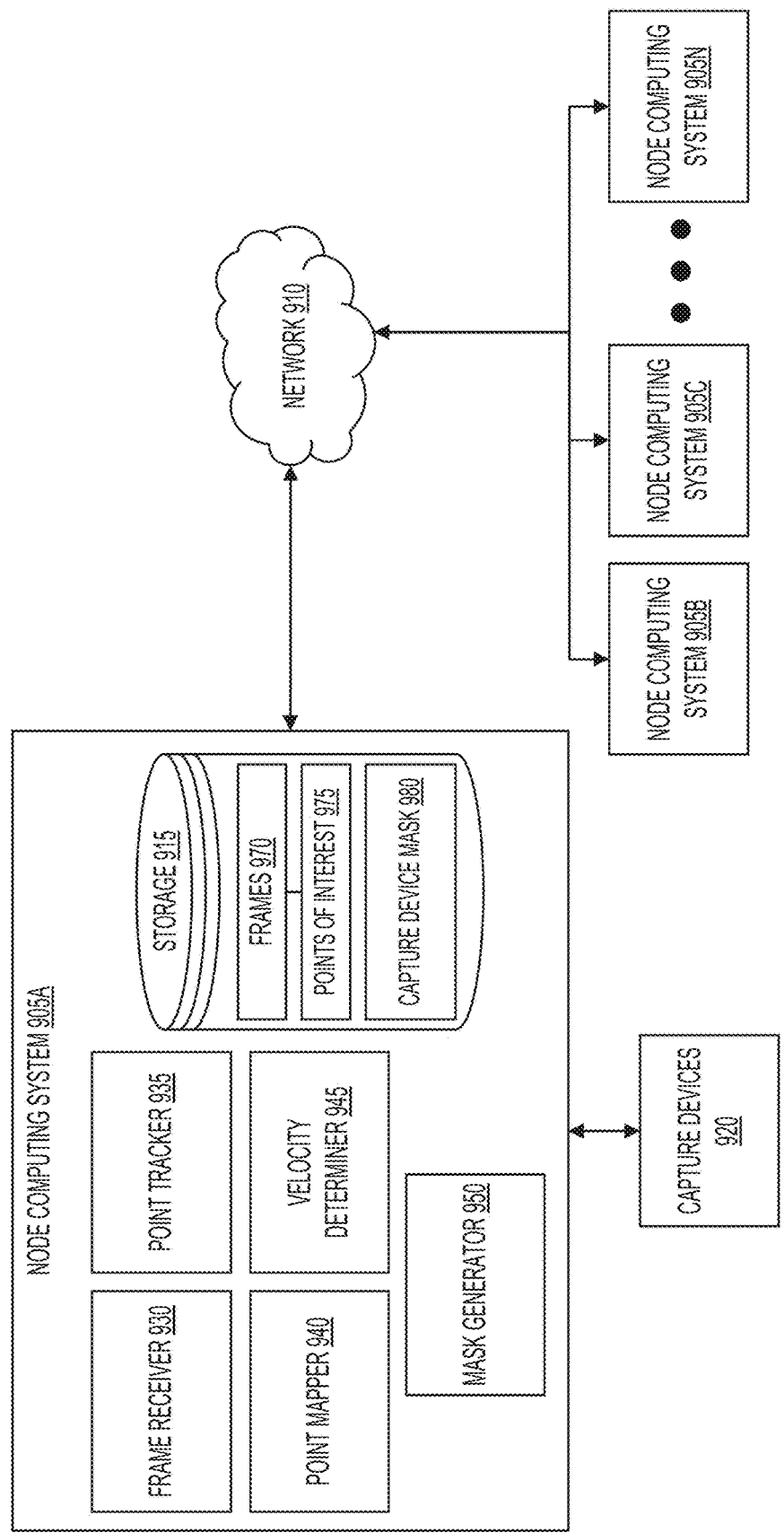
FIG. 9 illustrates a block diagram of an example system for generating a mask for point of interest detection when tracking sensing volumes, in accordance with one or more implementations.

Referring now to FIG. 9, illustrated is a block diagram of an example system 900 for detecting, tracking, and maintaining a registry of objects in a sensing volume, in accordance with one or more implementations. The system 900 can include one or more node computing systems 905A-905N (sometimes generally referred to herein as node computing system(s) 905), and at least one network 910. Each node computing system 905 can be in communication with one or more capture devices 920. Each node computing system 905 can include at least one frame receiver 930, at least one point tracker 935, at least one point mapper 940, at least one velocity determiner 945, at least one mask generator 950, and at least one storage 915. The storage 915 can store one or more frames 970 (sometimes referred to as one or more sequence(s) of frames 970), one or more points of interest 975, and one or more capture device masks 980. In some implementations, the storage 915 can be external to the node computing system 905, for example, as part of one or more servers or other computing devices in communication with the node computing system 905 via the network 910.

Each of the node computing systems 905, the capture devices 920, the network 910, the storage 915, the frame receiver 930, the point tracker 935, the point mapper 940, the velocity determiner 945, and the mask generator 950 of the system 900, can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 905 can include any of the functionality of the node computing systems 105, the node computing systems 605, the node computing systems 1105, the node computing systems 1305, the node computing systems 1505, and the node computing systems 1805, described herein in connection with FIGS. 1, 6, 11, 13, 15, and 18, respectively. Each of the components of the node computing system 905 can perform the functionalities detailed herein.

The node computing system 905 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 905 can include one or more computing devices or servers that can perform various functions as described herein. The node computing system 905 can include any or all of the components and perform any or all of the functions of the computer system 2000 described herein in conjunction with FIGS. 20A and 20B.

The network 910 can include computer networks such as the Internet, local, wide, metro or other area networks, intranets, satellite networks, other computer networks such as voice or data mobile phone communication networks, radio communication interfaces, and combinations thereof. The node computing system 905A of the system 900 can communicate via the network 910, for instance with at least one other node computing system 905B-905N. The network 910 may be any form of computer network that can relay information between the node computing system 905A, the node computing systems 905B-905N, and one or more other computing systems, such as a flight computing system or another remote server in communication with the node computing systems 905.

In some implementations, the network 910 may include the Internet and/or other types of data networks, such as a LAN, a WAN, a cellular network, a satellite network, or other types of data networks. The network 910 may also include any number of computing devices (e.g., computers, servers, routers, network switches, etc.) that are configured to receive and/or transmit data within the network 910. The network 910 may further include any number of hardwired and/or wireless connections. Any or all of the computing devices described herein (e.g., the node computing system 905, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 910. Any or all of the computing devices described herein (e.g., the node computing system 905, the computer system 2000, etc.) may also communicate wirelessly with the computing devices of the network 910 via a proxy device (e.g., a router, network switch, or gateway).

The storage 915 can be a database configured to store and/or maintain any of the information described herein. The storage 915 can maintain one or more data structures, which may contain, index, or otherwise store each of the values, pluralities, sets, variables, vectors, thresholds, or other data used in the processing operations described herein. The storage 915 can be accessed using one or more memory addresses, index values, or identifiers of any item, structure, or region maintained in the storage 915. The storage 915 can be accessed by the components of the node computing system 905, or any other computing device described herein, via the network 910. In some implementations, the storage 915 can be internal to the node computing system 905. In some implementations, the storage 915 can exist external to the node computing system 905, and may be accessed via the network 910. The storage 915 can be distributed across many different computer systems or storage elements, and may be accessed via the network 910 or a suitable computer bus interface. The node computing system 905 can store, in one or more regions of the memory of the node computing system 905, or in the storage 915, the results of any or all computations, determinations, selections, identifications, generations, constructions, or calculations in one or more data structures indexed or identified with appropriate values.

The one or more capture devices 920 can be, for example, any sort of camera capable of capturing one or more frames 970. In some implementations, the capture device 920 is a video camera capable of producing a video stream. In some implementations, the capture device 920 is an image capture device that can capture images in response to a condition, such as a capture signal or on a predetermined periodic basis. In some implementations, the capture device 920 can be associated with a respective pose, which can be maintained by the node computing system 905 in communication with the capture device. In some implementations, each of the node computing systems 905A-905N can be in communication with at least two capture devices 920. Each of the at least two capture devices in communication with a node computing system 905 can have its own respective pose in a 3D space (e.g., positioned to capture a portion of a sensing volume, such as the sensing volume depicted in FIG. 7A or 7B).

The storage 915 can store the frames 970 (sometimes referred to as sequence(s) of frames 970) in one or more data structures. Each of the frames 970 can be, for example, an image that is associated with a particular timestamp in a video stream captured from a video camera. In some implementations, each frame can itself be a still image captured by a corresponding capture device 920, for example, on a periodic basis. Each frame 970 can include pixels arranged in a grid that makes up the frame 970 (e.g., as an image), where each pixel includes color data and location data that identifies the color and location of the pixel in the frame 970. In some implementations, the capture device 920 can capture the frames 970 in one or more different color channels (e.g., each channel corresponding to a particular color wavelength). In some implementations, the image capture device 920 can be a camera or video capture device that captures non-visible light (e.g., infrared light, etc.). Each color channel in a pixel of a frame 970 can identify the intensity of a particular color of the pixel. These color intensity values (e.g., the color of each pixel in a frame 970, etc.) can be used in one or more point of interest detection techniques, as described herein. In some implementations, the capture devices 920 can be monochrome cameras that capture images or video streams that having a single intensity channel.

The storage 915 can store one or more sets of points of interest 975 in association with a respective sequence of frames 970 captured by a corresponding capture device 920. In other words, each of the capture devices 920 can be associated with a respective set of points of interest 975, which are detected and tracked across the sequences of frames 970 captured by the capture device 920. Each point of interest 975 can be a point in a frame 970 that is detected based on using a detection technique, such as a corner detection technique, an edge detection technique, a blob detection technique, a ridge detection technique, or other feature detection techniques. Each point of interest 975 can correspond to one or more pixel coordinates in a frame, and can include parameters that indicate an intensity of one or more pixels in a frame 970 that correspond to the point of interest. In some implementations, a point of interest 975 can be tracked across one or more sequences of frames 970.

For example, by performing a feature tracking technique, movement of points of interest 975 (e.g., changes in pixel coordinates across consecutive frames) can be calculated. Some examples of feature tracking techniques include, for example, a KLT feature tracker, or other point feature matching techniques. Each point of interest 975, including the parameters (e.g., pixel color values in a window, etc.) of each point of interest 975 and coordinates of each point of interest across frames, and amount of movement of the point of interest in the pixel coordinate space, can be stored in one or more data structures in the storage 915. The positions of the points of interest 975 between two sequences of frames 970 can be matched and used to map the points of interest into a 3D coordinate space. The movement of the 3D points of interest in the 3D coordinate space can be used to generate masks for the each respective capture device 920, as described herein.

The storage 915 can store one or more capture device masks 980, for example, in one or more data structures. The capture device masks 980 can be generated based on the average velocity of points of interest 975 depicted in a sequence of frames 970 and mapped to the 3D coordinate space. In general, a mask can be applied as a pre-processing operation to remove or otherwise occlude pixels in frames 970 captured by the capture device 920 associated with the respective capture device mask 980. Because some regions of pixels in a frame 970 captured by a capture device will be highly unlikely to depict points of interest that can correspond to a dynamic object (e.g., portions of a frame depicting the ground or other static objects close to the respective capture device 920, etc.), the mask can occlude or otherwise prevent the node computing system 905 (or its components) from processing said regions. In doing so, the application of a capture device mask 980 reduces the number of pixels that are processed by the components of the node computing system 905, thereby improving computational performance.

A captured device mask 980 can be, for example, a bitmap having a zero or a one entry for each pixel in a respective frame 970. The mask can be applied, for example, by performing a logical AND operation between the pixels of the respective frame 970 and the corresponding bits in the mask. Because a logical AND operation results in either a one if the bit of the mask is one, or a zero if the bit of the mask is zero, the mask can effectively remove pixel information from each frame 970 where the mask does not include any information. The mask can be applied to multiple color channels of each frame 970. The components of the node computing system 905 (and any other node computing systems described herein) can be configured to ignore any pixels with a value of zero. In some implementations, the capture device mask 980 can be applied as a separate color channel to the frame. Each pixel in the captured device mask 980 color channel can indicate whether the pixel is "enabled" or "disabled" (e.g., with a zero or a one bit value). If the pixel is "enabled," the node computing system can process the pixel normally, using any of the operations described herein. However, if the pixel is indicated as "disabled," the node computing system can ignore the pixel, regardless of its color value.

Referring now to the operations of the node computing system 905, the frame receiver 930 can receive one or more sequences of frames from one or more respective captured devices 920. As described herein, each respective capture device 920 can have a respective pose. In some implementations, the frame receiver 930 can receive a first sequence of frames 970 captured by a first capture device 920 having a first pose and a second sequence of frames 970 captured by a second capture device 920 having a second pose. As described herein, the pose of each capture device 920 in communication with the node computing system 905 can be stored in association with an identifier of the respective capture device 920, and the frames 970 captured by the respective capture device, in the storage 915. The sequences of frames 970 can be any number of frames 970. In some implementations, two corresponding frames can each be captured and provided by the capture devices 920 in communication with the node computing system 905 before the next frame 970 in the sequence is retrieved, thereby synchronizing each sequence of frames 970 captured by the capture devices 920.

Each of the frames 970 in each sequence of frames 970 can be consecutive frames 970 captured by a respective capture device 920. For example, the frames 970 can be consecutive frames captured as part of a video stream. In some implementations, the frames 970 can be consecutively captured images (e.g., images captured periodically at a predetermined time interval by the capture device). Upon receiving the frames 970, the frame receiver 930 can store each frame 970 in one or more data structures (e.g., a list, a queue, etc.) of frames corresponding to the capture device 920 used to capture the respective frame 970. In some implementations, an external computing device in communication with the second capture device can identify a set of points of interest in a second sequence of frames 970 captured by the second capture device, and transmit the second sequence of frames 970 and the identified points of interest to the node computing system 905.

The point tracker 935 can track sets of points of interest across each sequence of frames 970 over time. In some implementations, the point tracker 935 can track a first set of points of interest 975 across the first sequence of frames 970 and a second set of points of interest 975 across the second sequence of frames 970. Each point of interest 975 can be a point in a frame 970 that is detected based on using a feature detection technique, such as a corner detection technique, an edge detection technique, a blob detection technique, or a ridge detection technique, on a frame 970 in a sequence of frames captured by a capture device. Each frame provided by each capture device 920 can be provided as input to a feature detection technique, such as a corner detection technique, which can provide pixel coordinates in the input frame 970 that correspond to detected points of interest 975 as output. In addition, each detected point of interest 975 can include parameters that indicate an intensity of one or more pixels in a frame 970 that correspond to the point of interest.

The point tracker 935 can detect a set of points of interest 975 for each frame in each sequence of frames captured by the capture devices 920. Each set of points of interest can be stored in a data structure, such as a list, which can be stored in association with the frame 970 in which the points were detected. In addition, the point tracker 935 can track similar points of interest temporally as additional frames 970 are captured and provided as part of the sequence of frames 970. To do so, the point tracker 935 can identify parameter correspondences between the pixels (e.g., a predetermined window size) of a point of interest 975 in one frame 970 and the pixels (e.g., the predetermined window size) in a point of interest 975 in a consecutive frame 970. The correspondence can be calculated as a correspondence score that reflects a likelihood that the point of interest in one frame 970 depicts the same feature identified by a second point of interest 975 in a consecutive frame. If the score satisfies a predetermined threshold, the points of interest 975 can be linked temporally and assigned the same identifier. The two-dimensional displacement (e.g., difference in pixel coordinates, etc.) of the point of interest 975 from the first frame to the next consecutive frame 970 can be tracked and determined by the point tracker 935, and stored in association with a timestamp of each frame and the identifier of the point of interest 975.

The point mapper 940 can map a first set points of interest 975 and a second set of points of interest 975 to a respective set of 3D points of interest in a 3D coordinate space. The 3D points of interest can be mapped to the 3D coordinate space based on correspondences between the first set of points of interest 975 and the second set of points of interest 975. As described herein, each of the capture devices 920 has a respective pose in a 3D space and is generally stationary while capturing the frames 970. Using the known pose information for two capture devices 970 capturing an overlapping environment at the same time, the point mapper 940 can map one or more points of interest 975 identified in each frame 970 to a corresponding 3D point. To do so, the point mapper 940 can identify a list of corresponding points of interest 975 detected in a first frame captured by a first capture device 920 and a corresponding second frame captured by a second capture device 920 at substantially the same time.

Identifying point correspondences can include comparing a predetermined window between each point of interest detected in a first frame and each point of interest detected in a second frame. In some implementations, the point mapper 940 may utilize one or more constraints on correspondence mapping. For example, the point mapper 940 may only attempt to identify corresponding points of interest in similar positions in both frames captured by the separate capture devices. To identify a point correspondence, the point mapper 940 can compare the pixels in the predetermined region surrounding a point of interest 975 in a first frame 970 with a predetermined region surrounding a candidate point of interest in a second frame 970 and calculate a similarity score indicating the similarity between the two regions. If the score for the pair of points satisfies a threshold, the two points across both frames 970 can be considered corresponding points for the purposes of 3D mapping. If the score of the pair does not satisfy a threshold, the point mapper 940 can select a second candidate point in the second frame 970 captured by the second capture device 920 in accordance with any restrictions.

If the point mapper 940 fails to identify correspondences between a predetermined number of the points of interest 975 in a first frame 970 captured by a first capture device 920 and the points of interest 975 in the second frame captured by the second capture device 920, the point mapper 940 can relax any constraints by searching for candidate matches anywhere in the second frame. In some implementations, corresponding points can be identified using a fitting algorithm, such as a RANSAC algorithm. Points that are co-registered with one another using the fitting algorithm are stored as corresponding points of interest 975. The correspondences between the points of interest 975 detected in the first frame 970 captured by the first capture device 920 and the points of interest 975 detected in the second frame 970 captured by the second capture device 920 can be used to map each set of points of interest 975 to a 3D coordinate space.

Because the rotation and position of each capture device 920 are known at least relative to each other, the point mapper 940 can determine a location for a 3D point for each point correspondence identified between the points of interest 975 captured by the first capture device 920 and the points of interest 975 captured by the second capture device 920. In particular, the point mapper 940 can identify the location of a first point of interest 975 of a point correspondence within the field of view of the first capture device 920. Because the direction and position of the first capture device 920 are known in the 3D coordinate space, in some implementations, the field of view of the first capture device can itself be represented in the 3D coordinate space. In addition, the field of view of a second capture device 920 can be represented in the 3D coordinate space. By using epipolar geometry, and by matching the corresponding points of interest 975 between the first frame 970 from the first capture device 920 and the second frame 970 from the second capture device 920, the 3D location of each correspondence can be mapped to a 3D coordinate space.

The velocity determiner 945 can determine an average velocity of each 3D point of interest in the 3D coordinate space. Because each 3D point is determined from a point correspondence, differences in position in the point correspondences over time can be translated into corresponding changes in 3D position in the 3D coordinate space. The velocity determiner 945 can determine a 3D displacement of a subset of the plurality of 3D points based on the first sequence of frames and the second sequence of frames. For example, as a dynamic object moves in the field of view of each of the first capture device 920 and the second capture device 920, the movement of the dynamic object is captured chronologically across a sequence of frames by each capture device 920. The points of interest 975 that correspond to the dynamic object as represented in each sequence also change in coordinates over time and are tracked by the point tracker 945 as described herein.

As each point of interest 975 changes in position over time, the velocity determiner 945 can map changes in position of the corresponding 3D point of interest in the 3D coordinate space. Therefore, the velocity determiner 945 can iteratively (e.g., each time new frames are captured by the first and second capture devices) determine changes in position of each tracked 3D point in the 3D coordinate space. These changes in position can be stored in association with any relevant data for further processing, including identifiers of frames 970 from which the 3D points of interest were determined, timestamps, identifiers of individual points of interest 975 in corresponding frames 970, or identifiers of point correspondences identified by the point tracker 935. To calculate the average velocity of each 3D point of interest, the velocity determiner 945 can divide the displacement of the 3D points of interest by the amount of time that has lapsed between capturing each of the sequences of frames used to detect the 3D points of interest. This average can be, for example, a rolling average (e.g., over a predetermined number of most-recent frames) or an average value that is recalculated each time a new frame 970 is captured and used to calculate up-to-date position information for each 3D point of interest. The average velocity of each 3D point of interest can be stored in association with the respective 3D point of interest in one or more data structures.

The mask generator 950 can generate a first mask for frames 970 captured by each respective capture device 920 based on the average velocity of each 3D point of the set of 3D points of interest. Because the position (and therefore velocity) of each 3D point of interest is determined based on point correspondences of at least two sequences of frames 970, each 3D point of interest is stored in association with respective identifiers of points of interest 975 in each frame 970. The mask generator 950 can identify a subset of the 3D points of interest that have an average velocity value that is below a predetermined threshold for a predetermined period of time. The predetermined period of time can be provided as part of a configuration setting, or transmitted to the node computing system from an external computing system via the network 910.

Once the 3D points of interest corresponding to static features (e.g., having a velocity below a threshold) are identified, the mask generator can access the positions of points of interest 975 used to map each static 3D point of interest to the 3D coordinate space. The mask generator 950 can access these positions to generate a respective capture device mask 980 for each capture device 920 used to capture the points of interest 975. To generate a capture device mask 980, the mask generator 950 can allocate a region of memory in the storage to be equal to the number of pixels in a frame 970, and having a similar resolution. The mask generator can then generate a window (e.g., of a predetermined window size) surrounding the position each point of interest 975 used to map to a static 3D point of interest, and set the value of each corresponding pixel position in the capture device mask 980 to zero, or otherwise "disable" the pixel. In addition, the mask generator 950 can set each pixel value in the capture device mask 980 surrounding the position of a dynamic 3D point of interest (e.g., having a velocity value greater than the threshold) to one, or otherwise "enable" the pixel.

If, after filling each pixel in the predetermined window surrounding each point of interest 975, there are still unset pixels in the capture device mask 980, the mask generator 950 can fill these pixels according to a filling policy. For example, one filling policy can be an inclusive policy that treats each unset pixel in the capture device mask 980 as "enabled." In some implementations, an exclusive policy can be used, where each unset pixel in the capture device mask 980 as "disabled." In some implementations, a filling algorithm can be used to fill spaces between the "disabled" points of interest and the "enabled" points of interest with each respective value. For example, unset pixels that are mostly surrounded by "disabled" pixels can also be set as "disabled," while pixels that are mostly surrounded by "enabled" pixels can also be set as "enabled." Once each pixel in the capture device mask 980 has been set to one of enabled or disabled, the capture device mask 980 can be stored in association with an identifier of the respective capture device 920 to which it corresponds.

Once a capture device mask has been enabled, the capture device mask 980 can be applied to each frame 970 captured by the respective capture device before undergoing additional processing by the components of the node computing system 905. The masked frames 970 can then be applied to the various processing operations described herein, but with improvements to processing efficiency, because 3D points of interest that correspond to unchanging static features are automatically omitted from processing. Some examples of the processing operations that are improved are point of interest tracking, point of interest mapping (e.g., to the 3D coordinate space), dynamic object detection using the 3D points of interest, dynamic object classification, dynamic object tracking (e.g., movement profile determination and trajectory prediction), and other image processing operations described herein. It will be appreciated that any of the node computing systems described herein can utilize one or more capture device masks 980 in their respective operations, as described herein.

Figure 10:
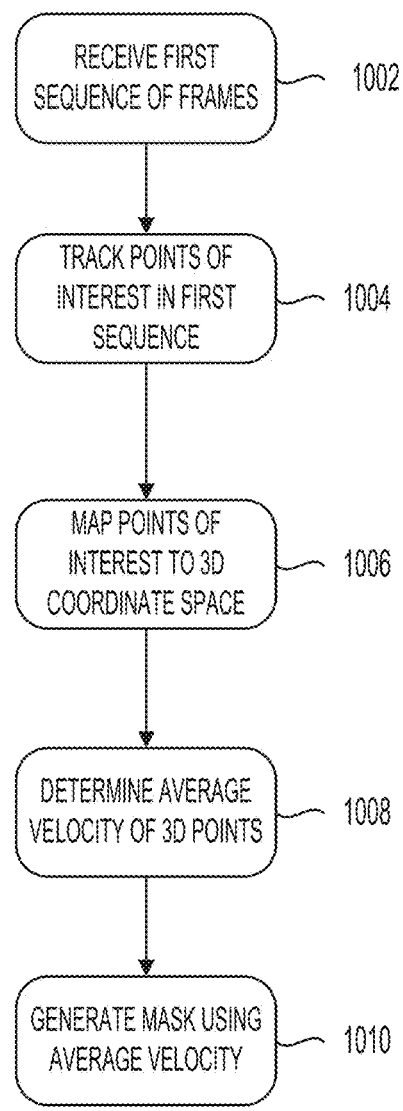
FIG. 10 illustrates an example flow diagram of a method for generating a mask for point of interest detection when tracking sensing volumes, in accordance with one or more implementations.

Referring now to FIG. 10, depicted is an illustrative flow diagram of a method 1000 for generating a mask for point of interest detection when tracking sensing volumes. The method 1000 can be executed, performed, or otherwise carried out by the node computing system 905, the computer system 2000 described herein in conjunction with FIGS. 20A and 20B, or any other computing devices described herein. In brief overview, the node computing system (e.g., the node computing system 905, etc.) can receive a first sequence of frames (e.g., the frames 970) (STEP 1002), track points of interest (e.g., the points of interest 975) in the first sequence of frames (STEP 1004), map the points of interest to a 3D coordinate space (STEP 1006), determine an average velocity of the 3D points of interest (STEP 1008), and generate a mask (e.g., the capture device mask 980) using the average velocity of the 3D points of interest (STEP 1010).

In further detail, the node computing system (e.g., the node computing system 905, etc.) can receive a first sequence of frames (e.g., the frames 970) (STEP 1002). As described herein, each node computing system can be in communication with at least two capture devices (e.g., the capture devices 920), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track points of interest (e.g., the points of interest 975) in the first sequence of frames (STEP 1004). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

The node computing system can map the points of interest to a 3D coordinate space (STEP 1006). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, corresponding points can be identified using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can determine an average velocity of the 3D points of interest (STEP 1008). Because each 3D point is determined from a point correspondence, differences in position in the point correspondences over time can be translated into corresponding changes in 3D position in the 3D coordinate space. The displacement determiner can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the point tracker as described herein.

As each point of interest changes in position over time, the node computing system can map changes in position of the corresponding 3D point of interest in the 3D coordinate space. Therefore, the displacement determiner can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the point tracker. To calculate the average velocity of each 3D point of interest, the node computing system can divide the displacement of the 3D points of interest by the amount of time that has lapsed between capturing each of the sequences of frames used to detect the 3D points of interest. This average can be, for example, a rolling average (e.g., over a predetermined number of most-recent frames) or an average value that is recalculated each time a new frame is captured and used to calculate up-to-date position information for each 3D point of interest. The average velocity of each 3D point of interest can be stored in association with the respective 3D point of interest in one or more data structures.

The node computing system can generate a mask (e.g., the capture device mask 980) using the average velocity of the 3D points of interest (STEP 1010). Because the position (and therefore velocity) of each 3D point of interest is determined based on point correspondences of at least two sequences of frames, each 3D point of interest is stored in association with respective identifiers of points of interest in each frame. The node computing system can identify a subset of the 3D points of interest that have an average velocity value that is below a predetermined threshold for a predetermined period of time. The predetermined period of time can be provided as part of a configuration setting, or transmitted to the node computing system from an external computing system via a network (e.g., the network 910).

Once the 3D points of interest corresponding to static features (e.g., having a velocity below a threshold) are identified, the node computing system can access the positions of points of interest used to map each static 3D point of interest to the 3D coordinate space. The node computing system can access these positions to generate a respective capture device mask 980 for each capture device used to capture the points of interest. To generate a capture device mask 980, the node computing system can allocate a region of memory in the storage to be equal to the number of pixels in a frame, and having a similar resolution. The node computing system can then generate a window (e.g., of a predetermined window size) surrounding the position each point of interest used to map to a static 3D point of interest, and set the value of each corresponding pixel position in the capture device mask 980 to zero, or otherwise "disable" the pixel. In addition, the node computing system can set each pixel value in the capture device mask 980 surrounding the position of a dynamic 3D point of interest (e.g., having a velocity value greater than the threshold) to one, or otherwise "enable" the pixel.

If, after filling each pixel in the predetermined window surrounding each point of interest, there are still unset pixels in the capture device mask 980, the node computing system can fill these pixels according to a filling policy. For example, one filling policy can be an inclusive policy that treats each unset pixel in the capture device mask 980 as "enabled." In some implementations, an exclusive policy can be used, where each unset pixel in the capture device mask 980 as "disabled." In some implementations, a filling algorithm can be used to fill spaces between the "disabled" points of interest and the "enabled" points of interest with each respective value. For example, unset pixels that are mostly surrounded by "disabled" pixels can also be set as "disabled," while pixels that are mostly surrounded by "enabled" pixels can also be set as "enabled." Once each pixel in the capture device mask 980 has been set to one of enabled or disabled, the capture device mask 980 can be stored in association with an identifier of the respective capture device to which it corresponds.

Once a capture device mask has been enabled, the capture device mask 980 can be applied to each frame captured by the respective capture device before undergoing additional processing by the components of the node computing system. The masked frames can then be applied to the various processing operations described herein, but with improvements to processing efficiency, because 3D points of interest that correspond to unchanging static features are automatically omitted from processing. Some examples of the processing operations that are improved are point of interest tracking, point of interest mapping (e.g., to the 3D coordinate space), dynamic object detection using the 3D points of interest, dynamic object classification, dynamic object tracking (e.g., movement profile determination and trajectory prediction), and other image processing operations described herein. It will be appreciated that any of the node computing systems described herein can utilize one or more capture device masks 980 in their respective operations, as described herein.

D. Classifying Dynamic Objects Using a Mesh Network of Nodes Coupled to Cameras

When monitoring a sensing volume, it is important to accurately classify any detected dynamic objects that intersect with a sensing volume. However, providing an accurate classification for a dynamic object based on a single image can introduce in accuracies or provide uncertain results. Moving objects in particular can be challenging to classify and reclassify of the same object enters the same sensing volume at a later time. In addition, because dynamic objects are moving, there may only be a limited number of frames from which a classification can be determined when using a single camera installation. Therefore, it would be advantageous to leverage a mesh network of nodes coupled to cameras to detect and accurately classify dynamic objects via agreement between the different views of different nodes.

The systems and methods of this technical solution provide techniques for classifying dynamic objects using a mesh network of nodes coupled to cameras. To do so, the systems and methods described herein can detect and generate 3D volumes that surround dynamic objects in a 3D coordinate space corresponding to the sensing volume. To classify the dynamic object, each node can generate its own 3D volume surrounding each detected dynamic object and perform a filtering process to exclude dynamic objects that do not satisfy a size threshold. In some implementations, the frames used to generate the unfiltered 3D volumes can then be provided as input to a classifier executing at each node computing system, and a class will be assigned to the dynamic object when a majority of the views agree on one class. In some implementations, a class can be assigned when a classification from a first capture device and a classification from a second capture device of a node agree. In some implementations, classification can be a binary determination, which flags an object as "interesting" or "not interesting" based on the size threshold.

Figure 11:
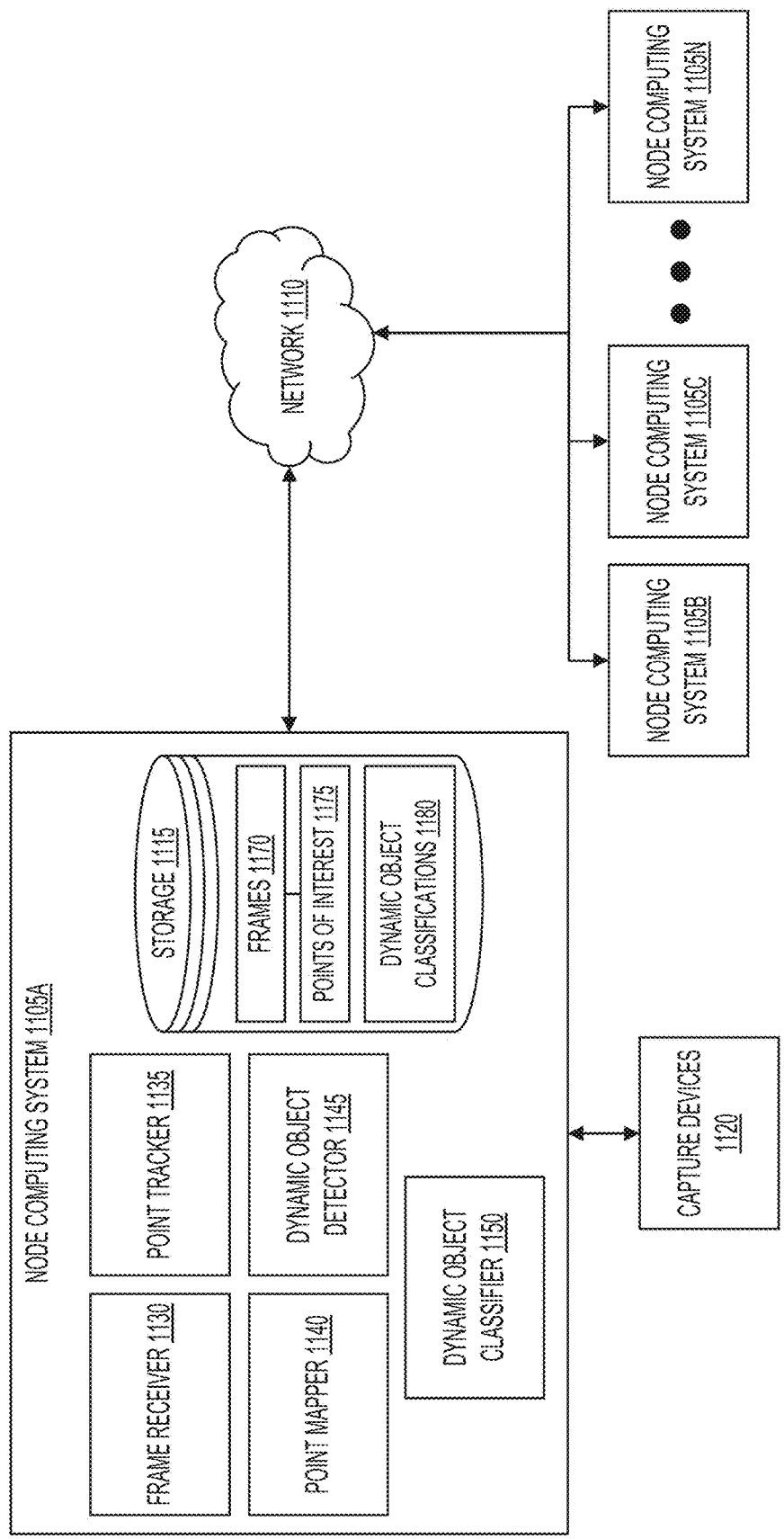
FIG. 11 illustrates a block diagram of an example system for classifying dynamic objects using a mesh network of nodes coupled to cameras, in accordance with one or more implementations.

Referring now to FIG. 11, illustrated is a block diagram of an example system 1100 for classifying dynamic objects using a mesh network of nodes coupled to cameras, in accordance with one or more implementations. The system 1100 can include one or more node computing systems 1105A-1105N (sometimes generally referred to herein as node computing system(s) 1105), and at least one network 1110. Each node computing system 1105 can be in communication with one or more capture devices 1120. Each node computing system 1105 can include at least one frame receiver 1130, at least one point tracker 1135, at least one point mapper 1140, at least one dynamic object detector 1145, and at least one dynamic object classifier 1150, and at least one storage 1115. The storage 1115 can store one or more frames 1170 (sometimes referred to as one or more sequence(s) of frames 1170), one or more points of interest 1175, and one or more dynamic object classifications 1180. In some implementations, the storage 1115 can be external to the node computing system 1105, for example, as part of one or more servers or other computing devices in communication with the node computing system 1105 via the network 1110.

Each of the node computing systems 1105, the capture devices 1120, the network 1110, the storage 1115, the frame receiver 1130, the point tracker 1135, the point mapper 1140, the dynamic object detector 1145, and the dynamic object classifier 1150 of the system 1100 can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 1105 can include any of the functionality of the node computing systems 105, the node computing systems 605, the node computing systems 905, the node computing systems 1305, the node computing systems 1505, and the node computing systems 1805, described herein in connection with FIGS. 1, 6, 9, 13, 15, and 18, respectively. Each of the components of the node computing system 1105 can perform the functionalities detailed herein.

The node computing system 1105 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 1105 can include one or more computing devices or servers that can perform various functions as described herein. The node computing system 1105 can include any or all of the components and perform any or all of the functions of the computer system 2000 described herein in conjunction with FIGS. 20A and 20B.

The network 1110 can include computer networks such as the Internet, local, wide, metro or other area networks, intranets, satellite networks, other computer networks such as voice or data mobile phone communication networks, radio communication interfaces, and combinations thereof. The node computing system 1105A of the system 1100 can communicate via the network 1110, for instance with at least one other node computing system 1105B-1105N. The network 1110 may be any form of computer network that can relay information between the node computing system 1105A, the node computing systems 1105B-1105N, and one or more other computing systems, such as a flight computing system or another remote server in communication with the node computing systems 1105.

In some implementations, the network 1110 may include the Internet and/or other types of data networks, such as a LAN, a WAN, a cellular network, a satellite network, or other types of data networks. The network 1110 may also include any number of computing devices (e.g., computers, servers, routers, network switches, etc.) that are configured to receive and/or transmit data within the network 1110. The network 1110 may further include any number of hardwired and/or wireless connections. Any or all of the computing devices described herein (e.g., the node computing system 1105, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 1110. Any or all of the computing devices described herein (e.g., the node computing system 1105, the computer system 2000, etc.) may also communicate wirelessly with the computing devices of the network 1110 via a proxy device (e.g., a router, network switch, or gateway).

The storage 1115 can be a database configured to store and/or maintain any of the information described herein. The storage 1115 can maintain one or more data structures, which may contain, index, or otherwise store each of the values, pluralities, sets, variables, vectors, thresholds, or other data used in the processing operations described herein. The storage 1115 can be accessed using one or more memory addresses, index values, or identifiers of any item, structure, or region maintained in the storage 1115. The storage 1115 can be accessed by the components of the node computing system 1105, or any other computing device described herein, via the network 1110. In some implementations, the storage 1115 can be internal to the node computing system 1105. In some implementations, the storage 1115 can exist external to the node computing system 1105, and may be accessed via the network 1110. The storage 1115 can be distributed across many different computer systems or storage elements, and may be accessed via the network 1110 or a suitable computer bus interface. The node computing system 1105 can store, in one or more regions of the memory of the node computing system 1105, or in the storage 1115, the results of any or all computations, determinations, selections, identifications, generations, constructions, or calculations in one or more data structures indexed or identified with appropriate values.

The one or more capture devices 1120 can be, for example, any sort of camera capable of capturing one or more frames 1170. In some implementations, the capture device 1120 is a video camera capable of producing a video stream. In some implementations, the capture device 1120 is an image capture device that can capture images in response to a condition, such as a capture signal or on a predetermined periodic basis. In some implementations, the capture device 1120 can be associated with a respective pose, which can be maintained by the node computing system 1105 in communication with the capture device. In some implementations, each of the node computing systems 1105A-1105N can be in communication with at least two capture devices 1120. Each of the at least two capture devices in communication with a node computing system 1105 can have its own respective pose in a 3D space. As such, each node computing system 1105 can be used to capture a respective portion of a larger sensing volume, and therefore various different views of any detected dynamic objects. The classification of the dynamic object, as described herein, can be determined based on an agreement of classifications within a majority of the views that detect the dynamic object.

The storage 1115 can store the frames 1170 (sometimes referred to as sequence(s) of frames 1170) in one or more data structures. Each of the frames 1170 can be, for example, an image that is associated with a particular timestamp in a video stream captured from a video camera. In some implementations, each frame can itself be a still image captured by a corresponding capture device 1120, for example, on a periodic basis. Each frame 1170 can include pixels arranged in a grid that makes up the frame 1170 (e.g., as an image), where each pixel includes color data and location data that identifies the color and location of the pixel in the frame 1170. In some implementations, the capture device 1120 can capture the frames 1170 in one or more different color channels (e.g., each channel corresponding to a particular color wavelength). In some implementations, the image capture device 1120 can be a camera or video capture device that captures non-visible light (e.g., infrared light, etc.). Each color channel in a pixel of a frame 1170 can identify the intensity of a particular color of the pixel. These color intensity values (e.g., the color of each pixel in a frame 1170, etc.) can be used in one or more point of interest detection techniques, as described herein. In some implementations, the capture devices 1120 can be monochrome cameras that capture images or video streams that having a single intensity channel.

The storage 1115 can store one or more sets of points of interest 1175 in association with a respective sequence of frames 1170 captured by a corresponding capture device 1120. In other words, each of the capture devices 1120 can be associated with a respective set of points of interest 1175, which are detected and tracked across the sequences of frames 1170 captured by the capture device 1120. Each point of interest 1175 can be a point in a frame 1170 that is detected based on using a detection technique, such as a corner detection technique, an edge detection technique, a blob detection technique, a ridge detection technique, or other feature detection techniques. Each point of interest 1175 can correspond to one or more pixel coordinates in a frame, and can include parameters that indicate an intensity of one or more pixels in a frame 1170 that correspond to the point of interest. In some implementations, a point of interest 1175 can be tracked across one or more sequences of frames 1170.

For example, by performing a feature tracking technique, movement of points of interest 1175 (e.g., changes in pixel coordinates across consecutive frames) can be calculated. Some examples of feature tracking techniques include, for example, a KLT feature tracker, or other point feature matching techniques. Each point of interest 1175, including the parameters (e.g., pixel color values in a window, etc.) of each point of interest 1175 and coordinates of each point of interest across frames, and amount of movement of the point of interest in the pixel coordinate space, can be stored in one or more data structures in the storage 1115. The positions of the points of interest 1175 between two sequences of frames 1170 can be matched and used to map the points of interest into a 3D coordinate space. The movement of the 3D points of interest in the 3D coordinate space can be used to detect the presence of dynamic objects, which can cause the node computing system to generate a 3D volume surrounding a subset of the 3D points of interest. The 3D volumes surrounding a dynamic object in the 3D coordinate space can be used to generate a classification for the dynamic object, as described herein.

The storage 1115 can store one or more dynamic object classifications 1180, for example, in one or more data structures. The dynamic object classification 1180 can be the classification generated by the node computing system 1105A, and can also include classifications for the dynamic object generated by other node computing systems 1105B-1105N that detected and classified the dynamic object. In general, a final dynamic object classification 1180 will be assigned to the detected dynamic object when a majority of the views that detected the dynamic object "agree" on the same classification. For example, if three views detected the same dynamic object, and the dynamic object is classified in two of the three views as "helicopter," and classified as "unknown" in the third view, the classification of "helicopter" can be assigned to the dynamic object (e.g., in a dynamic object registry as described herein, etc.). Other classifications for the dynamic object are also possible, such as "airplane," "drone," "unknown," (e.g., indicating uncertainty in classification), or "not interesting," which indicates the dynamic object is not of interest to the sensing volume objective. Other specific classifications are also possible, such as specific models of aircraft, among other types of classifications.

Referring now to the operations of the node computing system 1105, the frame receiver 1130 can receive one or more sequences of frames from one or more respective captured devices 1120. As described herein, each respective capture device 1120 can have a respective pose. In some implementations, the frame receiver 1130 can receive a first sequence of frames 1170 captured by a first capture device 1120 having a first pose and a second sequence of frames 1170 captured by a second capture device 1120 having a second pose. As described herein, the pose of each capture device 1120 in communication with the node computing system 1105 can be stored in association with an identifier of the respective capture device 1120, and the frames 1170 captured by the respective capture device, in the storage 1115. The sequences of frames 1170 can be any number of frames 1170. In some implementations, two corresponding frames can each be captured and provided by the capture devices 1120 in communication with the node computing system 1105 before the next frame 1170 in the sequence is retrieved, thereby synchronizing each sequence of frames 1170 captured by the capture devices 1120.

Each of the frames 1170 in each sequence of frames 1170 can be consecutive frames 1170 captured by a respective capture device 1120. For example, the frames 1170 can be consecutive frames captured as part of a video stream. In some implementations, the frames 1170 can be consecutively captured images (e.g., images captured periodically at a predetermined time interval by the capture device). Upon receiving the frames 1170, the frame receiver 1130 can store each frame 1170 in one or more data structures (e.g., a list, a queue, etc.) of frames corresponding to the capture device 1120 used to capture the respective frame 1170. In some implementations, an external computing device in communication with the second capture device can identify a set of points of interest in a second sequence of frames 1170 captured by the second capture device, and transmit the second sequence of frames 1170 and the identified points of interest to the node computing system 1105.

The point tracker 1135 can track sets of points of interest across each sequence of frames 1170 over time. In some implementations, the point tracker 1135 can track a first set of points of interest 1175 across the first sequence of frames 1170 and a second set of points of interest 1175 across the second sequence of frames 1170. Each point of interest 1175 can be a point in a frame 1170 that is detected based on using a feature detection technique, such as a corner detection technique, an edge detection technique, a blob detection technique, or a ridge detection technique, on a frame 1170 in a sequence of frames captured by a capture device 1120. Each frame provided by each capture device 1120 can be provided as input to a feature detection technique, such as a corner detection technique, which can provide pixel coordinates in the input frame 1170 that correspond to detected points of interest 1175 as output. In addition, each detected point of interest 1175 can include parameters that indicate an intensity of one or more pixels in a frame 1170 that correspond to the point of interest.

The point tracker 1135 can detect a set of points of interest 1175 for each frame in each sequence of frames captured by the capture devices 1120. Each set of points of interest can be stored in a data structure, such as a list, which can be stored in association with the frame 1170 in which the points were detected. In addition, the point tracker 1135 can track similar points of interest temporally as additional frames 1170 are captured and provided as part of the sequence of frames 1170. To do so, the point tracker 1135 can identify parameter correspondences between the pixels (e.g., a predetermined window size) of a point of interest 1175 in one frame 1170 and the pixels (e.g., the predetermined window size) in a point of interest 1175 in a consecutive frame 1170. The correspondence can be calculated as a correspondence score that reflects a likelihood that the point of interest in one frame 1175 depicts the same feature identified by a second point of interest 1175 in a consecutive frame. If the score satisfies a predetermined threshold, the points of interest 1175 can be linked temporally and assigned the same identifier. The two-dimensional displacement (e.g., difference in pixel coordinates, etc.) of the point of interest 1175 from the first frame to the next consecutive frame 1170 can be tracked and determined by the point tracker 1135, and stored in association with a timestamp of each frame and the identifier of the point of interest 1175.

The point mapper 1140 can map a first set points of interest 1175 and a second set of points of interest 1175 to a respective set of 3D points of interest in a 3D coordinate space. The 3D points of interest can be mapped to the 3D coordinate space based on correspondences between the first set of points of interest 1175 and the second set of points of interest 1175. As described herein, each of the capture devices 1120 has a respective pose in a 3D space and is generally stationary while capturing the frames 1170. Using the known pose information for two capture devices 1170 capturing an overlapping environment at the same time, the point mapper 1140 can map one or more points of interest 1175 identified in each frame 1170 to a corresponding 3D point. To do so, the point mapper 1140 can identify a list of corresponding points of interest 1175 detected in a first frame captured by a first capture device 1120 and a corresponding second frame captured by a second capture device 1120 at substantially the same time.

Identifying point correspondences can include comparing a predetermined window between each point of interest detected in a first frame and each point of interest detected in a second frame. In some implementations, the point mapper 1140 may utilize one or more constraints on correspondence mapping. For example, the point mapper 1140 may only attempt to identify corresponding points of interest in similar positions in both frames captured by the separate capture devices. To identify a point correspondence, the point mapper 1140 can compare the pixels in the predetermined region surrounding a point of interest 1170 in a first frame 1170 with a predetermined region surrounding a candidate point of interest in a second frame 1170 and calculate a similarity score indicating the similarity between the two regions. If the score for the pair of points satisfies a threshold, the two points across both frames 1170 can be considered corresponding points for the purposes of 3D mapping. If the score of the pair does not satisfy a threshold, the point mapper 1140 can select a second candidate point in the second frame 1170 captured by the second capture device 1120 in accordance with any restrictions.

If the point mapper 1140 fails to identify correspondences between a predetermined number of the points of interest 1175 in a first frame 1170 captured by a first capture device 1120 and the points of interest 1175 in the second frame captured by the second capture device 1120, the point mapper 1140 can relax any constraints by searching for candidate matches anywhere in the second frame. In some implementations, corresponding points can be identified using a fitting algorithm, such as a RANSAC algorithm. Points that are co-registered with one another using the fitting algorithm are stored as corresponding points of interest 1170. The correspondences between the points of interest 1175 detected in the first frame 1170 captured by the first capture device 1120 and the points of interest 1175 detected in the second frame 1170 captured by the second capture device 1120 can be used to map each set of points of interest 1175 to a 3D coordinate space.

Because the rotation and position of each capture device 1120 are known at least relative to each other, the point mapper 1140 can determine a location for a 3D point for each point correspondence identified between the points of interest 1175 captured by the first capture device 1120 and the points of interest 1175 captured by the second capture device 1120. In particular, the point mapper 1140 can identify the location of a first point of interest 1175 of a point correspondence within the field of view of the first capture device 1120. Because the direction and position of the first capture device 1120 are known in the 3D coordinate space, in some implementations, the field of view of the first capture device can itself be represented in the 3D coordinate space. In addition, the field of view of a second capture device 1120 can be represented in the 3D coordinate space. By using epipolar geometry, and by matching the corresponding points of interest 1175 between in the first frame 1170 from the first capture device 1120 and the second frame 1170 from the second capture device 1120, the 3D location of each correspondence can be mapped to a 3D coordinate space.

The dynamic object detector 1145 can detect a dynamic object based on the movement of a subset of the 3D points in the 3D coordinate space. Because each 3D point is determined from a point correspondence, differences in position in the point correspondences over time can be translated into corresponding changes in 3D position in the 3D coordinate space. The dynamic object detector 1145 can determine a 3D displacement of a subset of the plurality of 3D points based on the first sequence of frames and the second sequence of frames. For example, as a dynamic object moves in the field of view of each of the first capture device 1120 and the second capture device 1120, the movement of the dynamic object is captured chronologically across a sequence of frames by each capture device 1120. The points of interest that correspond to the dynamic object as represented in each sequence also change in coordinates over time and are tracked by the dynamic object detector 1145 as described herein. As each point of interest changes in position over time, the dynamic object detector 1145 can map changes in position of the corresponding 3D point of interest in the 3D coordinate space.

The dynamic object detector 1145 can iteratively (e.g., each time new frames are captured by the first and second capture devices) determine changes in position of each tracked 3D point in the 3D coordinate space. These changes in position can be stored in association with any relevant data for further processing, including identifiers of frames 1170 from which the 3D points of interest were determined, timestamps, identifiers of individual points of interest in corresponding frames 1170, or identifiers of point correspondences identified by the dynamic object detector 1145. The subset of the 3D points of interest can be the points of interest in the sequences of frames that have a displacement that exceeds a displacement amount threshold, suggesting that the 3D points of interest represent a dynamic object. In some implementations, the dynamic object detector 1145 can group subsets of the 3D points of interest mapped from the sequences of frames 1170 based on average velocity and proximity. For example, if a group of 3D points of interest are close to one another in the 3D coordinate space, and exhibit a similar displacement over time, the dynamic object detector 1145 can group these 3D points of interest as a subset (e.g., by storing them in a data structure of variable size, etc.).

In some implementations, the dynamic object detector 1145 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

In some implementations, the dynamic object detector 1145 can generate a 3D volume to surround the subset of the 3D points of interest in the 3D coordinate space. The 3D volume can be used as an initial classification filter, for example, to filter out dynamic objects that do not satisfy a predetermined size threshold. To generate a 3D volume that surrounds a dynamic object (e.g., the subset of 3D points that correspond to the dynamic object), the dynamic object detector 1145 can use the bounding regions regressed around a first frame captured by the first capture device 1120 and a corresponding second frame captured by the second capture device 1120. First, the dynamic object detector 1145 can detect a first bounding region that surrounds the dynamic object in the first frame and a second bounding region that surrounds the dynamic object in the second frame (which depicts the same dynamic object at the same time, but from a different perspective, or pose). The bounding regions can be detected using the bounding box regression model, as described herein.

The dynamic object detector 1145 can generate the 3D volume by projecting a pyramid shape from the focal point of each respective capture device through a boundary defined by the bounding region surrounding the subset of the 3D points of interest as represented in each respective frame 1170. The dynamic object detector 1145 can determine the 3D volume for the dynamic object by identifying an overlapping portion of each pyramid shape in the 3D coordinate space. In some implementations, each dimension of the 3D volume can be determined based on the size of each bounding region in each frame. For example, the width and height of one bounding region can be used to determine the width and height of one face of the 3D volume that surrounds the dynamic object, and the other bounding region can be used to determine another face of the 3D volume.

If there are inconsistences between the two faces, the dynamic object detector 1145 can resolve the difference based on one or more policies. For example, if the heights of each face are different, the dynamic object detector 1145 may determine the average of the heights, and use the average height value as the height of the bounding region. In some implementations, the dynamic object detector 1145 may select one height value or the other (e.g., select the largest height value, select the smallest height value, etc.). Once the dimensions of the two adjacent faces of the 3D volume are determined the dynamic object detector 1145 can determine the dimensions of the remaining faces of the 3D volume through an induction process. For example, the dynamic object detector 1145 may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

The dynamic object classifier 1150 can classify the dynamic object based on the first sequence of frames and the second sequence of frames. As a first filtering step, the dynamic object classifier 1150 can compare the size of the 3D volume of the dynamic object to an object size threshold. Comparing the size of the 3D volume to the threshold can include comparing the 3D volume to a predetermined 3D volume size (e.g., comparing overall volume in 3D coordinate space, or comparing the area of any face of the generated 3D volume to a predetermined area threshold, etc.). If the size of the 3D volume does not satisfy the predetermined size, the dynamic object classifier 1150 can classify the dynamic object as "not interesting," or otherwise cease further processing on the dynamic object. If the size of the 3D volume does satisfy the predetermined size, the dynamic object classifier 1150 can further classify the object as "of interest," and continue performing the classification operations described herein.

As described herein, the final classification of a dynamic object is determined based on agreement across a majority of the views that capture the dynamic object. Because a dynamic object is detected by at least two capture devices in communication with a single node computing system 1105, an initial dynamic object classification 1180 can be generated for each capture device 1120 in communication with each node computing system 1105. Each capture device 1120 can represent a single "view" of the dynamic object. As such, each node computing system 1105 that detects the dynamic object can generate a first classification of the dynamic object using frames 1170 captured by the first capture device 1120, and a second classification of the dynamic object using frames 1170 captured by the second capture device 1120. Classification of a dynamic object (e.g., a dynamic object that has not been filtered out by way of 3D volume filtering) in a frame 1170 can be performed by providing the frame 1170 as input to a classification model.

The classification model can be a trained model, such as a convolutional neural network model that is trained on sets of labeled training images that depict dynamic objects of interest. The dynamic objects of interest depicted and labeled in the training images can be, for example, airplanes, helicopters, drones, or any other type of relevant flying object. The classification model can be trained, for example, using backpropagation techniques, in which a training image is applied to and propagated through the classification model, and the output is compared to the label assigned to the item of training data. The difference between the output of the model and the label assigned to the training data can be propagated through the layers of the convolutional network model, and the weights and biases of each layer can be modified based on backpropagation techniques. Other training techniques can also be used to train the classification model, such as unsupervised learning techniques or semi-supervised learning techniques.

In some implementations, the dynamic object classifier 1150 can train the model using the training data. In some other implementations, the classification model can be trained in an offline process, and subsequently provided to and executed by the dynamic object classifier 1150 to classify dynamic objects in the training data. In some implementations, if two or more capture devices 1120 are used to determine the presence of a dynamic object, the classification model can be provided with a first frame captured by the first capture device 1120, and a second corresponding frame 1170 (e.g., captured at the same time as the first frame 1170) captured by the second capture device 1120. If the classifications produced from each frame 1170 match, the dynamic object classifier can determine that the classification of the dynamic object is the output of the classification model. If the classifications of each frame 1170 do not match, then in some implementations the dynamic object classifier 1150 may disregard or suppress the detection of the dynamic object in the sequences of frames 1170, and perform no further processing for that dynamic object.

In addition, the dynamic object classifier 1150 can generate a final dynamic object classification 1180 based on classifications received from other node computing systems (e.g., the node computing systems 1105B-1105N) in the mesh network. As described herein, a dynamic object may be detected by multiple node computing systems 1105 in the mesh network over time. As described in greater detail herein above, if a node computing system 1105 detects a dynamic object in a sensing volume it is monitoring, the node computing system can determine a predicted trajectory of the dynamic object and share dynamic object data (e.g., the dynamic object data 675 described herein in connection with FIG. 6) with other node computing systems that are likely to detect the dynamic object within a predetermined amount of time. Each of the node computing systems that detect the same dynamic object can collectively share respective classifications of the dynamic object with one another. The node computing system can then determine the classification of the dynamic object that is the same across a majority of the views (e.g., for each capture device 1120) as the dynamic object classification 1180. In some implementations, the classification of the dynamic object must also satisfy a predetermined number of views threshold, which indicates that at least a predetermined number of views must agree on a classification in order for the dynamic object classification to be determined. Once the dynamic object classification 1180 has been determined, the dynamic object classification 1180 can be used in other processing operations described herein.

Figure 12:
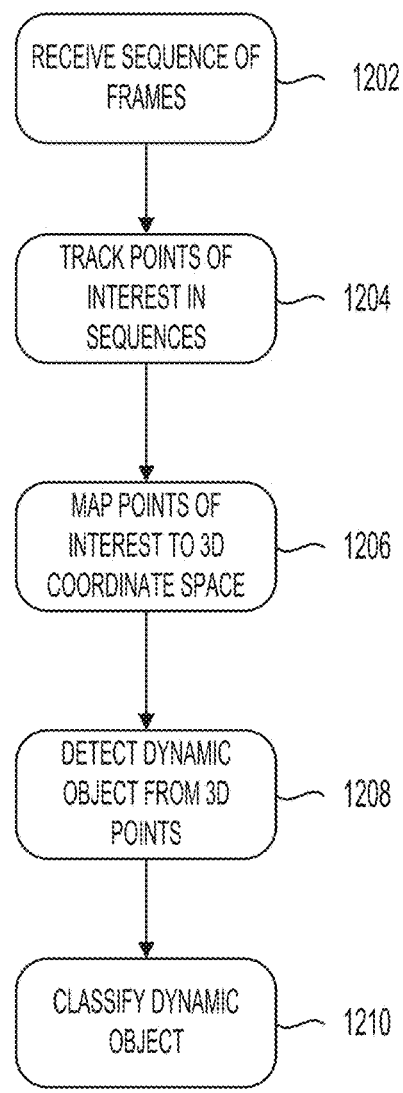
FIG. 12 illustrates an example flow diagram of a method for classifying dynamic objects using a mesh network of nodes coupled to cameras, in accordance with one or more implementations.

Referring now to FIG. 12, depicted is an illustrative flow diagram of a method 1200 for classifying dynamic objects using a mesh network of nodes coupled to cameras. The method 1200 can be executed, performed, or otherwise carried out by the node computing system 1105, the computer system 2000 described herein in conjunction with FIGS. 20A and 20B, or any other computing devices described herein. In brief overview, the node computing system (e.g., the node computing system 1105, etc.) can receive one or more sequences of frames (STEP 1202), track the points of interest in the sequences of frames (STEP 1204), map the points of interest to a 3D coordinate space (STEP 1206), detect a dynamic object from the 3D points of interest (STEP 1208), and classify the dynamic object (STEP 1210).

In further detail, the node computing system (e.g., the node computing system 1105, etc.) can receive one or more sequences of frames (e.g., the sequences of frames 1170) (STEP 1202). As described herein, each node computing system can be in communication with at least two capture devices (e.g., the capture devices 1120), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track points of interest (e.g., the points of interest 1175) in the sequences of frames (STEP 1204). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

The node computing system can map the points of interest to a 3D coordinate space (STEP 1206). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, corresponding points can be identified using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can detect a dynamic object from the 3D points of interest (STEP 1208). Because each 3D point is determined from a point correspondence, differences in position of the point correspondences over time can be translated into corresponding changes in 3D position in the 3D coordinate space. The node computing system can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein. As each point of interest changes in position over time, the node computing system can map changes in position of the corresponding 3D point of interest in the 3D coordinate space.

The node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

In some implementations, the node computing system can generate a 3D volume to surround the subset of the 3D points of interest in the 3D coordinate space. The 3D volume can be used as an initial classification filter, for example, to filter out dynamic objects that do not satisfy a predetermined size threshold. To generate a 3D volume that surrounds a dynamic object (e.g., the subset of 3D points that correspond to the dynamic object), the node computing system can use the bounding regions regressed around a first frame captured by the first capture device and a corresponding second frame captured by the second capture device. First, the node computing system can detect a first bounding region that surrounds the dynamic object in the first frame and a second bounding region that surrounds the dynamic object in the second frame (which depicts the same dynamic object at the same time, but from a different perspective, or pose). The bounding regions can be detected using the bounding box regression model, as described herein.

The node computing system can generate the 3D volume by projecting a pyramid shape from the focal point of each respective capture device through a boundary defined by the bounding region surrounding the subset of the 3D points of interest as represented in each respective frame. The node computing system can determine the 3D volume for the dynamic object by identifying an overlapping portion of each pyramid shape in the 3D coordinate space. In some implementations, each dimension of the 3D volume can be determined based on the size of each bounding region in each frame. For example, the width and height of one bounding region can be used to determine the width and height of one face of the 3D volume that surrounds the dynamic object, and the other bounding region can be used to determine another face of the 3D volume.

If there are inconsistences between the two faces, the node computing system can resolve the difference based on one or more policies. For example, if the heights of each face are different, the node computing system may determine the average of the heights, and use the average height value as the height of the bounding region. In some implementations, the node computing system may select one height value or the other (e.g., select the largest height value, select the smallest height value, etc.). Once the dimensions of the two adjacent faces of the 3D volume are determined the node computing system can determine the dimensions of the remaining faces of the 3D volume through an induction process. For example, the node computing system may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

The node computing system can generate a dynamic object classification (e.g., the dynamic object classification 1180) (STEP 1210). As a first filtering step, the node computing system can compare the size of the 3D volume of the dynamic object to an object size threshold. Comparing the size of the 3D volume to the threshold can include comparing the 3D volume to a predetermined 3D volume size (e.g., comparing overall volume in 3D coordinate space, or comparing the area of any face of the generated 3D volume to a predetermined area threshold, etc.). If the size of the 3D volume does not satisfy the predetermined size, the node computing system can classify the dynamic object as "not interesting," or otherwise cease further processing on the dynamic object. If the size of the 3D volume does satisfy the predetermined size, the node computing system can further classify the object as "of interest," and continue performing the classification operations described herein.

As described herein, the final classification of a dynamic object is determined based on agreement across a majority of the views that capture the dynamic object. Because a dynamic object is detected by at least two capture devices in communication with a single node computing system, an initial dynamic object classification can be generated for each capture device in communication with each node computing system. Each capture device can represent a single "view" of the dynamic object. As such, each node computing system that detects the dynamic object can generate a first classification of the dynamic object using frames captured by the first capture device, and a second classification of the dynamic object using frames captured by the second capture device. Classification of a dynamic object (e.g., a dynamic object that has not been filtered out by way of 3D volume filtering) in a frame can be performed by providing the frame as input to a classification model.

The classification model can be a trained model, such as a convolutional neural network model that is trained on sets of labeled training images that depict dynamic objects of interest. The dynamic objects of interest depicted and labeled in the training images can be, for example, airplanes, helicopters, drones, or any other type of relevant flying object. The classification model can be trained, for example, using backpropagation techniques, in which a training image is applied to and propagated through the classification model, and the output is compared to the label assigned to the item of training data. The difference between the output of the model and the label assigned to the training data can be propagated through the layers of the convolutional network model, and the weights and biases of each layer can be modified based on backpropagation techniques. Other training techniques can also be used to train the classification model, such as unsupervised learning techniques or semi-supervised learning techniques.

In some implementations, the node computing system can train the model using the training data. In some other implementations, the classification model can be trained in an offline process, and subsequently provided to and executed by the node computing system to classify dynamic objects in the training data. In some implementations, if two or more capture devices are used to determine the presence of a dynamic object, the classification model can be provided with a first frame captured by the first capture device, and a second corresponding frame (e.g., captured at the same time as the first frame) captured by the second capture device. If the classifications produced from each frame match, the node computing system can determine that the classification of the dynamic object is the output of the classification model. If the classifications of each frame do not match, then in some implementations the node computing system may disregard or suppress the detection of the dynamic object in the sequences of frames and perform no further processing for that dynamic object.

In addition, the node computing system can generate a final dynamic object classification based on classifications received from other node computing systems in the mesh network. As described herein, a dynamic object may be detected by multiple node computing systems in the mesh network over time. As described in greater detail herein above, if a node computing system detects a dynamic object in a sensing volume it is monitoring, the node computing system can determine a predicted trajectory of the dynamic object and share dynamic object data with other node computing systems that are likely to detect the dynamic object within a predetermined amount of time. Each of the node computing systems that detect the same dynamic object can collectively share respective classifications of the dynamic object with one another. The node computing system can then determine the classification of the dynamic object that is the same across a majority of the views (e.g., for each capture device) as the dynamic object classification. In some implementations, the classification of the dynamic object must also satisfy a predetermined number of views threshold, which indicates that at least a predetermined number of views must agree on a classification in order for the dynamic object classification to be determined. Once the dynamic object classification has been determined, the dynamic object classification can be used in other processing operations described herein.

E. Probabilistically Predicting Paths of Objects Detected In a Sensing Volume

As described herein, sensing volumes can be used to monitor an environment that surrounds a protected region, such as a region used to test or launch aerial vehicles. By establishing a sensing volume that surrounds an outer perimeter of a protected region, dynamic objects can be detected and classified before they enter the detected region. To cover large sensing volumes that protect large regions of an environment, many sensing nodes can be utilized so that each monitors a portion of the overall sensing volume, as described herein. However, it can be challenging to predict the trajectory of detected dynamic objects when multiple sensing nodes are used.

The systems and methods of this technical solution provide techniques to produce multiple probabilistic paths for each detected dynamic object based on various features of the detected dynamic object. In some implementations, the predicted trajectories can be determined based on a historic data for the classification of the dynamic object. For example, if the dynamic object is detected as a particular type of aircraft, the system can provide various features of the detected dynamic object as input to a model for that aircraft to generate the predicted trajectories. This predicted trajectory information can be shared with other nodes in the mesh network, which can also detect the same dynamic object and provide updated probabilistic predictions for a future path of the detected dynamic object. To do so, the systems and methods described herein can monitor the 3D displacement of points of interest that correspond to the dynamic object over time, and determine a classification of the dynamic object. Based on the previous movement and the classification of the dynamic object, the systems and methods described herein can provide one or more predicted pathways for the dynamic objects that are each assigned a corresponding probability. These and other features are described in greater detail below.

Figure 13:
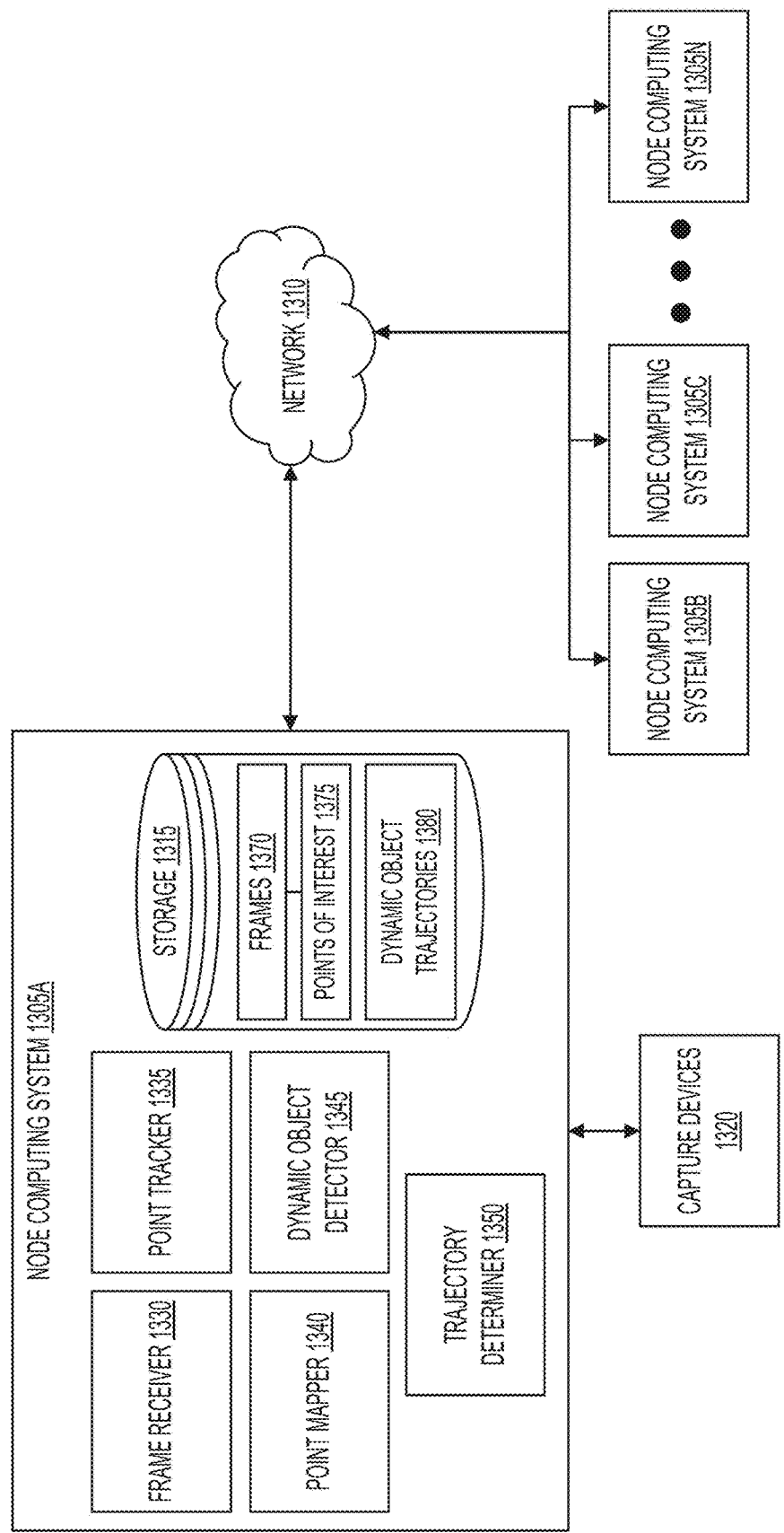
FIG. 13 illustrates a block diagram of an example system for probabilistically predicting paths of objects detected in a sensing volume, in accordance with one or more implementations.

Referring now to FIG. 13, illustrated is a block diagram of an example system 1300 for probabilistically predicting paths of dynamic objects detected in a sensing volume using a mesh network of nodes coupled to cameras, in accordance with one or more implementations. The system 1300 can include one or more node computing systems 1305A-1305N (sometimes generally referred to herein as node computing system(s) 1305), and at least one network 1310. Each node computing system 1305 can be in communication with one or more capture devices 1320. Each node computing system 1305 can include at least one frame receiver 1330, at least one point tracker 1335, at least one point mapper 1340, at least one dynamic object detector 1345, and at least one trajectory determiner 1350, and at least one storage 1315. The storage 1315 can store one or more frames 1370 (sometimes referred to as one or more sequence(s) of frames 1370), one or more points of interest 1375, and one or more dynamic object trajectories 1380. In some implementations, the storage 1315 can be external to the node computing system 1305, for example, as part of one or more servers or other computing devices in communication with the node computing system 1305 via the network 1310.

Each of the node computing systems 1305, the capture devices 1320, the network 1310, the storage 1315, the frame receiver 1330, the point tracker 1335, the point mapper 1340, the dynamic object detector 1345, and the trajectory determiner 1350 of the system 1300 can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 1305 can include any of the functionality of the node computing systems 105, the node computing systems 605, the node computing systems 905, the node computing systems 1105, the node computing systems 1505, and the node computing systems 1805, described herein in connection with FIGS. 1, 6, 9, 11, 15, and 18, respectively. Each of the components of the node computing system 1305 can perform the functionalities detailed herein.

The node computing system 1305 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 1305 can include one or more computing devices or servers that can perform various functions as described herein. The node computing system 1305 can include any or all of the components and perform any or all of the functions of the computer system 2000 described herein in conjunction with FIGS. 20A and 20B.

The network 1310 can include computer networks such as the Internet, local, wide, metro or other area networks, intranets, satellite networks, other computer networks such as voice or data mobile phone communication networks, radio communication interfaces, and combinations thereof. The node computing system 1305A of the system 1300 can communicate via the network 1310, for instance with at least one other node computing system 1305B-1305N. The network 1310 may be any form of computer network that can relay information between the node computing system 1305A, the node computing systems 1305B-1305N, and one or more other computing systems, such as a flight computing system or another remote server in communication with the node computing systems 1305.

In some implementations, the network 1310 may include the Internet and/or other types of data networks, such as a LAN, a WAN, a cellular network, a satellite network, or other types of data networks. The network 1310 may also include any number of computing devices (e.g., computers, servers, routers, network switches, etc.) that are configured to receive and/or transmit data within the network 1310. The network 1310 may further include any number of hardwired and/or wireless connections. Any or all of the computing devices described herein (e.g., the node computing system 1305, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 1310. Any or all of the computing devices described herein (e.g., the node computing system 1305, the computer system 2000, etc.) may also communicate wirelessly with the computing devices of the network 1310 via a proxy device (e.g., a router, network switch, or gateway).

The storage 1315 can be a database configured to store and/or maintain any of the information described herein. The storage 1315 can maintain one or more data structures, which may contain, index, or otherwise store each of the values, pluralities, sets, variables, vectors, thresholds, or other data used in the processing operations described herein. The storage 1315 can be accessed using one or more memory addresses, index values, or identifiers of any item, structure, or region maintained in the storage 1315. The storage 1315 can be accessed by the components of the node computing system 1305, or any other computing device described herein, via the network 1310. In some implementations, the storage 1315 can be internal to the node computing system 1305. In some implementations, the storage 1315 can exist external to the node computing system 1305, and may be accessed via the network 1310. The storage 1315 can be distributed across many different computer systems or storage elements, and may be accessed via the network 1310 or a suitable computer bus interface. The node computing system 1305 can store, in one or more regions of the memory of the node computing system 1305, or in the storage 1315, the results of any or all computations, determinations, selections, identifications, generations, constructions, or calculations in one or more data structures indexed or identified with appropriate values.

The one or more capture devices 1320 can be, for example, any sort of camera capable of capturing one or more frames 1370. In some implementations, the capture device 1320 is a video camera capable of producing a video stream. In some implementations, the capture device 1320 is an image capture device that can capture images in response to a condition, such as a capture signal or on a predetermined periodic basis. In some implementations, the capture device 1320 can be associated with a respective pose, which can be maintained by the node computing system 1305 in communication with the capture device. In some implementations, each of the node computing systems 1305A-1305N can be in communication with at least two capture devices 1320. Each of the at least two capture devices in communication with a node computing system 1305 can have its own respective pose in a 3D space. As such, each node computing system 1305 can be used to capture a respective portion of a larger sensing volume, and therefore various different views of any detected dynamic objects. The classification of the dynamic object, as described herein, can be determined based on an agreement of classifications within a majority of the views that detect the dynamic object.

The storage 1315 can store the frames 1370 (sometimes referred to as sequence(s) of frames 1370) in one or more data structures. Each of the frames 1370 can be, for example, an image that is associated with a particular timestamp in a video stream captured from a video camera. In some implementations, each frame can itself be a still image captured by a corresponding capture device 1320, for example, on a periodic basis. Each frame 1370 can include pixels arranged in a grid that makes up the frame 1370 (e.g., as an image), where each pixel includes color data and location data that identifies the color and location of the pixel in the frame 1370. In some implementations, the capture device 1320 can capture the frames 1370 in one or more different color channels (e.g., each channel corresponding to a particular color wavelength). In some implementations, the image capture device 1320 can be a camera or video capture device that captures non-visible light (e.g., infrared light, etc.). Each color channel in a pixel of a frame 1370 can identify the intensity of a particular color of the pixel. These color intensity values (e.g., the color of each pixel in a frame 1370, etc.) can be used in one or more point of interest detection techniques, as described herein. In some implementations, the capture devices 1320 can be monochrome cameras that capture images or video streams that having a single intensity channel.

The storage 1315 can store one or more sets of points of interest 1375 in association with a respective sequence of frames 1370 captured by a corresponding capture device 1320. In other words, each of the capture devices 1320 can be associated with a respective set of points of interest 1375, which are detected and tracked across the sequences of frames 1370 captured by the capture device 1320. Each point of interest 1375 can be a point in a frame 1370 that is detected based on using a detection technique, such as a corner detection technique, an edge detection technique, a blob detection technique, a ridge detection technique, or other feature detection techniques. Each point of interest 1375 can correspond to one or more pixel coordinates in a frame, and can include parameters that indicate an intensity of one or more pixels in a frame 1370 that correspond to the point of interest. In some implementations, a point of interest 1375 can be tracked across one or more sequences of frames 1370.

For example, by performing a feature tracking technique, movement of points of interest 1375 (e.g., changes in pixel coordinates across consecutive frames) can be calculated. Some examples of feature tracking techniques include, for example, a KLT feature tracker, or other point feature matching techniques. Each point of interest 1375, including the parameters (e.g., pixel color values in a window, etc.) of each point of interest 1375 and coordinates of each point of interest across frames, and amount of movement of the point of interest in the pixel coordinate space, can be stored in one or more data structures in the storage 1315. The positions of the points of interest 1375 between two sequences of frames 1370 can be matched and used to map the points of interest into a 3D coordinate space. The movement of the 3D points of interest in the 3D coordinate space can be used to detect the presence of dynamic objects, which can cause the node computing system to generate a 3D volume surrounding a subset of the 3D points of interest. The 3D volumes surrounding a dynamic object in the 3D coordinate space can be used to generate a classification for the dynamic object, as described herein.

The storage 1315 can store one or more dynamic object trajectories 1380 in association with a respective identifier of the dynamic object to which the dynamic object trajectory 1380 corresponds. The dynamic object trajectory 1380 of a detected dynamic object can be determined based on historic movement patterns of the dynamic object across sequences of frames 1370 monitored by the node computing systems 1305. In general, the dynamic object trajectories 1380 can include a predicted pathway for the dynamic object in a 3D coordinate space and a corresponding probability value that represents the probability that the dynamic object will follow that pathway. In addition, the dynamic object trajectory 1380 can include historic movement data, such as average velocity values for the dynamic object in the 3D coordinate space, previous position information for the dynamic object in the 3D coordinate space, or other movement data related to the dynamic object. In some implementations, dynamic object trajectory 1380 can be determined in part based on a classification for the dynamic object. For example, a dynamic object classified as an airplane may be expected to move through the 3D coordinate space differently than a dynamic object classified as a helicopter. When determining a dynamic object trajectory 1380 for the dynamic object, a determined classification for the dynamic object may be used to perform a lookup in a lookup table that includes a set of movement rules for various dynamic objects. The movement rules can then be used in connection with the techniques described herein to estimate predicted pathways for the dynamic object in the 3D coordinate space. Further details of the determination of the dynamic object trajectory 1380 are described in further detail herein.

Referring now to the operations of the node computing system 1305, the frame receiver 1330 can receive a first sequence of frames 1370 captured by a first capture device 1320 having a first pose and a second sequence of frames 1370 captured by a second capture device 1320 having a second pose. In some implementations, the frame receiver 1330 can receive a first sequence of frames 1370 captured by a first capture device 1320 having a first pose and a second sequence of frames 1370 captured by a second capture device 1320 having a second pose. As described herein, the pose of each capture device 1320 in communication with the node computing system 1305 can be stored in association with an identifier of the respective capture device 1320, and the frames 1370 captured by the respective capture device, in the storage 1315. The sequences of frames 1370 can be any number of frames 1370. In some implementations, two corresponding frames 1370 can each be captured and provided by the capture devices 1320 in communication with the node computing system 1305 before the next frame 1370 in the sequence is retrieved, thereby synchronizing each sequence of frames 1370 captured by the capture devices 1320.

Each of the frames 1370 in each sequence of frames 1370 can be consecutive frames 1370 captured by a respective capture device 1320. For example, the frames 1370 can be consecutive frames 1370 captured as part of a video stream. In some implementations, the frames 1370 can be consecutively captured images (e.g., images captured periodically at a predetermined time interval by the capture device). Upon receiving the frames 1370, the frame receiver 1330 can store each frame 1370 in one or more data structures (e.g., a list, a queue, etc.) of frames 1370 corresponding to the capture device 1320 used to capture the respective frame 1370. In some implementations, an external computing device in communication with the second capture device can identify a set of points of interest in a second sequence of frames 1370 captured by the second capture device 1320, and transmit the second sequence of frames 1370 and the identified points of interest to the node computing system 1305.

The point tracker 1335 can track a first set of points of interest 1375 across the first sequence of frames 1370 over time and a second set of points of interest 1375 across the second sequence of frames 1370 over time. Each point of interest 1375 can be a point in a frame 1370 that is detected based on using a feature detection technique, such as a corner detection technique, an edge detection technique, a blob detection technique, or a ridge detection technique, on a frame 1370 in a sequence of frames 1370 captured by a capture device 1320. Each frame 1370 provided by each capture device 1320 can be provided as input to a feature detection technique, such as a corner detection technique, which can provide pixel coordinates in the input frame 1370 that correspond to detected points of interest 1375 as output. In addition, each detected point of interest 1375 can include parameters that indicate an intensity of one or more pixels in a frame 1370 that correspond to the point of interest 1375.

The point tracker 1335 can detect a set of points of interest 1375 for each frame 1370 in each sequence of frames 1370 captured by the capture devices 1320. Each set of points of interest 1375 can be stored in a data structure, such as a list, which can be stored in association with the frame 1370 in which the points were detected. In addition, the point tracker 1335 can track similar points of interest temporally as additional frames 1370 are captured and provided as part of the sequence of frames 1370. To do so, the point tracker 1335 can identify parameter correspondences between the pixels (e.g., a predetermined window size) of a point of interest 1375 in one frame 1370 and the pixels (e.g., the predetermined window size) in a point of interest 1375 in a consecutive frame 1370. The correspondence can be calculated as a correspondence score that reflects a likelihood that the point of interest 1375 in one frame 1370 depicts the same feature identified by a second point of interest 1375 in a consecutive frame 1370. If the score satisfies a predetermined threshold, the points of interest 1375 can be linked temporally and assigned the same identifier. The two-dimensional displacement (e.g., difference in pixel coordinates, etc.) of the point of interest 1375 from the first frame to the next consecutive frame 1370 can be tracked and determined by the point tracker 1335, and stored in association with a timestamp of each frame 1370 and the identifier of the point of interest 1375.

The point mapper 140 can map the first set of points of interest 1375 and the second set of points of interest 1735 to a corresponding set of 3D points of interest in a 3D coordinate space. The 3D points of interest can be mapped to the 3D coordinate space based on correspondences between the first set of points of interest 1375 and the second set of points of interest 1375. As described herein, each of the capture devices 1320 has a respective pose in a 3D space and is generally stationary while capturing the frames 1370. Using the known pose information for two capture devices 1320 capturing an overlapping environment at the same time, the point mapper 1340 can map one or more points of interest 1375 identified in each frame 1370 to a corresponding 3D point. To do so, the point mapper 1340 can identify a list of corresponding points of interest 1375 detected in a first frame 1370 captured by a first capture device 1320 and a corresponding second frame 1370 captured by a second capture device 1320 at substantially the same time.

Identifying point correspondences can include comparing a predetermined window between each point of interest 1375 detected in a first frame 1370 and each point of interest 1375 detected in a second frame 1370. In some implementations, the point mapper 1340 may utilize one or more constraints on correspondence mapping. For example, the point mapper 1340 may only attempt to identify corresponding points of interest 1375 in similar positions in both frames 1370 captured by the separate capture devices 1320. To identify a point correspondence, the point mapper 1340 can compare the pixels in the predetermined region surrounding a point of interest 1375 in a first frame 1370 with a predetermined region surrounding a candidate point of interest 1375 in a second frame 1370 and calculate a similarity score indicating the similarity between the two regions. If the score for the pair of points satisfies a threshold, the two points across both frames 1370 can be considered corresponding points for the purposes of 3D mapping. If the score of the pair does not satisfy a threshold, the point mapper 1340 can select a second candidate point in the second frame 1370 captured by the second capture device 1320 in accordance with any restrictions.

If the point mapper 1340 fails to identify correspondences between a predetermined number of the points of interest 1375 in a first frame 1370 captured by a first capture device 1320 and the points of interest 1375 in the second frame 1370 captured by the second capture device 1320, the point mapper 1340 can relax any constraints by searching for candidate matches anywhere in the second frame 1370. In some implementations, identifying corresponding points can be performed as sets of points by using a fitting algorithm, such as a RANSAC algorithm. Points that are co-registered with one another using the fitting algorithm are stored as corresponding points of interest 1375. The correspondences between the points of interest 1375 detected in the first frame 1370 captured by the first capture device 1320 and the points of interest 1375 detected in the second frame 1370 captured by the second capture device 1320 can be used to map each set of points of interest 1375 to a 3D coordinate space.

Because the rotation and position of each capture device 1320 are known at least relative to each other, the point mapper 1340 can determine a location for a 3D point for each point correspondence identified between the points of interest 1375 captured by the first capture device 1320 and the points of interest 1375 captured by the second capture device 1320. In particular, the point mapper 1340 can identify the location of a first point of interest 1375 of a point correspondence within the field of view of the first capture device 1320. Because the direction and position of the first capture device 1320 are known in the 3D coordinate space, in some implementations, the field of view of the first capture device 1320 can itself be represented in the 3D coordinate space. In addition, the field of view of a second capture device 1320 can be represented in the 3D coordinate space. By using epipolar geometry, and by matching the corresponding points of interest 1375 between in the first frame 1370 from the first capture device 1320 and the second frame 1370 from the second capture device 1320, the 3D location of each correspondence can be mapped to a 3D coordinate space.

The dynamic object detector 1345 can detect a dynamic object corresponding to a subset of the plurality of 3D points of interest 1375 in the 3D coordinate space. Because each 3D point is determined from a point correspondence, differences in position in the point correspondences over time can be translated into corresponding changes in 3D position in the 3D coordinate space. The dynamic object detector 1345 can determine a 3D displacement of a subset of the plurality of 3D points based on the first sequence of frames 1370 and the second sequence of frames 1370. For example, as a dynamic object moves in the field of view of each of the first capture device 1320 and the second capture device 1320, the movement of the dynamic object is captured chronologically across a sequence of frames 1370 by each capture device 1320. The points of interest 1375 that correspond to the dynamic object as represented in each sequence also change in coordinates over time and are tracked by the dynamic object detector 1345 as described herein. As each point of interest 1375 changes in position over time, the dynamic object detector 1345 can map changes in position of the corresponding 3D point of interest in the 3D coordinate space.

The dynamic object detector 1345 can iteratively (e.g., each time new frames 1370 are captured by the first and second capture devices 1320) determine changes in position of each tracked 3D point in the 3D coordinate space. These changes in position can be stored in association with any relevant data for further processing, including identifiers of frames 1370 from which the 3D points of interest were determined, timestamps, identifiers of individual points of interest in corresponding frames 1370, or identifiers of point correspondences identified by the dynamic object detector 1345. The subset of the 3D points of interest can be the points of interest in the sequences of frames that have a displacement that exceeds a displacement amount threshold, suggesting that the 3D points of interest represent a dynamic object. In some implementations, the dynamic object detector 1345 can group subsets of the 3D points of interest mapped from the sequences of frames 1370 based on average velocity and proximity. For example, if a group of 3D points of interest are close to one another in the 3D coordinate space, and exhibit a similar displacement over time, the dynamic object detector 1345 can group these 3D points of interest as a subset (e.g., by storing them in a data structure of variable size, etc.).

In some implementations, the dynamic object detector 1345 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame 1370, etc.).

In some implementations, the dynamic object detector 1345 can generate a 3D volume to surround the subset of the 3D points of interest in the 3D coordinate space. The 3D volume can be used as an initial classification filter, for example, to filter out dynamic objects that do not satisfy a predetermined size threshold. To generate a 3D volume that surrounds a dynamic object (e.g., the subset of 3D points that correspond to the dynamic object), the dynamic object detector 1345 can use the bounding regions regressed around a first frame 1370 captured by the first capture device 1320 and a corresponding second frame 1370 captured by the second capture device 1320. First, the dynamic object detector 1345 can detect a first bounding region that surrounds the dynamic object in the first frame 1370 and a second bounding region that surrounds the dynamic object in the second frame 1370 (which depicts the same dynamic object at the same time, but from a different perspective, or pose). The bounding regions can be detected using the bounding box regression model, as described herein.

The dynamic object detector 1345 can generate the 3D volume by projecting a pyramid shape from the focal point of each respective capture device 1320 through a boundary defined by the bounding region surrounding the subset of the 3D points of interest as represented in each respective frame 1370. The dynamic object detector 1345 can determine the 3D volume for the dynamic object by identifying an overlapping portion of each pyramid shape in the 3D coordinate space. In some implementations, each dimension of the 3D volume can be determined based on the size of each bounding region in each frame 1370. For example, the width and height of one bounding region can be used to determine the width and height of one face of the 3D volume that surrounds the dynamic object, and the other bounding region can be used to determine another face of the 3D volume.

If there are inconsistences between the two faces, the dynamic object detector 1345 can resolve the difference based on one or more policies. For example, if the heights of each face are different, the dynamic object detector 1345 may determine the average of the heights, and use the average height value as the height of the bounding region. In some implementations, the dynamic object detector 1345 may select one height value or the other (e.g., select the largest height value, select the smallest height value, etc.). Once the dimensions of the two adjacent faces of the 3D volume are determined the dynamic object detector 1345 can determine the dimensions of the remaining faces of the 3D volume through an induction process. For example, the dynamic object detector 1345 may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

The trajectory determiner 1350 can determine a predicted trajectory for the dynamic object based on an estimated velocity of the subset of the plurality of 3D points and a classification of the dynamic object. The estimated velocity of the subset of the 3D points of interest can be calculated based on the displacement of the subset of the 3D points of interest in the 3D coordinate space. To calculate the average velocity of each 3D point of interest, the trajectory determiner 1350 can divide the displacement of the 3D points of interest by the amount of time that has lapsed between capturing each of the sequences of frames 1370 used to detect the 3D points of interest. This average can be, for example, a rolling average (e.g., over a predetermined number of most-recent frames 1370) or an average value that is recalculated each time a new frame 1370 is captured and used to calculate up-to-date position information for each 3D point of interest.

The average velocity of each 3D point of interest can be stored in association with the respective 3D point of interest in one or more data structures. The trajectory determiner 1350 can calculate the average velocity of each of the subset of the 3D points of interest that correspond to the detected dynamic object. In some implementations, to determine the average velocity of the dynamic object, the trajectory determiner 1350 can calculate the mean of the average velocity of each 3D point of interest in the subset that corresponds to the dynamic object. The average velocity of the 3D object for each frame 1370 can be stored in association with a respective timestamp identifying when the respective frame 1370 was captured. In addition, the trajectory determiner 1350 can determine the average position of the dynamic object for each timestamp by calculating the average position of each 3D point in the subset corresponding to the dynamic object. Using these processes, the trajectory determiner 1350 can generate list of velocity values and position values that identifies the location and velocity of the dynamic object over time. The list can be updated as new frames 1370 are captured by the capture devices 1320.

The predicted dynamic object trajectories 1380 can be further calculated based on a classification of the dynamic object. To determine the classification of the dynamic object, the trajectory determiner 1350 can first perform a filtering process by comparing the 3D volume surrounding the dynamic object to a predetermined size threshold, as described herein. If the threshold is not satisfied, the trajectory determiner 1350 can classify the dynamic object as "not of interest," and cease further processing on the dynamic object. If the size threshold is satisfied, the trajectory determiner 1350 can provide frames 1370 depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the trajectory determiner 1350 and the other node computing systems 1305A-1305N, as described in Section D. The classification of the dynamic object can be used by the trajectory determiner 1350 to estimate one or more dynamic object trajectories 1380 for the dynamic object.

To estimate a dynamic object trajectory, the trajectory determiner 1350 can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The trajectory determiner 1350 can apply the previously determined velocity and position values to these movement rules to identify one or more dynamic object trajectories. In some implementations, the movement rules may indicate probability values for various maneuvers or movements that a dynamic object may perform at various velocity ranges.

Using the probability values in the movement rules that correspond to the average velocity of the dynamic object over time, the trajectory determiner 1350 can estimate one or more future pathways that the dynamic object can take, and an estimated probability value for each future pathway. To estimate a future pathway, the trajectory determiner 1350 can identify a change in velocity associated with each potential maneuver in the movement rules, and can use the change in velocity and the current velocity of the dynamic object to estimate future positions for the dynamic object over time. The trajectory determiner 1350 can perform these steps for each potential maneuver performed by the dynamic object to estimate the dynamic object trajectories 1380 for the dynamic object. As new frames 1370 are captured by the capture devices 1320, the trajectory determiner 1350 can continuously estimate and update the dynamic object trajectories 1380 for the dynamic object over time, and store each dynamic object trajectory 1380 in association with a respective probability value that indicates the probability that the dynamic object will follow that trajectory.

Figure 14:
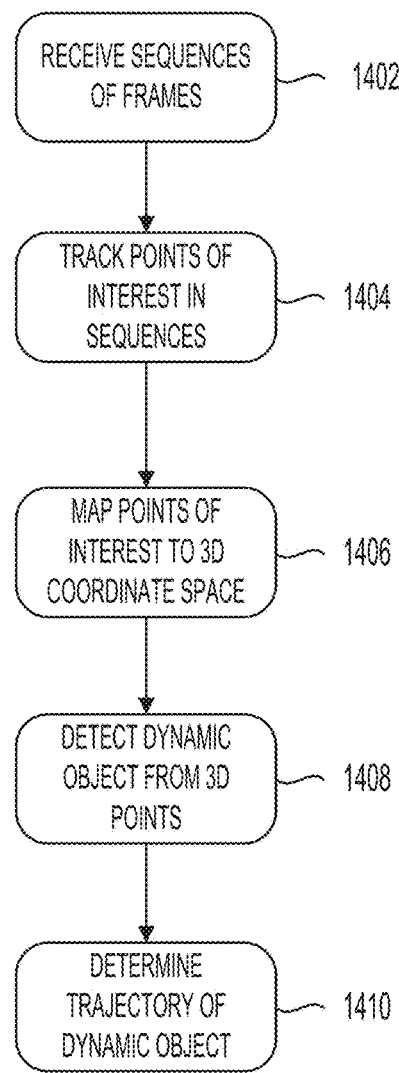
FIG. 14 illustrates an example flow diagram of a method for probabilistically predicting paths of objects detected in a sensing volume, in accordance with one or more implementations.

Referring now to FIG. 14, illustrated is an example flow diagram of a method 1400 for probabilistically predicting paths of dynamic objects detected in a sensing volume, in accordance with one or more implementations. The method 1400 can be executed, performed, or otherwise carried out by the node computing system 1305, the computer system 2000 described herein in conjunction with FIGS. 20A and 20B, or any other computing devices described herein. In brief overview, the node computing system (e.g., the node computing system 1305, etc.) can receive one or more sequences of frames (e.g., the frames 1370) (STEP 1402), track the points of interest (e.g., the points of interest 1375) in the sequences of frames (STEP 1404), map the points of interest to a 3D coordinate space (STEP 1406), detect a dynamic object from the 3D points of interest (STEP 1408), and determine one or more predicted dynamic object trajectories (e.g., the dynamic object trajectories 1380) for the dynamic object (STEP 1410).

In further detail, the node computing system (e.g., the node computing system 1305, etc.) can receive one or more sequences of frames (e.g., the frames 1370) (STEP 1402). As described herein, each node computing system can be in communication with at least two capture devices (e.g., the capture devices 1320), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track the points of interest (e.g., the points of interest 1375) in the sequences of frames (STEP 1404). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

The node computing system can map the points of interest to a 3D coordinate space (STEP 1406). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, identifying corresponding points can be performed as sets of points by using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can detect a dynamic object from the 3D points of interest (STEP 1408). Because each 3D point is determined from a point correspondence, differences in position in the point correspondences over time can be translated into corresponding changes in 3D position in the 3D coordinate space. The node computing system can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein. As each point of interest changes in position over time, the node computing system can map changes in position of the corresponding 3D point of interest in the 3D coordinate space.

The node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

In some implementations, the node computing system can generate a 3D volume to surround the subset of the 3D points of interest in the 3D coordinate space. The 3D volume can be used as an initial classification filter, for example, to filter out dynamic objects that do not satisfy a predetermined size threshold. To generate a 3D volume that surrounds a dynamic object (e.g., the subset of 3D points that correspond to the dynamic object), the node computing system can use the bounding regions regressed around a first frame captured by the first capture device and a corresponding second frame captured by the second capture device. First, the node computing system can detect a first bounding region that surrounds the dynamic object in the first frame and a second bounding region that surrounds the dynamic object in the second frame (which depicts the same dynamic object at the same time, but from a different perspective, or pose). The bounding regions can be detected using the bounding box regression model, as described herein.

The node computing system can generate the 3D volume by projecting a pyramid shape from the focal point of each respective capture device through a boundary defined by the bounding region surrounding the subset of the 3D points of interest as represented in each respective frame. The node computing system can determine the 3D volume for the dynamic object by identifying an overlapping portion of each pyramid shape in the 3D coordinate space. In some implementations, each dimension of the 3D volume can be determined based on the size of each bounding region in each frame. For example, the width and height of one bounding region can be used to determine the width and height of one face of the 3D volume that surrounds the dynamic object, and the other bounding region can be used to determine another face of the 3D volume.

If there are inconsistences between the two faces, the node computing system can resolve the difference based on one or more policies. For example, if the heights of each face are different, the node computing system may determine the average of the heights, and use the average height value as the height of the bounding region. In some implementations, the node computing system may select one height value or the other (e.g., select the largest height value, select the smallest height value, etc.). Once the dimensions of the two adjacent faces of the 3D volume are determined the node computing system can determine the dimensions of the remaining faces of the 3D volume through an induction process. For example, the node computing system may generate a cuboid to surround the dynamic object, and use the determined dimensions of the first two faces to calculate the area of the remaining faces of the 3D volume. Other 3D volumes are also possible using different 3D volume generation policies (e.g., generating a sphere that surrounds the dynamic object, generating other volume types, etc.).

The node computing system can determine one or more predicted dynamic object trajectories (e.g., the dynamic object trajectories 1380) for the dynamic object (STEP 1410). The node computing system can determine a predicted trajectory for the dynamic object based on an estimated velocity of the subset of the plurality of 3D points and a classification of the dynamic object. The estimated velocity of the subset of the 3D points of interest can be calculated based on the displacement of the subset of the 3D points of interest in the 3D coordinate space. To calculate the average velocity of each 3D point of interest, the node computing system can divide the displacement of the 3D points of interest by the amount of time that has lapsed between capturing each of the sequences of frames used to detect the 3D points of interest. This average can be, for example, a rolling average (e.g., over a predetermined number of most-recent frames) or an average value that is recalculated each time a new frame 970 is captured and used to calculate up-to-date position information for each 3D point of interest.

The average velocity of each 3D point of interest can be stored in association with the respective 3D point of interest in one or more data structures. The node computing system can calculate the average velocity of each of the subset of the 3D points of interest that correspond to the detected dynamic object. In some implementations, to determine the average velocity of the dynamic object, the node computing system can calculate the mean of the average velocity of each 3D point of interest in the subset that corresponds to the dynamic object. The average velocity of the 3D object for each frame can be stored in association with a respective timestamp identifying when the respective frame was captured. In addition, the node computing system can determine the average position of the dynamic object for each timestamp by calculating the average position of each 3D point in the subset corresponding to the dynamic object. Using these processes, the node computing system can generate list of velocity values and position values that identifies the location and velocity of the dynamic object over time. The list can be updated as new frames are captured by the capture devices.

The predicted dynamic object trajectories can be further calculated based on a classification of the dynamic object. To determine the classification of the dynamic object, the node computing system can first perform a filtering process by comparing the 3D volume surrounding the dynamic object to a predetermined size threshold, as described herein. If the threshold is not satisfied, the node computing system can classify the dynamic object as "not of interest," and cease further processing on the dynamic object. If the size threshold is satisfied, the node computing system can provide frames depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the node computing system and the other node computing systems 1305A-1305N, as described in Section D. The classification of the dynamic object can be used by the node computing system to estimate one or more dynamic object trajectories for the dynamic object.

To estimate a dynamic object trajectory, the node computing system can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The node computing system can apply the previously determined velocity and position values to these movement rules to identify one or more dynamic object trajectories. In some implementations, the movement rules may indicate probability values for various maneuvers or movements that a dynamic object may perform at various velocity ranges.

Using the probability values in the movement rules that correspond to the average velocity of the dynamic object over time, the node computing system can estimate one or more future pathways that the dynamic object can take, and an estimated probability value for each future pathway. To estimate a future pathway, the node computing system can identify a change in velocity associated with each potential maneuver in the movement rules, and can use the change in velocity and the current velocity of the dynamic object to estimate future positions for the dynamic object over time. The node computing system can perform these steps for each potential maneuver performed by the dynamic object to estimate the dynamic object trajectories for the dynamic object. As new frames are captured by the capture devices, the node computing system can continuously estimate and update the dynamic object trajectories for the dynamic object over time, and store each dynamic object trajectory in association with a respective probability value that indicates the probability that the dynamic object will follow that trajectory.

F. Assessing Risk of Objects in a Sensing Volume Using a Mesh Network of Nodes Coupled to Cameras In addition to predicting trajectories of dynamic objects, when monitoring a monitoring a sensing volume that surrounds a protected volume, it is important to estimate the probability, or risk, that a dynamic object will intersect the protected volume. In general, dynamic objects that are more likely to be present within the protected volume for longer periods of time present a higher risk to the protected volume. Protected volumes may be areas in which aerial vehicles are tested or launched, or may be a portion of an environment that should remain free from unauthorized aircraft. However, it is challenging to accurately monitor and predict the amount of time a dynamic object will intersect with a protected volume.

The systems and methods of this technical solution solve these and other issues by providing a mesh of sensing nodes that are used to maintain safety inside a protected volume. When an external aircraft or other dynamic object is entering the external sensing volume, assessments are made using a mesh network of nodes coupled to cameras (e.g., sensing nodes) regarding the likelihood of a protected volume breach by the intruding aircraft. To this end, a predictive approach is taken, which can projects intruding aircraft trajectory in a 3D coordinate space, and can predicts an intended path to understand if intruding aircraft will enter the protected volume. The prediction can be a probabilistic one that predicts multiple potential paths for the dynamic object along with probabilities that the dynamic object will follow each path. The risk assessment can be estimated on a per-dynamic object basis, and can be sorted by time to breach the protected volume and by the level of penetration of the protected volume.

Figure 15:
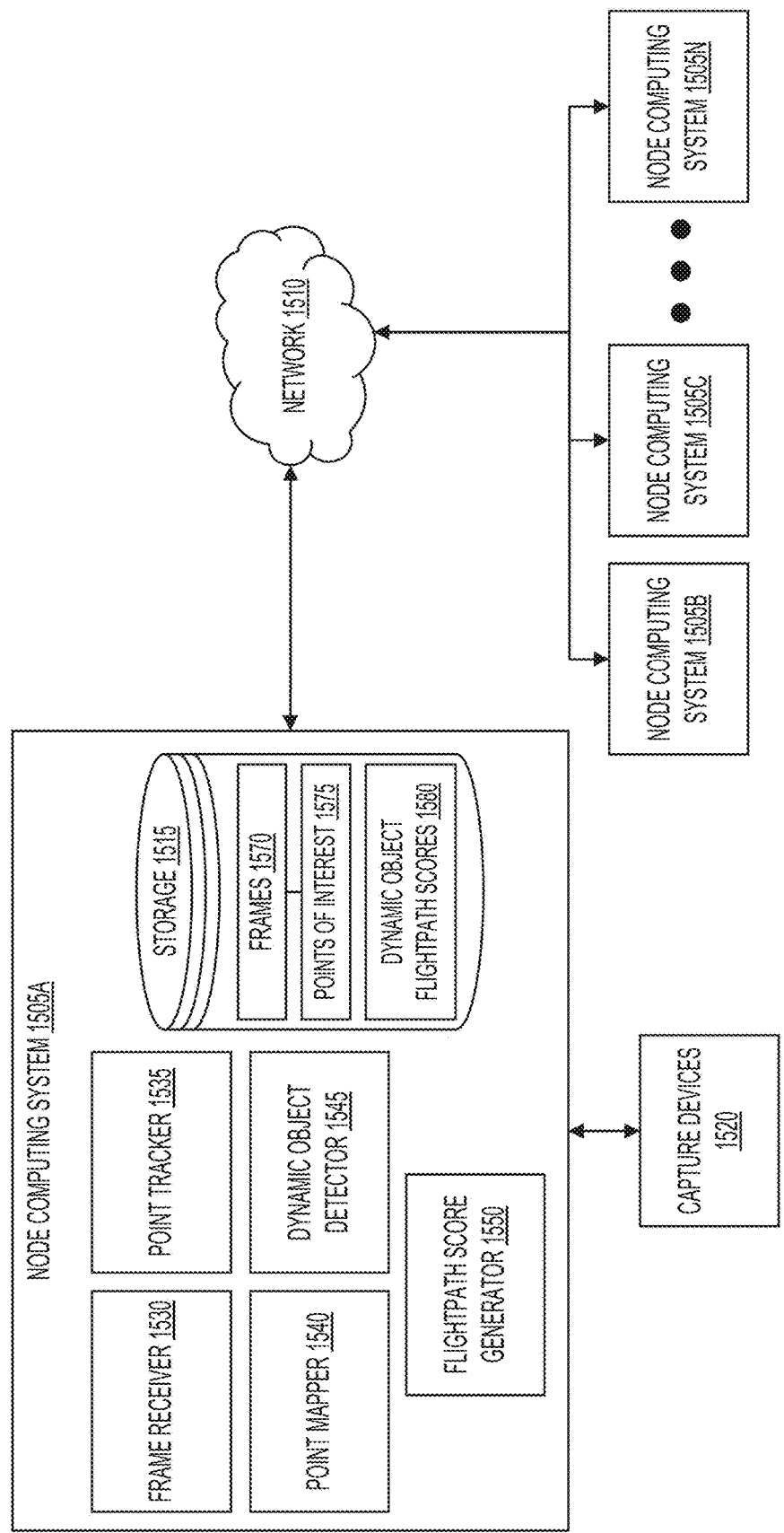
FIG. 15 illustrates a block diagram of an example system for assessing risk of objects detected in a sensing volume using a mesh network of nodes coupled to cameras, in accordance with one or more implementations.

Referring now to FIG. 15, illustrated is a block diagram of an example system 1500 for assessing risk of objects detected in a sensing volume using a mesh network of nodes coupled to cameras, in accordance with one or more implementations. The system 1500 can include one or more node computing systems 1505A-1505N (sometimes generally referred to herein as node computing system(s) 1505), and at least one network 1510. Each node computing system 1505 can be in communication with one or more capture devices 1520. Each node computing system 1505 can include at least one frame receiver 1530, at least one point tracker 1535, at least one point mapper 1540, at least one dynamic object detector 1545, and at least one flightpath score generator 1550, and at least one storage 1515. The storage 1515 can store one or more frames 1570 (sometimes referred to as one or more sequence(s) of frames 1570), one or more points of interest 1575, and one or more dynamic object classifications 1580. In some implementations, the storage 1515 can be external to the node computing system 1505, for example, as part of one or more servers or other computing devices in communication with the node computing system 1505 via the network 1510.

Each of the node computing systems 1505, the capture devices 1520, the network 1510, the storage 1515, the frame receiver 1530, the point tracker 1535, the point mapper 1540, the dynamic object detector 1545, and the flightpath score generator 1550 of the system 1500 can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 1505 can include any of the functionality of the node computing systems 105, the node computing systems 605, the node computing systems 905, the node computing systems 1105, the node computing systems 1305, and the node computing systems 1805, described herein in connection with FIGS. 1, 6, 9, 11, 13, and 18, respectively. Each of the components of the node computing system 1505 can perform the functionalities detailed herein.

The node computing system 1505 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 1505 can include one or more computing devices or servers that can perform various functions as described herein. The node computing system 1505 can include any or all of the components and perform any or all of the functions of the computer system 2000 described herein in conjunction with FIGS. 20A and 20B.

The network 1510 can include computer networks such as the Internet, local, wide, metro or other area networks, intranets, satellite networks, other computer networks such as voice or data mobile phone communication networks, radio communication interfaces, and combinations thereof. The node computing system 1505A of the system 1500 can communicate via the network 1510, for instance with at least one other node computing system 1505B-1505N. The network 1510 may be any form of computer network that can relay information between the node computing system 1505A, the node computing systems 1505B-1505N, and one or more other computing systems, such as a flight computing system or another remote server in communication with the node computing systems 1505.

In some implementations, the network 1510 may include the Internet and/or other types of data networks, such as a LAN, a WAN, a cellular network, a satellite network, or other types of data networks. The network 1510 may also include any number of computing devices (e.g., computers, servers, routers, network switches, etc.) that are configured to receive and/or transmit data within the network 1510. The network 1510 may further include any number of hardwired and/or wireless connections. Any or all of the computing devices described herein (e.g., the node computing system 1505, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 1510. Any or all of the computing devices described herein (e.g., the node computing system 1505, the computer system 2000, etc.) may also communicate wirelessly with the computing devices of the network 1510 via a proxy device (e.g., a router, network switch, or gateway).

The storage 1515 can be a database configured to store and/or maintain any of the information described herein. The storage 1515 can maintain one or more data structures, which may contain, index, or otherwise store each of the values, pluralities, sets, variables, vectors, thresholds, or other data used in the processing operations described herein. The storage 1515 can be accessed using one or more memory addresses, index values, or identifiers of any item, structure, or region maintained in the storage 1515. The storage 1515 can be accessed by the components of the node computing system 1505, or any other computing device described herein, via the network 1510. In some implementations, the storage 1515 can be internal to the node computing system 1505. In some implementations, the storage 1515 can exist external to the node computing system 1505, and may be accessed via the network 1510. The storage 1515 can be distributed across many different computer systems or storage elements, and may be accessed via the network 1510 or a suitable computer bus interface. The node computing system 1505 can store, in one or more regions of the memory of the node computing system 1505, or in the storage 1515, the results of any or all computations, determinations, selections, identifications, generations, constructions, or calculations in one or more data structures indexed or identified with appropriate values.

The one or more capture devices 1520 can be, for example, any sort of camera capable of capturing one or more frames 1570. In some implementations, the capture device 1520 is a video camera capable of producing a video stream. In some implementations, the capture device 1520 is an image capture device that can capture images in response to a condition, such as a capture signal or on a predetermined periodic basis. In some implementations, the capture device 1520 can be associated with a respective pose, which can be maintained by the node computing system 1505 in communication with the capture device. In some implementations, each of the node computing systems 1505A-1505N can be in communication with at least two capture devices 1520. Each of the at least two capture devices in communication with a node computing system 1505 can have its own respective pose in a 3D space. As such, each node computing system 1505 can be used to capture a respective portion of a larger sensing volume, and therefore various different views of any detected dynamic objects. The classification of the dynamic object, as described herein, can be determined based on an agreement of classifications within a majority of the views that detect the dynamic object.

The storage 1515 can store the frames 1570 (sometimes referred to as sequence(s) of frames 1570) in one or more data structures. Each of the frames 1570 can be, for example, an image that is associated with a particular timestamp in a video stream captured from a video camera. In some implementations, each frame 1570 can itself be a still image captured by a corresponding capture device 1520, for example, on a periodic basis. Each frame 1570 can include pixels arranged in a grid that makes up the frame 1570 (e.g., as an image), where each pixel includes color data and location data that identifies the color and location of the pixel in the frame 1570. In some implementations, the capture device 1520 can capture the frames 1570 in one or more different color channels (e.g., each channel corresponding to a particular color wavelength). In some implementations, the image capture device 1520 can be a camera or video capture device that captures non-visible light (e.g., infrared light, etc.). Each color channel in a pixel of a frame 1570 can identify the intensity of a particular color of the pixel. These color intensity values (e.g., the color of each pixel in a frame 1570, etc.) can be used in one or more point of interest detection techniques, as described herein. In some implementations, the capture devices 1520 can be monochrome cameras that capture images or video streams that having a single intensity channel.

The storage 1515 can store one or more sets of points of interest 1575 in association with a respective sequence of frames 1570 captured by a corresponding capture device 1520. In other words, each of the capture devices 1520 can be associated with a respective set of points of interest 1575, which are detected and tracked across the sequences of frames 1570 captured by the capture device 1520. Each point of interest 1575 can be a point in a frame 1570 that is detected based on using a detection technique, such as a corner detection technique, an edge detection technique, a blob detection technique, a ridge detection technique, or other feature detection techniques. Each point of interest 1575 can correspond to one or more pixel coordinates in a frame 1570, and can include parameters that indicate an intensity of one or more pixels in a frame 1570 that correspond to the point of interest 1575. In some implementations, a point of interest 1575 can be tracked across one or more sequences of frames 1570.

For example, by performing a feature tracking technique, movement of points of interest 1575 (e.g., changes in pixel coordinates across consecutive frames 1570) can be calculated. Some examples of feature tracking techniques include, for example, a KLT feature tracker, or other point feature matching techniques. Each point of interest 1575, including the parameters (e.g., pixel color values in a window, etc.) of each point of interest 1575 and coordinates of each point of interest 1575 across frames 1570, and amount of movement of the point of interest 1570 in the pixel coordinate space, can be stored in one or more data structures in the storage 1515. The positions of the points of interest 1575 between two sequences of frames 1570 can be matched and used to map the points of interest into a 3D coordinate space. The movement of the 3D points of interest 1575 in the 3D coordinate space can be used to detect the presence of dynamic objects, which can cause the node computing system to generate a 3D volume surrounding a subset of the 3D points of interest 1575. The 3D volumes surrounding a dynamic object in the 3D coordinate space can be used to generate a classification for the dynamic object, as described herein. The classification of the dynamic object can be used to determine a predicted trajectory for the dynamic object.

The storage 1515 can store one or more dynamic object flightpath scores 1580 for each detected dynamic object. The flightpath scores can indicate an overall level of risk that a dynamic object will penetrate a protected volume. The flightpath scores 1580 can be generated by predicting a number of predicted trajectories for the dynamic object (e.g., as described herein in Section E), and then selecting the predicted trajectory with the highest probability. The predicted trajectory for each detected dynamic object can be applied to a current position of the dynamic object in the 3D coordinate space. If the pathway of the dynamic object intersects with a protected volume, the node computing system 1505 can calculate the amount of time until the dynamic object intersects with the protected volume, and use the amount of time as a factor in computing the flightpath score 1580. The flightpath score 1580 can also be calculated based on the time in which the dynamic object is likely to spend within the protected volume. For example, a dynamic object that is predicted to intersect with the protected volume for a very short amount of time may have a lower flightpath score 1580 (e.g., a lower overall risk) than a dynamic object that is predicted to intersect with the dynamic object for a much longer amount of time. Another factor in calculating the flightpath score 1580 can be the number of predicted pathways for the dynamic object that cause the dynamic object to intersect with the protected volume. As described herein, a number of predicted pathways, each with corresponding probability values, are determined for each dynamic object. In situations where multiple pathways are predicted for a single dynamic object, the flightpath 1580 score can be a function of a total probability that the dynamic object will intersect with the protected volume across all potential pathways. An example of predicting a number of pathways for a dynamic object that can potentially intersect with a sensing volume is shown in FIG. 16.

Figure 16:
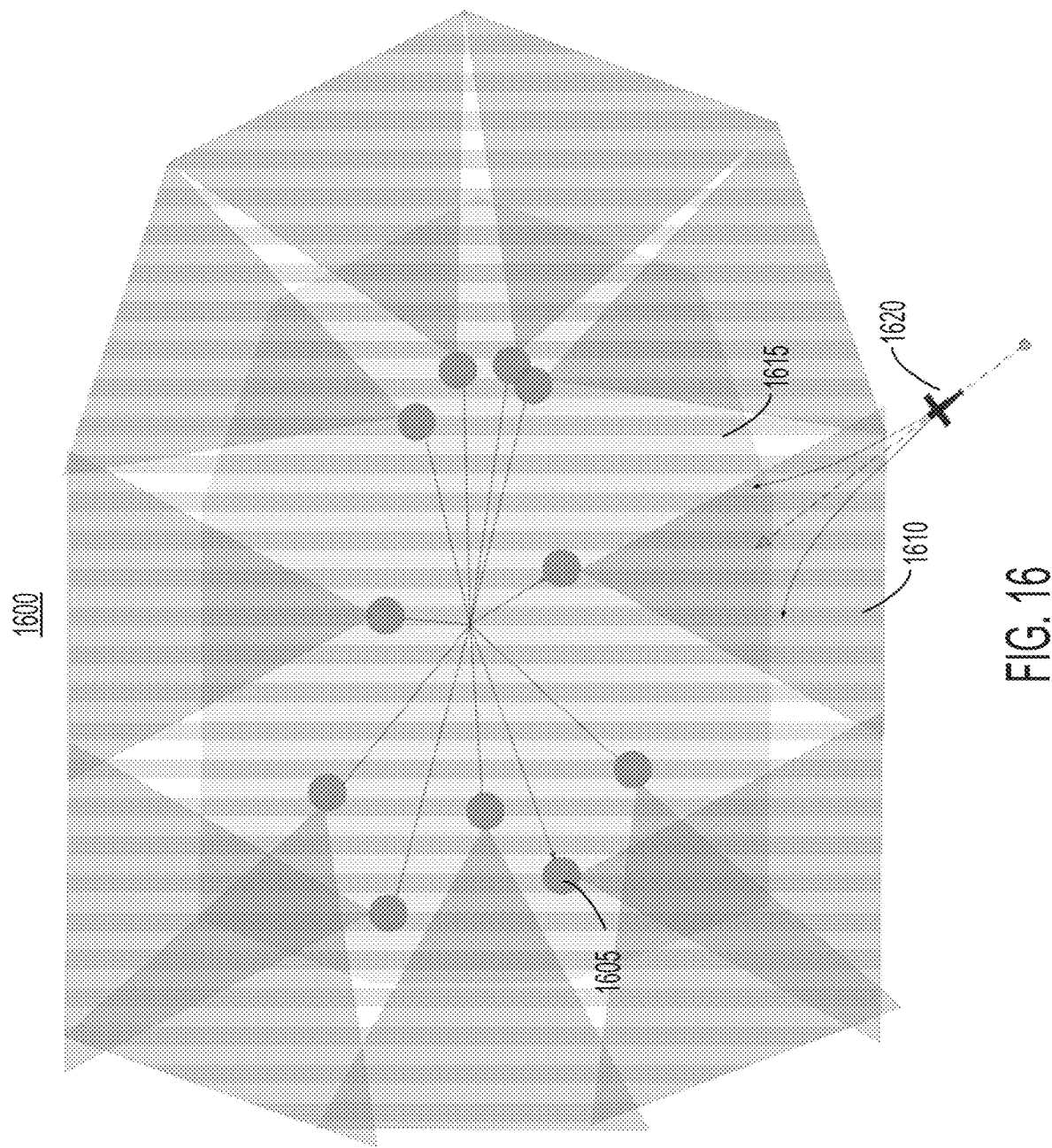
FIG. 16 illustrates an example diagram of a mesh network of nodes coupled to cameras positioned to monitor a sensing volume that surrounds a secure volume, in accordance with one or more implementations.

Referring briefly now to FIG. 16, illustrated is an example diagram of a mesh network of nodes coupled to cameras 1605 positioned to monitor a sensing volume 1610 that surrounds a secure volume 1615, in accordance with one or more implementations. As shown, a dynamic object 1620 has been detected within a portion of the sensing volume 1610 by a respective node computing system 1605. The node computing system 1605 has computed several pathways that the dynamic object 1620 may follow, and has selected the pathway having the dotted line as the most likely trajectory for the dynamic object 1620. Because the predicted trajectory for the dynamic object 1620 indicates the dynamic object 1620 will likely intersect with the secure volume 1615, the node computing system 1605 will likely calculate a high flightpath score for the dynamic object 1620. The flightpath score 1580 can be used in various other operations described herein, and can be communicated to other node computing systems 1605 or other external computing systems to accommodate for the potential risk of intrusion.

Referring back now to FIG. 15, and to the operations of the node computing system 1505, the frame receiver 1530 can receive a first sequence of frames 1570 captured by a first capture device 1520 having a first pose and a second sequence of frames 1570 captured by a second capture device 1520 having a second pose. In some implementations, the frame receiver 1530 can receive a first sequence of frames 1570 captured by a first capture device 1520 having a first pose and a second sequence of frames 1570 captured by a second capture device 1520 having a second pose. As described herein, the pose of each capture device 1520 in communication with the node computing system 1505 can be stored in association with an identifier of the respective capture device 1520, and the frames 1570 captured by the respective capture device, in the storage 1515. The sequences of frames 1570 can be any number of frames 1570. In some implementations, two corresponding frames 1570 can each be captured and provided by the capture devices 1520 in communication with the node computing system 1505 before the next frame 1570 in the sequence is retrieved, thereby synchronizing each sequence of frames 1570 captured by the capture devices 1520.

Each of the frames 1570 in each sequence of frames 1570 can be consecutive frames 1570 captured by a respective capture device 1520. For example, the frames 1570 can be consecutive frames captured as part of a video stream. In some implementations, the frames 1570 can be consecutively captured images (e.g., images captured periodically at a predetermined time interval by the capture device). Upon receiving the frames 1570, the frame receiver 1530 can store each frame 1570 in one or more data structures (e.g., a list, a queue, etc.) of frames 1570 corresponding to the capture device 1520 used to capture the respective frame 1570. In some implementations, an external computing device in communication with the second capture device 1520 can identify a set of points of interest 1575 in a second sequence of frames 1570 captured by the second capture device 1520, and transmit the second sequence of frames 1570 and the identified points of interest 1575 to the node computing system 1505.

The point tracker 1535 can track a first set of points of interest 1575 across the first sequence of frames 1570 over time and a second set of points of interest 1575 across the second sequence of frames 1570 over time. Each point of interest 1575 can be a point in a frame 1570 that is detected based on using a feature detection technique, such as a corner detection technique, an edge detection technique, a blob detection technique, or a ridge detection technique, on a frame 1570 in a sequence of frames 1570 captured by a capture device 1520. Each frame 1570 provided by each capture device 1520 can be provided as input to a feature detection technique, such as a corner detection technique, which can provide pixel coordinates in the input frame 1570 that correspond to detected points of interest 1575 as output. In addition, each detected point of interest 1575 can include parameters that indicate an intensity of one or more pixels in a frame 1570 that correspond to the point of interest 1575.

The point tracker 1535 can detect a set of points of interest 1575 for each frame 1570 in each sequence of frames 1570 captured by the capture devices 1520. Each set of points of interest 1575 can be stored in a data structure, such as a list, which can be stored in association with the frame 1570 in which the points were detected. In addition, the point tracker 1535 can track similar points of interest 1575 temporally as additional frames 1570 are captured and provided as part of the sequence of frames 1570. To do so, the point tracker 1535 can identify parameter correspondences between the pixels (e.g., a predetermined window size) of a point of interest 1575 in one frame 1570 and the pixels (e.g., the predetermined window size) in a point of interest 1575 in a consecutive frame 1570. The correspondence can be calculated as a correspondence score that reflects a likelihood that the point of interest 1575 in one frame 1570 depicts the same feature identified by a second point of interest 1575 in a consecutive frame 1570. If the score satisfies a predetermined threshold, the points of interest 1575 can be linked temporally and assigned the same identifier. The two-dimensional displacement (e.g., difference in pixel coordinates, etc.) of the point of interest 1575 from the first frame 1570 to the next consecutive frame 1570 can be tracked and determined by the point tracker 1535, and stored in association with a timestamp of each frame 1570 and the identifier of the point of interest 1575.

The point mapper 1540 can map the first set of points of interest 1575 and the second set of points of interest 1575 to a corresponding set of 3D points of interest in a 3D coordinate space. The 3D points of interest can be mapped to the 3D coordinate space based on correspondences between the first set of points of interest 1575 and the second set of points of interest 1575. As described herein, each of the capture devices 1520 has a respective pose in a 3D space and is generally stationary while capturing the frames 1570. Using the known pose information for two capture devices 1520 capturing an overlapping environment at the same time, the point mapper 1540 can map one or more points of interest 1575 identified in each frame 1570 to a corresponding 3D point. To do so, the point mapper 1540 can identify a list of corresponding points of interest 1575 detected in a first frame 1570 captured by a first capture device 1520 and a corresponding second frame 1570 captured by a second capture device 1520 at substantially the same time.

Identifying point correspondences can include comparing a predetermined window between each point of interest 1575 detected in a first frame 1570 and each point of interest 1575 detected in a second frame 1570. In some implementations, the point mapper 1540 may utilize one or more constraints on correspondence mapping. For example, the point mapper 1540 may only attempt to identify corresponding points of interest 1575 in similar positions in both frames 1570 captured by the separate capture devices 1520. To identify a point correspondence, the point mapper 1540 can compare the pixels in the predetermined region surrounding a point of interest 1575 in a first frame 1570 with a predetermined region surrounding a candidate point of interest 1575 in a second frame 1570 and calculate a similarity score indicating the similarity between the two regions. If the score for the pair of points satisfies a threshold, the two points across both frames 1570 can be considered corresponding points for the purposes of 3D mapping. If the score of the pair does not satisfy a threshold, the point mapper 1540 can select a second candidate point in the second frame 1570 captured by the second capture device 1520 in accordance with any restrictions.

If the point mapper 1540 fails to identify correspondences between a predetermined number of the points of interest 1575 in a first frame 1570 captured by a first capture device 1520 and the points of interest 1575 in the second frame 1570 captured by the second capture device 1520, the point mapper 1540 can relax any constraints by searching for candidate matches anywhere in the second frame 1570. In some implementations, identifying corresponding points can be performed as sets of points by using a fitting algorithm, such as a RANSAC algorithm. Points that are co-registered with one another using the fitting algorithm are stored as corresponding points of interest 1575. The correspondences between the points of interest 1575 detected in the first frame 1570 captured by the first capture device 1520 and the points of interest 1575 detected in the second frame 1570 captured by the second capture device 1520 can be used to map each set of points of interest 1575 to a 3D coordinate space.

Because the rotation and position of each capture device 1520 are known at least relative to each other, the point mapper 1540 can determine a location for a 3D point for each point correspondence identified between the points of interest 1575 captured by the first capture device 1520 and the points of interest 1575 captured by the second capture device 1520. In particular, the point mapper 1540 can identify the location of a first point of interest 1575 of a point correspondence within the field of view of the first capture device 1520. Because the direction and position of the first capture device 1520 are known in the 3D coordinate space, in some implementations, the field of view of the first capture device 1520 can itself be represented in the 3D coordinate space. In addition, the field of view of a second capture device 1520 can be represented in the 3D coordinate space. By using epipolar geometry, and by matching the corresponding points of interest 1575 between in the first frame 1570 from the first capture device 1520 and the second frame 1570 from the second capture device 1520, the 3D location of each correspondence can be mapped to a 3D coordinate space.

The dynamic object detector 1545 can detect a dynamic object corresponding to a subset of the 3D points of interest. Because each 3D point is determined from a point correspondence, differences in position in the point correspondences over time can be translated into corresponding changes in 3D position in the 3D coordinate space. The dynamic object detector 1545 can determine a 3D displacement of a subset of the plurality of 3D points based on the first sequence of frames 1570 and the second sequence of frames 1570. For example, as a dynamic object moves in the field of view of each of the first capture device 1520 and the second capture device 1520, the movement of the dynamic object is captured chronologically across a sequence of frames 1570 by each capture device 1520. The points of interest 1575 that correspond to the dynamic object as represented in each sequence also change in coordinates over time and are tracked by the dynamic object detector 1545 as described herein. As each point of interest 1575 changes in position over time, the dynamic object detector 1545 can map changes in position of the corresponding 3D point of interest in the 3D coordinate space.

The dynamic object detector 1545 can iteratively (e.g., each time new frames are captured by the first and second capture devices) determine changes in position of each tracked 3D point in the 3D coordinate space. These changes in position can be stored in association with any relevant data for further processing, including identifiers of frames 1570 from which the 3D points of interest were determined, timestamps, identifiers of individual points of interest in corresponding frames 1570, or identifiers of point correspondences identified by the dynamic object detector 1545. The subset of the 3D points of interest can be the points of interest in the sequences of frames that have a displacement that exceeds a displacement amount threshold, suggesting that the 3D points of interest represent a dynamic object. In some implementations, the dynamic object detector 1545 can group subsets of the 3D points of interest mapped from the sequences of frames 1570 based on average velocity and proximity. For example, if a group of 3D points of interest are close to one another in the 3D coordinate space, and exhibit a similar displacement over time, the dynamic object detector 1545 can group these 3D points of interest as a subset (e.g., by storing them in a data structure of variable size, etc.).

In some implementations, the dynamic object detector 1545 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The flightpath score generator 1550 can generate a flightpath score for the dynamic object based on a predicted trajectory of the dynamic object and a predetermined region in the 3D coordinate space (e.g., a protected volume). As described herein above, the flightpath score of the dynamic object can indicate an overall level of risk that a dynamic object will penetrate a protected volume. To calculate the dynamic object flightpath score 1580, the flightpath score generator 1550 can first determine one or more predict trajectories for the dynamic object. As described in greater detail in Section E, the predicted trajectories of the dynamic objects can be calculated based on an estimated velocity of each of the subset of 3D points of interest corresponding to the dynamic object. The estimated velocity is calculated by dividing a 3D displacement of the subset of the 3D points of interest by the amount of time that has passed between frames depicting the point correspondences used to map to the 3D points of interest. In addition, and as described in greater detail herein above in Sections D and E, the predicted trajectories for the dynamic object can also be calculated based on a classification for the dynamic object.

The flightpath generator 1550 can generate the classification of the dynamic object based on the first sequence of frames and the second sequence of frames. To determine the classification of the dynamic object, the flightpath score generator 1550 can first perform a filtering process by comparing the 3D volume surrounding the dynamic object to a predetermined size threshold, as described herein. If the threshold is not satisfied, the flightpath score generator 1550 can classify the dynamic object as "not of interest," and cease further processing on the dynamic object. If the size threshold is satisfied, the flightpath score generator 1550 can provide frames 1570 depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the flightpath score generator 1550 and the other node computing systems 1505A-1505N, as described in Sections D and E. The classification of the dynamic object can be used by the flightpath score generator 1550 to estimate one or more dynamic object trajectories for the dynamic object.

To estimate a dynamic object trajectory, the flightpath score generator 1550 can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The flightpath score generator 1550 can apply the previously determined velocity and position values to these movement rules to identify one or more dynamic object trajectories. In some implementations, the movement rules may indicate probability values for various maneuvers or movements that a dynamic object may perform at various velocity ranges.

Upon determining the predicted trajectories for the dynamic object, the flightpath score generator 1550 can generate a flightpath score for each dynamic object detected in the frames 1570. The flightpath score can be calculated as function of the total probability that the dynamic object will intersect with the protected volume. To calculate the overall probability of intersection, the flightpath score generator 1550 can identify each of the predicted trajectories of the dynamic object that result in the dynamic object intersecting with the protected volume. The flightpath score generator 1550 can then sum the probability values for each of the paths that result in the dynamic object intersecting with the protected volume. Generally, dynamic objects with a higher probability of intersection with the protected volume can be associated with a higher risk, and therefore be assigned a higher score.

Another factor in calculating the dynamic object flightpath score 1580 can be the amount of time until the dynamic object is predicted to intersect with the protected volume. For example, a dynamic object that is likely to intersect with the protected volume in a short amount of time can result in a higher dynamic object flightpath score 1580 than a dynamic object that is predicted to intersect with the protected volume in a large amount of time. The flightpath score generator 1550 can also estimate an amount of time that a dynamic object is likely to be present in the protected volume as a factor in calculating the dynamic object flightpath score 1580. The amount of time can be estimated by applying the predicted pathway for the dynamic object to the current speed of the dynamic object to estimate a time that the dynamic object will exit the predicted volume. The time that the dynamic object is expected to enter the protected volume can be subtracted from the estimated exit time to calculate the estimated time the dynamic object will intersect with the protected volume. The flightpath score generator 1550 can iteratively calculate each of these factors, and the score for dynamic flightpath score 1580 for each detected dynamic object each time a new frame 1570 is captured by the capture device 1520.

Once the dynamic flightpath score 1580 has been calculated for a dynamic object, the flightpath score generator 1550 can store the classification of the dynamic object, the one or more predicted trajectories of the dynamic object, and the dynamic object flightpath score 1580 in a dynamic object registry (e.g., such as the dynamic object registry 680 described herein in connection with FIG. 6) in association with an identifier of the dynamic object. In addition, the flightpath score generator 1550 can transmit information related to the dynamic object (e.g., the classification, the one or more predicted trajectories of the dynamic object, the dynamic object flightpath score 1580, or any combination thereof) to other computing devices, such as other node computing systems 1505. In some implementations, if the flightpath score 1580 satisfies a flightpath threshold, the flightpath score generator 1550 can transmit a warning signal to one or more external computing systems responsible for maintaining the safety of the protected volume.

Figure 17:
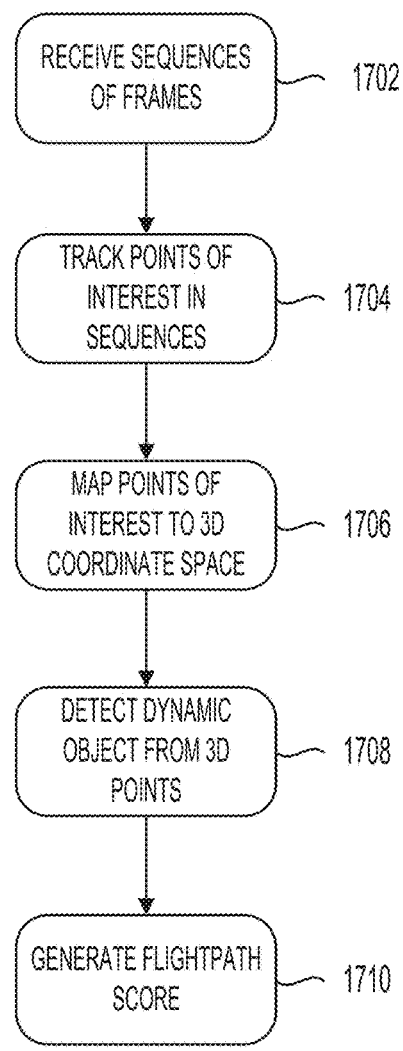
FIG. 17 illustrates an example flow diagram of a method for assessing risk of objects in a sensing volume using a mesh network of nodes coupled to cameras, in accordance with one or more implementations.

Referring now to FIG. 17, illustrated is an example flow diagram of a method 1700 for assessing risk of objects in a sensing volume using a mesh network of nodes coupled to cameras, in accordance with one or more implementations. The method 1700 can be executed, performed, or otherwise carried out by the node computing system 1505, the computer system 2000 described herein in conjunction with FIGS. 20A and 20B, or any other computing devices described herein. In brief overview, the node computing system (e.g., the node computing system 1505, etc.) can receive one or more sequences of frames (e.g., the frames 1570) (STEP 1702), track the points of interest (e.g., the points of interest 1575) in the sequences of frames (STEP 1704), map the points of interest to a 3D coordinate space (STEP 1706), detect a dynamic object from the 3D points of interest (STEP 1708), and generate a flightpath score (e.g., the dynamic object flightpath score 1580) for the dynamic object (STEP 1710).

In brief overview, the node computing system (e.g., the node computing system 1505, etc.) can receive one or more sequences of frames (e.g., the frames 1570) (STEP 1702). As described herein, each node computing system can be in communication with at least two capture devices (e.g., the capture devices 1520), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track the points of interest (e.g., the points of interest 1575) in the sequences of frames (STEP 1704). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

The node computing system can map the points of interest to a 3D coordinate space (STEP 1706). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, identifying corresponding points can be performed as sets of points by using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can detect a dynamic object from the 3D points of interest (STEP 1708). Because each 3D point is determined from a point correspondence, differences in position in the point correspondences over time can be translated into corresponding changes in 3D position in the 3D coordinate space. The node computing system can determine a 3D displacement of a subset of the plurality of 3D points based on the first sequence of frames and the second sequence of frames. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein. As each point of interest changes in position over time, the node computing system can map changes in position of the corresponding 3D point of interest in the 3D coordinate space.

The node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The node computing system can generate a flightpath score (e.g., the dynamic object flightpath score 1580) for the dynamic object (STEP 1710). The node computing system can generate a flightpath score for the dynamic object based on a predicted trajectory of the dynamic object and a predetermined region in the 3D coordinate space (e.g., a protected volume). As described herein above, the flightpath score of the dynamic object can indicate an overall level of risk that a dynamic object will penetrate a protected volume. To calculate the dynamic object flightpath score 1580, the node computing system can first determine one or more predict trajectories for the dynamic object. As described in greater detail in Section E, the predicted trajectories of the dynamic objects can be calculated based on an estimated velocity of each of the subset of 3D points of interest corresponding to the dynamic object. The estimated velocity is calculated by dividing a 3D displacement of the subset of the 3D points of interest by the amount of time that has passed between frames depicting the point correspondences used to map to the 3D points of interest. In addition, and as described in greater detail herein above in Sections D and E, the predicted trajectories for the dynamic object can also be calculated based on a classification for the dynamic object.

The flightpath generator can generate the classification of the dynamic object based on the first sequence of frames and the second sequence of frames. To determine the classification of the dynamic object, the node computing system can first perform a filtering process by comparing the 3D volume surrounding the dynamic object to a predetermined size threshold, as described herein. If the threshold is not satisfied, the node computing system can classify the dynamic object as "not of interest," and cease further processing on the dynamic object. If the size threshold is satisfied, the node computing system can provide frames depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the node computing system and other node computing systems, as described in Sections D and E. The classification of the dynamic object can be used by the node computing system to estimate one or more dynamic object trajectories for the dynamic object.

To estimate a dynamic object trajectory, the node computing system can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The node computing system can apply the previously determined velocity and position values to these movement rules to identify one or more dynamic object trajectories. In some implementations, the movement rules may indicate probability values for various maneuvers or movements that a dynamic object may perform at various velocity ranges.

Upon determining the predicted trajectories for the dynamic object, the node computing system can generate a flightpath score for each dynamic object detected in the frames. The flightpath score can be calculated as function of the total probability that the dynamic object will intersect with the protected volume. To calculate the overall probability of intersection, the node computing system can identify each of the predicted trajectories of the dynamic object that result in the dynamic object intersecting with the protected volume. The node computing system can then sum the probability values for each of the paths that result in the dynamic object intersecting with the protected volume. Generally, dynamic objects with a higher probability of intersection with the protected volume can be associated with a higher risk, and therefore be assigned a higher score.

Another factor in calculating the dynamic object flightpath score can be the amount of time until the dynamic object is predicted to intersect with the protected volume. For example, a dynamic object that is likely to intersect with the protected volume in a short amount of time can result in a higher dynamic object flightpath score than a dynamic object that is predicted to intersect with the protected volume in a large amount of time. The node computing system can also estimate an amount of time that a dynamic object is likely to be present in the protected volume as a factor in calculating the dynamic object flightpath score. The amount of time can be estimated by applying the predicted pathway for the dynamic object to the current speed of the dynamic object to estimate a time that the dynamic object will exit the predicted volume. The time that the dynamic object is expected to enter the protected volume can be subtracted from the estimated exit time to calculate the estimated time the dynamic object will intersect with the protected volume. The node computing system can iteratively calculate each of these factors, and the score for dynamic flightpath score for each detected dynamic object each time a new frame is captured by the capture device.

Once the dynamic flightpath score has been calculated for a dynamic object, the node computing system can store the classification of the dynamic object, the one or more predicted trajectories of the dynamic object, and the dynamic object flightpath score in a dynamic object registry (e.g., such as the dynamic object registry 680 described herein in connection with FIG. 6) in association with an identifier of the dynamic object. In addition, the node computing system can transmit information related to the dynamic object (e.g., the classification, the one or more predicted trajectories of the dynamic object, the dynamic object flightpath score, or any combination thereof) to other computing devices, such as other node computing systems. In some implementations, if the flightpath score satisfies a flightpath threshold, the node computing system can transmit a warning signal to one or more external computing systems responsible for maintaining the safety of the protected volume.

G. Triggering Maneuvers for Maintaining Safe Sensing Volumes

When tracking trajectories of dynamic objects relative to a protected volume, it is important to monitor the overall risk a dynamic object poses to authorized aerial vehicles that may be navigating within the sensing volume. Using the foregoing techniques, the mesh network of nodes coupled to cameras can be used to calculate the risk that a dynamic object, such as an external aircraft, poses to a protected volume. However, simply calculating the risk associated with a path taken by an external aircraft does nothing to mitigate the risk caused by the presence of the external aircraft.

The systems and methods of this technical solution address these and other issues by providing techniques for triggering maneuvers for maintaining safe sensing volumes. To do so, the systems and methods described herein can utilize the predicted trajectory of an external aircraft along with information about one or more authorized aerial vehicles, such as drones, that are navigating within the protected volume. This information can be provided as input to a machine learning model that is trained using deep reinforcement learning to output optimal pathways for the authorized aircraft to navigate to avoid any potential collisions with the external aircraft. The systems and methods described herein can not only avoid instances of collisions, but also preserve safety volumes such as Well Clear and near mid-air collision (NMAC).

The risk mitigation strategies generated by the systems and methods described herein can contain information related to a change in course for each individual aircraft. This change in course for each aircraft can include flight instructions pre-configured maneuvers, or step by step instructions, to maneuver the authorized aircraft to maintain safe volumes. The instructions can be either communicated in computer language that can be directly executed by the onboard autopilot of each authorized aircraft, or can be provided in natural language so they can be carried out by remote human pilots. If the instructions are provided to pilots, reaction time will be taken into account to estimate the best risk mitigation strategies. Along with the risk mitigation instructions, alerts can be provided that communicate the presence of one or more dynamic objects in the sky. The alerts can provided in a prioritized manner, such that dynamic objects that pose a higher risk to the protected volume are presented before those that are associated with a lower risk. These alerts can include dynamic object location, type, velocity information, and timestamps. These and other features are described in greater detail herein below.

Figure 18:
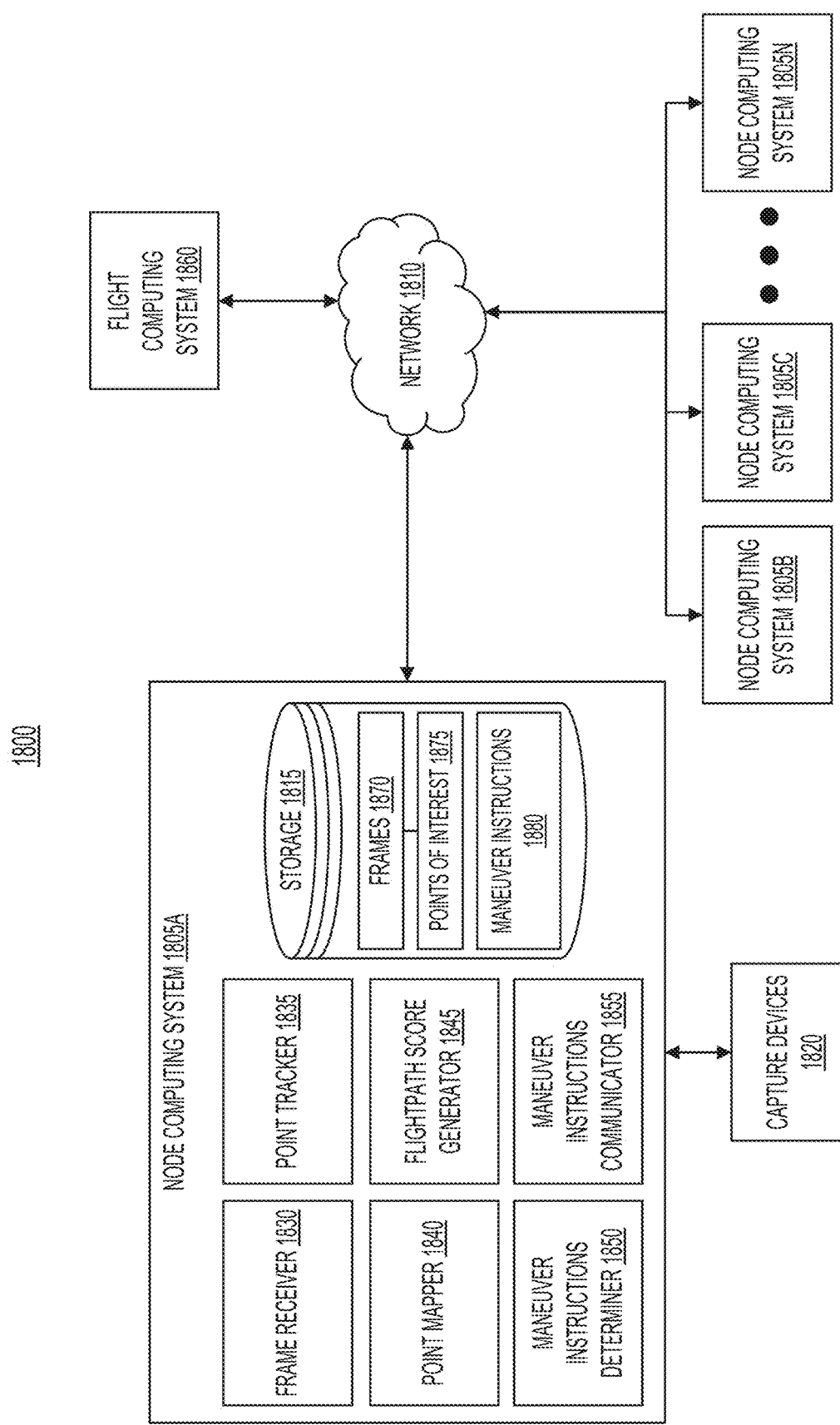
FIG. 18 illustrates a block diagram of an example system for triggering maneuvers for maintaining safe sensing volumes, in accordance with one or more implementations.

Referring now to FIG. 18, illustrated is a block diagram of an example system 1800 for triggering maneuvers for maintaining safe sensing volumes, in accordance with one or more implementations. The system 1800 can include one or more node computing systems 1805A-1505N (sometimes generally referred to herein as node computing system(s) 1805), and at least one network 1810. Each node computing system 1805 can be in communication with one or more capture devices 1820. Each node computing system 1805 can include at least one frame receiver 1830, at least one point tracker 1835, at least one point mapper 1840, at least one at least one flightpath score generator 1845, at least one maneuver instructions determiner 1850, at least one maneuver instructions communicator 1855, and at least one storage 185. The storage 1815 can store one or more frames 1870 (sometimes referred to as one or more sequence(s) of frames 1870), one or more points of interest 1875, and one or more dynamic object classifications 1880. In some implementations, the storage 1815 can be external to the node computing system 1805, for example, as part of one or more servers or other computing devices in communication with the node computing system 1805 via the network 1810.

Each of the node computing systems 1805, the capture devices 1820, the network 1810, the storage 1815, the frame receiver 1830, the point tracker 1835, the point mapper 1840, the flightpath score generator 1845, the maneuver instructions determiner 1850, and the maneuver instructions communicator 1855 of the system 1800 can be implemented using the hardware components or a combination of software with the hardware components of a computing system (e.g., computing system 2000, any other computing system described herein, etc.) detailed herein in conjunction with FIGS. 20A and 20B. In addition, the functionality of the node computing systems 1805 can include any of the functionality of the node computing systems 105, the node computing systems 605, the node computing systems 905, the node computing systems 1105, the node computing systems 1305, and the node computing systems 1505, described herein in connection with FIGS. 1, 6, 9, 11, 13, and 15, respectively. Each of the components of the node computing system 1805 can perform the functionalities detailed herein.

The node computing system 1805 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The node computing system 1805 can include one or more computing devices or servers that can perform various functions as described herein. The node computing system 1805 can include any or all of the components and perform any or all of the functions of the computer system 2000 described herein in conjunction with FIGS. 20A and 20B.

The network 1810 can include computer networks such as the Internet, local, wide, metro or other area networks, intranets, satellite networks, other computer networks such as voice or data mobile phone communication networks, radio communication interfaces, and combinations thereof. The node computing system 1805A of the system 1800 can communicate via the network 1810, for instance with at least one other node computing system 1805B-1805N. The network 1810 may be any form of computer network that can relay information between the node computing system 1805A, the node computing systems 1805B-1805N, and one or more other computing systems, such as a flight computing system or another remote server in communication with the node computing systems 1805.

In some implementations, the network 1810 may include the Internet and/or other types of data networks, such as a LAN, a WAN, a cellular network, a satellite network, or other types of data networks. The network 1810 may also include any number of computing devices (e.g., computers, servers, routers, network switches, etc.) that are configured to receive and/or transmit data within the network 1810. The network 1810 may further include any number of hardwired and/or wireless connections. Any or all of the computing devices described herein (e.g., the node computing system 1805, the computer system 2000, etc.) may communicate wirelessly (e.g., via Wi-Fi, cellular, radio, etc.) with a transceiver that is hardwired (e.g., via a fiber optic cable, a CAT5 cable, etc.) to other computing devices in the network 1810. Any or all of the computing devices described herein (e.g., the node computing system 1805, the computer system 2000, etc.) may also communicate wirelessly with the computing devices of the network 1810 via a proxy device (e.g., a router, network switch, or gateway).

The flight computing system 1860 can include at least one processor and a memory, e.g., a processing circuit. The memory can store processor-executable instructions that, when executed by processor, cause the processor to perform one or more of the operations described herein. The processor may include a microprocessor, an ASIC, an FPGA, a GPU, a TPU, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The flight computing system 1860 can include one or more computing devices or servers that can perform various functions as described herein. The flight computing system 1860 can include any or all of the components and perform any or all of the functions of the computer system 2000 described herein in conjunction with FIGS. 20A and 20B.

The flight computing system 1860 can be, for example, any type of computing system capable of executing or displaying flight instructions received from the node computing system 1805. As described in greater detail herein, the node computing system can generate maneuver instructions to avoid detected dynamic objects that are predicted to enter a predetermined volume. The flight computing system 1860 can be, or be in communication with, an autonomous flight system of an authorized aircraft navigating within the protected volume. By executing the maneuvering instructions received from the node computing system 1805, the flight computing system 1860 can navigate the aerial vehicle associated with the flight computing system 1860 to maintain a predetermined sensing volume (e.g., Well Clear, avoid NMAC, etc.). In some implementations, the flight computing system 1860 can display flight instructions for a pilot, such that a pilot can manually maneuver an aerial vehicle to maintain a safe volume. The flight computing system 1860 can display one or more alerts related to proximate dynamic objects detected by the node computing system 1805. The alerts can be displayed, for example, in one or more graphical user interfaces, such as a graphical interface of a flight computer or another type of navigation device.

The storage 1815 can be a database configured to store and/or maintain any of the information described herein. The storage 1815 can maintain one or more data structures, which may contain, index, or otherwise store each of the values, pluralities, sets, variables, vectors, thresholds, or other data used in the processing operations described herein. The storage 1815 can be accessed using one or more memory addresses, index values, or identifiers of any item, structure, or region maintained in the storage 1815. The storage 1815 can be accessed by the components of the node computing system 1805, or any other computing device described herein, via the network 1810. In some implementations, the storage 1815 can be internal to the node computing system 1805. In some implementations, the storage 1815 can exist external to the node computing system 1805, and may be accessed via the network 1810. The storage 1815 can be distributed across many different computer systems or storage elements, and may be accessed via the network 1810 or a suitable computer bus interface. The node computing system 1805 can store, in one or more regions of the memory of the node computing system 1805, or in the storage 1815, the results of any or all computations, determinations, selections, identifications, generations, constructions, or calculations in one or more data structures indexed or identified with appropriate values.

The one or more capture devices 1820 can be, for example, any sort of camera capable of capturing one or more frames 1870. In some implementations, the capture device 1820 is a video camera capable of producing a video stream. In some implementations, the capture device 1820 is an image capture device that can capture images in response to a condition, such as a capture signal or on a predetermined periodic basis. In some implementations, the capture device 1820 can be associated with a respective pose, which can be maintained by the node computing system 1805 in communication with the capture device. In some implementations, each of the node computing systems 1805A-1505N can be in communication with at least two capture devices 1820. Each of the at least two capture devices in communication with a node computing system 1805 can have its own respective pose in a 3D space. As such, each node computing system 1805 can be used to capture a respective portion of a larger sensing volume, and therefore various different views of any detected dynamic objects. The classification of the dynamic object, as described herein, can be determined based on an agreement of classifications within a majority of the views that detect the dynamic object.

The storage 1815 can store the frames 1870 (sometimes referred to as sequence(s) of frames 1870) in one or more data structures. Each of the frames 1870 can be, for example, an image that is associated with a particular timestamp in a video stream captured from a video camera. In some implementations, each frame can itself be a still image captured by a corresponding capture device 1820, for example, on a periodic basis. Each frame 1870 can include pixels arranged in a grid that makes up the frame 1870 (e.g., as an image), where each pixel includes color data and location data that identifies the color and location of the pixel in the frame 1870. In some implementations, the capture device 1820 can capture the frames 1870 in one or more different color channels (e.g., each channel corresponding to a particular color wavelength). In some implementations, the image capture device 1820 can be a camera or video capture device that captures non-visible light (e.g., infrared light, etc.). Each color channel in a pixel of a frame 1870 can identify the intensity of a particular color of the pixel. These color intensity values (e.g., the color of each pixel in a frame 1870, etc.) can be used in one or more point of interest detection techniques, as described herein. In some implementations, the capture devices 1820 can be monochrome cameras that capture images or video streams that having a single intensity channel.

The storage 1815 can store one or more sets of points of interest 1875 in association with a respective sequence of frames 1870 captured by a corresponding capture device 1820. In other words, each of the capture devices 1820 can be associated with a respective set of points of interest 1875, which are detected and tracked across the sequences of frames 1870 captured by the capture device 1820. Each point of interest 1875 can be a point in a frame 1870 that is detected based on using a detection technique, such as a corner detection technique, an edge detection technique, a blob detection technique, a ridge detection technique, or other feature detection techniques. Each point of interest 1875 can correspond to one or more pixel coordinates in a frame, and can include parameters that indicate an intensity of one or more pixels in a frame 1870 that correspond to the point of interest. In some implementations, a point of interest 1875 can be tracked across one or more sequences of frames 1870.

For example, by performing a feature tracking technique, movement of points of interest 1875 (e.g., changes in pixel coordinates across consecutive frames) can be calculated. Some examples of feature tracking techniques include, for example, a KLT feature tracker, or other point feature matching techniques. Each point of interest 1875, including the parameters (e.g., pixel color values in a window, etc.) of each point of interest 1875 and coordinates of each point of interest across frames, and amount of movement of the point of interest in the pixel coordinate space, can be stored in one or more data structures in the storage 1815. The positions of the points of interest 1875 between two sequences of frames 1870 can be matched and used to map the points of interest into a 3D coordinate space. The movement of the 3D points of interest in the 3D coordinate space can be used to detect the presence of dynamic objects, which can cause the node computing system to generate a 3D volume surrounding a subset of the 3D points of interest. The 3D volumes surrounding a dynamic object in the 3D coordinate space can be used to generate a classification for the dynamic object, as described herein. The classification of the dynamic object can be used to determine a predicted trajectory for the dynamic object.

The storage 1815 can store maneuver instructions 1880 for one or more aircraft navigating within a protected volume that is monitored by the node computing systems 1805. The maneuver instructions 1880 can be generated by the components of the node computing system 1805 based on the known trajectories of the authorized aircraft navigating within the protected volume, and based on the predicted trajectories and flightpath scores of dynamic objects detected within the sensing volumes, as described herein. The maneuver instructions 1880 can be, for example, computer instructions that are executable by an autonomous flight system, such as the flight computing system 1860. When executed, the maneuver instructions 1880 can cause the aerial vehicle executing the maneuver instructions 1880 to change course (e.g., speed up, slow down, change direction, etc.). In some implementations, the maneuver instructions 1880 can be display instructions that cause the flight computing system 1860 to display the flight instructions to a pilot that is navigating the aerial vehicle associated with the flight computing system 1860. In some implementations, the maneuver instructions 1880 can include one or more alerts indicating information about the dynamic objects (e.g., dynamic object identifier, velocity information, classification, etc.) that caused the generation of the maneuver instructions 1880. The maneuver instructions 1880 can be stored in association with one or more identifiers of any detected dynamic objects that initiated generation of the maneuver instructions 1880.

Referring now to the operations of the node computing system 1805, the frame receiver 1830 can receive a first sequence of frames 1870 captured by a first capture device 1820 having a first pose and a second sequence of frames 1870 captured by a second capture device 1820 having a second pose. In some implementations, the frame receiver 1830 can receive a first sequence of frames 1870 captured by a first capture device 1820 having a first pose and a second sequence of frames 1870 captured by a second capture device 1820 having a second pose. As described herein, the pose of each capture device 1820 in communication with the node computing system 1805 can be stored in association with an identifier of the respective capture device 1820, and the frames 1870 captured by the respective capture device, in the storage 1815. The sequences of frames 1870 can be any number of frames 1870. In some implementations, two corresponding frames can each be captured and provided by the capture devices 1820 in communication with the node computing system 1805 before the next frame 1870 in the sequence is retrieved, thereby synchronizing each sequence of frames 1870 captured by the capture devices 1820.

Each of the frames 1870 in each sequence of frames 1870 can be consecutive frames 1870 captured by a respective capture device 1820. For example, the frames 1870 can be consecutive frames captured as part of a video stream. In some implementations, the frames 1870 can be consecutively captured images (e.g., images captured periodically at a predetermined time interval by the capture device). Upon receiving the frames 1870, the frame receiver 1830 can store each frame 1870 in one or more data structures (e.g., a list, a queue, etc.) of frames corresponding to the capture device 1820 used to capture the respective frame 1870. In some implementations, an external computing device in communication with the second capture device can identify a set of points of interest in a second sequence of frames 1870 captured by the second capture device, and transmit the second sequence of frames 1870 and the identified points of interest to the node computing system 1805.

The point tracker 1835 can track a first set of points of interest 1875 across the first sequence of frames 1870 over time and a second set of points of interest 1875 across the second sequence of frames 1870 over time. Each point of interest 1875 can be a point in a frame 1870 that is detected based on using a feature detection technique, such as a corner detection technique, an edge detection technique, a blob detection technique, or a ridge detection technique, on a frame 1870 in a sequence of frames captured by a capture device 1820. Each frame provided by each capture device 1820 can be provided as input to a feature detection technique, such as a corner detection technique, which can provide pixel coordinates in the input frame 1870 that correspond to detected points of interest 1875 as output. In addition, each detected point of interest 1875 can include parameters that indicate an intensity of one or more pixels in a frame 1870 that correspond to the point of interest.

The point tracker 1835 can detect a set of points of interest 1875 for each frame in each sequence of frames captured by the capture devices 1820. Each set of points of interest can be stored in a data structure, such as a list, which can be stored in association with the frame 1870 in which the points were detected. In addition, the point tracker 1835 can track similar points of interest temporally as additional frames 1870 are captured and provided as part of the sequence of frames 1870. To do so, the point tracker 1835 can identify parameter correspondences between the pixels (e.g., a predetermined window size) of a point of interest 1875 in one frame 1870 and the pixels (e.g., the predetermined window size) in a point of interest 1875 in a consecutive frame 1870. The correspondence can be calculated as a correspondence score that reflects a likelihood that the point of interest in one frame 1875 depicts the same feature identified by a second point of interest 1875 in a consecutive frame. If the score satisfies a predetermined threshold, the points of interest 1875 can be linked temporally and assigned the same identifier. The two-dimensional displacement (e.g., difference in pixel coordinates, etc.) of the point of interest 1875 from the first frame to the next consecutive frame 1870 can be tracked and determined by the point tracker 1835, and stored in association with a timestamp of each frame and the identifier of the point of interest 1875.

The point mapper 1840 can map the first set of points of interest 1875 and the second set of points of interest 1875 to a corresponding set of 3D points of interest in a 3D coordinate space. The 3D points of interest can be mapped to the 3D coordinate space based on correspondences between the first set of points of interest 1875 and the second set of points of interest 1875. As described herein, each of the capture devices 1820 has a respective pose in a 3D space and is generally stationary while capturing the frames 1870. Using the known pose information for two capture devices 1870 capturing an overlapping environment at the same time, the point mapper 1840 can map one or more points of interest 1875 identified in each frame 1870 to a corresponding 3D point. To do so, the point mapper 1840 can identify a list of corresponding points of interest 1875 detected in a first frame captured by a first capture device 1820 and a corresponding second frame captured by a second capture device 1820 at substantially the same time.

Identifying point correspondences can include comparing a predetermined window between each point of interest detected in a first frame and each point of interest detected in a second frame. In some implementations, the point mapper 1840 may utilize one or more constraints on correspondence mapping. For example, the point mapper 1840 may only attempt to identify corresponding points of interest in similar positions in both frames captured by the separate capture devices. To identify a point correspondence, the point mapper 1840 can compare the pixels in the predetermined region surrounding a point of interest 1870 in a first frame 1870 with a predetermined region surrounding a candidate point of interest in a second frame 1870 and calculate a similarity score indicating the similarity between the two regions. If the score for the pair of points satisfies a threshold, the two points across both frames 1870 can be considered corresponding points for the purposes of 3D mapping. If the score of the pair does not satisfy a threshold, the point mapper 1840 can select a second candidate point in the second frame 1870 captured by the second capture device 1820 in accordance with any restrictions.

If the point mapper 1840 fails to identify correspondences between a predetermined number of the points of interest 1875 in a first frame 1870 captured by a first capture device 1820 and the points of interest 1875 in the second frame captured by the second capture device 1820, the point mapper 1840 can relax any constraints by searching for candidate matches anywhere in the second frame. In some implementations, identifying corresponding points can be performed as sets of points by using a fitting algorithm, such as a RANSAC algorithm. Points that are co-registered with one another using the fitting algorithm are stored as corresponding points of interest 1870. The correspondences between the points of interest 1875 detected in the first frame 1870 captured by the first capture device 1820 and the points of interest 1875 detected in the second frame 1870 captured by the second capture device 1820 can be used to map each set of points of interest 1875 to a 3D coordinate space.

Because the rotation and position of each capture device 1820 are known at least relative to each other, the point mapper 1840 can determine a location for a 3D point for each point correspondence identified between the points of interest 1875 captured by the first capture device 1820 and the points of interest 1875 captured by the second capture device. In particular, the point mapper 1840 can identify the location of a first point of interest 1875 of a point correspondence within the field of view of the first capture device 1820. Because the direction and position of the first capture device 1820 are known in the 3D coordinate space, in some implementations, the field of view of the first capture device can itself be represented in the 3D coordinate space. In addition, the field of view of a second capture device 1820 can be represented in the 3D coordinate space. By using epipolar geometry, and by matching the corresponding points of interest 1875 between in the first frame 1870 from the first capture device 1820 and the second frame 1870 from the second capture device 1820, the 3D location of each correspondence can be mapped to a 3D coordinate space.

The flightpath score generator 1845 can generate a flightpath score for dynamic objects detected in a sensing volume monitored by the node computing system 1805. The flightpath score can indicate a level of risk associated with a detected dynamic object intersecting with a protected region of the 3D coordinate space. To calculate a flightpath score, the flightpath score generator 1845 can first detect one or more dynamic objects in the frames 1870. To detect a dynamic object, the flightpath score generator 1845 can determine that a 3D displacement of a subset of the 3D points of interest satisfies a threshold. For example, as a dynamic object moves in the field of view of each of the first capture device 1820 and the second capture device 1820, the movement of the dynamic object is captured chronologically across a sequence of frames by each capture device 1820. The points of interest that correspond to the dynamic object as represented in each sequence also change in coordinates over time and are tracked by the flightpath score generator 1845 as described herein. As each point of interest changes in position over time, the flightpath score generator 1845 can map changes in position of the corresponding 3D point of interest in the 3D coordinate space.

The flightpath score generator 1845 can iteratively (e.g., each time new frames are captured by the first and second capture devices) determine changes in position of each tracked 3D point in the 3D coordinate space. These changes in position can be stored in association with any relevant data for further processing, including identifiers of frames 1870 from which the 3D points of interest were determined, timestamps, identifiers of individual points of interest in corresponding frames 1870, or identifiers of point correspondences identified by the flightpath score generator 1845. The subset of the 3D points of interest can be the points of interest in the sequences of frames that have a displacement that exceeds a displacement amount threshold, suggesting that the 3D points of interest represent a dynamic object. In some implementations, the flightpath score generator 1845 can group subsets of the 3D points of interest mapped from the sequences of frames 1870 based on average velocity and proximity. For example, if a group of 3D points of interest are close to one another in the 3D coordinate space, and exhibit a similar displacement over time, the flightpath score generator 1845 can group these 3D points of interest as a subset (e.g., by storing them in a data structure of variable size, etc.).

In some implementations, the flightpath score generator 1845 can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The flightpath score generator 1845 can generate a flightpath score for the dynamic object based on a predicted trajectory of the dynamic object and a predetermined region in the 3D coordinate space (e.g., a protected volume). As described herein above, the flightpath score of the dynamic object can indicate an overall level of risk that a dynamic object will penetrate a protected volume. To calculate the dynamic object flightpath score 1880, the flightpath score generator 1845 can first determine one or more predict trajectories for the dynamic object. As described in greater detail in Section E, the predicted trajectories of the dynamic objects can be calculated based on an estimated velocity of each of the subset of 3D points of interest corresponding to the dynamic object. The estimated velocity is calculated by dividing a 3D displacement of the subset of the 3D points of interest by the amount of time that has passed between frames depicting the point correspondences used to map to the 3D points of interest. In addition, and as described in greater detail herein above in Sections D and E, the predicted trajectories for the dynamic object can also be calculated based on a classification for the dynamic object.

The flightpath score generator 1845 can generate the classification of the dynamic object based on the first sequence of frames and the second sequence of frames. To determine the classification of the dynamic object, the flightpath score generator 1845 can first perform a filtering process by comparing the 3D volume surrounding the dynamic object to a predetermined size threshold, as described herein. If the threshold is not satisfied, the flightpath score generator 1845 can classify the dynamic object as "not of interest," and cease further processing on the dynamic object. If the size threshold is satisfied, the flightpath score generator 1845 can provide frames 1870 depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the flightpath score generator 1845 and the other node computing systems 1805A-1505N, as described in Sections D and E. The classification of the dynamic object can be used by the flightpath score generator 1845 to estimate one or more dynamic object trajectories for the dynamic object.

To estimate a dynamic object trajectory, the flightpath score generator 1845 can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The flightpath score generator 1845 can apply the previously determined velocity and position values to these movement rules to identify one or more dynamic object trajectories. In some implementations, the movement rules may indicate probability values for various maneuvers or movements that a dynamic object may perform at various velocity ranges.

Upon determining the predicted trajectories for the dynamic object, the flightpath score generator 1845 can generate a flightpath score for each dynamic object detected in the frames 1870. The flightpath score can be calculated as function of the total probability that the dynamic object will intersect with the protected volume. To calculate the overall probability of intersection, the flightpath score generator 1845 can identify each of the predicted trajectories of the dynamic object that result in the dynamic object intersecting with the protected volume. The flightpath score generator 1845 can then sum the probability values for each of the paths that result in the dynamic object intersecting with the protected volume. Generally, dynamic objects with a higher probability of intersection with the protected volume can be associated with a higher risk, and therefore be assigned a higher score.

Another factor in calculating the dynamic object flightpath score can be the amount of time until the dynamic object is predicted to intersect with the protected volume. For example, a dynamic object that is likely to intersect with the protected volume in a short amount of time can result in a higher dynamic object flightpath score than a dynamic object that is predicted to intersect with the protected volume in a large amount of time. The flightpath score generator 1845 can also estimate an amount of time that a dynamic object is likely to be present in the protected volume as a factor in calculating the dynamic object flightpath score. The amount of time can be estimated by applying the predicted pathway for the dynamic object to the current speed of the dynamic object to estimate a time that the dynamic object will exit the predicted volume. The time that the dynamic object is expected to enter the protected volume can be subtracted from the estimated exit time to calculate the estimated time the dynamic object will intersect with the protected volume. The flightpath score generator 1845 can iteratively calculate each of these factors, and the score for dynamic flightpath score for each detected dynamic object each time a new frame 1870 is captured by the capture device 1820.

Once the flightpaths scores for one or more dynamic objects have been generated, the maneuver instructions determiner 1850 can determine maneuver instructions 1880 for one or more moveable entities (e.g., aerial vehicles navigating within the protected volume, any other type of vehicle or computer-controlled vehicle, etc.) based on the flightpath score and a predicted trajectory of the dynamic object. In some implementations, the maneuver instructions determiner 1850 can generate the maneuver instructions 1880 if the flightpath score for one or more detected dynamic objects satisfies a threshold. For example, in some cases, a dynamic object may intersect with a small, or otherwise insignificant portion of the protected volume, or may intersect with the protected volume for a very short amount of time, thereby resulting in a low flightpath score. In such cases, the safe volumes of the moveable entities within the protected volume may be maintained without additional maneuvering, and the maneuver instructions determiner 1850 may not generate the maneuver instructions 1880. In contrast, if a dynamic object poses a high risk to moveable entities within the protected volume (e.g., having a high flightpath score, etc.), the maneuver instructions determiner 1850 can generate the maneuver instructions 1880 to include instructions for the one or more moveable entities to change course and maintain safe volumes.

Generating the maneuver instructions can include comparing known flight paths of moveable entities within the protected volume (e.g., transmitted by the flight computing system 1860 in response to a request from the node computing system 1805, provided as part of a flight plan accessed by the node computing system 1805, provided by one or more operators of the moveable entities, etc.) to the predicted trajectory of one or more detected dynamic objects. If the predicted trajectories for the one or more dynamic objects are within a predetermined distance of the known or expected pathways of the one or more moveable entities, the maneuver instructions determiner 1850 can generate the maneuver instructions 1880 to include instructions for the one or more moveable entities to alter their current trajectory to avoid the predicted trajectory of the one or more dynamic objects by a predetermined distance (e.g., a safe volume amount). In some implementations, the changes in trajectory for the moveable entities can be determined using a deep reinforcement learning model. The deep reinforcement learning model can be trained, for example, on training data including simulated occurrences of dynamic object intersection and moveable entity positions to maintain safe volumes (e.g., Well Clear or avoiding NMAC) around each simulated moveable entity.

The input of the deep reinforcement learning model can be, for example, the predicted trajectory of each detected dynamic object, and the known location and trajectories of the one or more moveable entities in the protected volume. The output of the deep reinforcement learning model can be movement instructions for each of the one or more moveable entities in the protected volume. For example, using the reinforcement learning model, the maneuver instructions determiner 1850 can select from pre-configured maneuvers, generate maneuvers, or generate step-by-step instructions as the maneuver instructions 1880 for the one or more moveable entities in the protected volume. As described herein, the maneuver instructions 1880 can be executed by the flight computing system 1860, or carried out by a pilot operating the moveable entities, to cause the moveable entities to change course. The maneuver instructions determiner 1850 can account for pilot delay inherent in executing instructions manually when generating the maneuver instructions 1880. In some implementations, an indication of whether each moveable entity is operated by a pilot or a flight computing system 1860 can be provided as input to the deep reinforcement learning model when generating the maneuver instructions 1880. The maneuver instructions determiner 1850 can generate maneuver instructions for each of the moveable entities in the protected volume.

Once the maneuver instructions 1880 have been generated by the maneuver instructions determiner 1850, the maneuver instructions communicator 1855 can transmit the maneuver instructions 1880 to the flight computing system 1860 associated with the respective movable entity for which the maneuver instructions were generated. Because the maneuver instructions may require fast execution to maintain safe volumes, the maneuver instructions communicator 1855 can transmit the maneuver instructions 1880 via the network 1810 as soon as they are generated. In some implementations, the maneuver instructions communicator 1855 can communicate one or more alerts to the flight computing system 1860 (or other external computing systems) indicating attributes of the detected dynamic objects that initiated generation of the maneuver instructions 1880. For example, the alerts transmitted by the maneuver instructions communicator 1855 can include a classification of each detected dynamic object, the location of each dynamic object, the velocity of each dynamic object, and any timestamps corresponding to the detection and expected or actual intrusion times (e.g., of the protected volume) of each dynamic object. The alerts transmitted by the maneuver instructions communicator 1855 can be provided in order of priority. For example, alerts corresponding to dynamic objects having higher flightpath scores can be provided before alerts for dynamic objects having lower flightpath scores.

Figure 19:
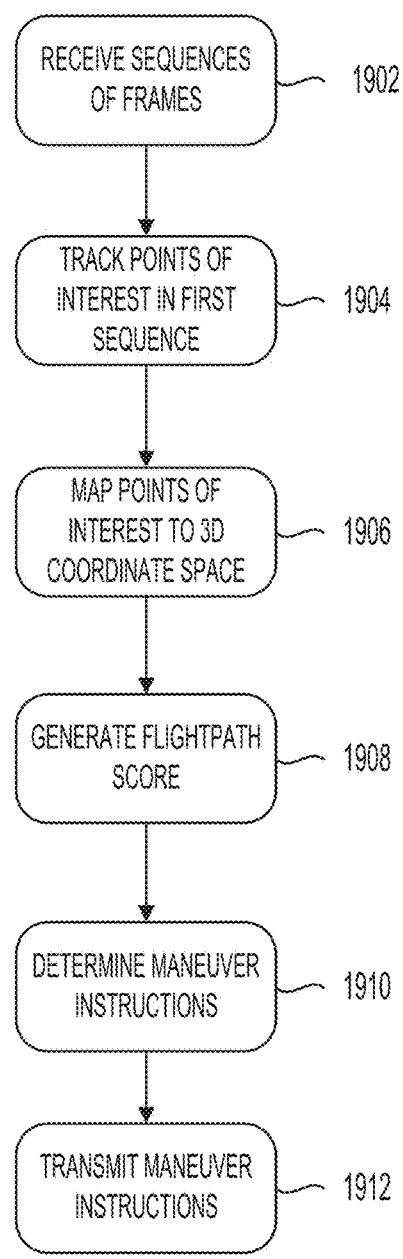
FIG. 19 illustrates an example flow diagram of a method for triggering maneuvers for maintaining safe sensing volumes, in accordance with one or more implementations.

Referring now to FIG. 19, illustrated is an example flow diagram of a method 1900 for triggering maneuvers for maintaining safe sensing volumes, in accordance with one or more implementations. The method 1900 can be executed, performed, or otherwise carried out by the node computing system 1805, the computer system 2000 described herein in conjunction with FIGS. 20A and 20B, or any other computing devices described herein. In brief overview, the node computing system (e.g., the node computing system 1805, etc.) can receive one or more sequences of frames (e.g., the frames 1870) (STEP 1902), track the points of interest (e.g., the points of interest 1875) in the sequences of frames (STEP 1904), map the points of interest to a 3D coordinate space (STEP 1906), generate a flightpath score for the dynamic object (STEP 1908), determine maneuver instructions (e.g., the maneuver instructions 1880) for moveable entities in a protected volume (STEP 1910), and transmit the maneuver instructions to a flight computing system (e.g., the flight computing system 1860) (STEP 1912).

In further detail, the node computing system (e.g., the node computing system 1805, etc.) can receive one or more sequences of frames (e.g., the frames 1870) (STEP 1902). As described herein, each node computing system can be in communication with at least two capture devices (e.g., the capture devices 1820), with each capture device having a known pose in a 3D coordinate space that corresponds to the environment captured by the capture devices. The sequences of frames can include any number of frames. In some implementations, two corresponding frames can each be captured and provided by a first capture device and a second capture device in communication with the node computing system before the next frame in the sequences are retrieved, thereby synchronizing each sequence of frames captured by each capture device. Each of the frames in each sequence of frames can be consecutive frames captured by a respective capture device. For example, the frames can be consecutive frames captured as part of a video stream. In some implementations, the frames can be consecutively captured images (e.g., images captured periodically at a predetermined time interval by the capture device). Upon receiving the frames, the node computing system can store each frame in one or more data structures (e.g., a list, a queue, etc.) of frames corresponding to the capture device used to capture the respective frame.

The node computing system can track the points of interest (e.g., the points of interest 1875) in the sequences of frames (STEP 1904). Upon receiving the sequences of frames from each capture device, the node computing system can track a first set of points of interest across the first sequence of frames and a second set of points of interest across the second sequence of frames. Each point of interest can be a point in a frame that is detected based on using a feature detection technique, such as a corner detection technique, an edge detection technique, a blob detection technique, or a ridge detection technique, on a frame in a sequence of frames captured by a capture device. Each frame provided by each capture device can be provided as input to a feature detection technique, such as a corner detection technique, which can provide pixel coordinates in the input frame that correspond to detected points of interest as output. In addition, each detected point of interest can include parameters that indicate an intensity of one or more pixels in a frame that correspond to the point of interest.

The node computing system can detect a set of points of interest for each frame in each sequence of frames captured by the capture devices. Each set of points of interest can be stored in a data structure, such as a list, which can be stored in association with the frame in which the points were detected. In addition, the node computing system can track similar points of interest temporally as additional frames are captured and provided as part of the sequence of frames. To do so, the node computing system can identify parameter correspondences between the pixels (e.g., a predetermined window size) of a point of interest in one frame and the pixels (e.g., the predetermined window size) in a point of interest in a consecutive frame. The correspondence can be calculated as a correspondence score that reflects a likelihood that the point of interest in one frame depicts the same feature identified by a second point of interest in a consecutive frame. If the score satisfies a predetermined threshold, the points of interest can be linked temporally and assigned the same identifier. The two-dimensional displacement (e.g., difference in pixel coordinates, etc.) of the point of interest from the first frame to the next consecutive frame can be tracked and determined by the node computing system and stored in association with a timestamp of each frame and the identifier of the point of interest.

The node computing system can map the points of interest to a 3D coordinate space (STEP 1906). The node computing system can map the first set of points of interest and the second set of points of interest to a set of 3D points of interest in a 3D coordinate space based on correspondences between the first set of points of interest and the second set of points of interest. As described herein, each of the capture devices has a respective pose in a 3D space and is generally stationary while capturing the frames. Using the known pose information for two capture devices capturing an overlapping environment at the same time, the node computing system can map one or more points of interest identified in each frame to a corresponding 3D point. To do so, the node computing system can identify a list of corresponding points of interest detected in a first frame captured by a first capture device and a corresponding second frame captured by a second capture device at substantially the same time.

Identifying point correspondences can include comparing a predetermined window between each point of interest detected in a first frame and each point of interest detected in a second frame. In some implementations, the node computing system may utilize one or more constraints on correspondence mapping. For example, the node computing system may only attempt to identify corresponding points of interest in similar positions in both frames captured by the separate capture devices. To identify a point correspondence, the node computing system can compare the pixels in the predetermined region surrounding a point of interest in a first frame with a predetermined region surrounding a candidate point of interest in a second frame and calculate a similarity score indicating the similarity between the two regions. If the score for the pair of points satisfies a threshold, the two points across both frames can be considered corresponding points for the purposes of 3D mapping. If the score of the pair does not satisfy a threshold, the node computing system can select a second candidate point in the second frame captured by the second capture device in accordance with any restrictions.

If the node computing system fails to identify correspondences between a predetermined number of the points of interest in a first frame captured by a first capture device and the points of interest in the second frame captured by the second capture device, the node computing system can relax any constraints by searching for candidate matches anywhere in the second frame. In some implementations, identifying corresponding points can be performed as sets of points by using a fitting algorithm, such as a RANSAC algorithm. Points that are co-registered with one another using the fitting algorithm are stored as corresponding points of interest. The correspondences between the points of interest detected in the first frame captured by the first capture device and the points of interest detected in the second frame captured by the second capture device can be used to map each set of points of interest to a 3D coordinate space.

Because the rotation and position of each capture device are known at least relative to each other, the node computing system can determine a location for a 3D point for each point correspondence identified between the points of interest captured by the first capture device and the points of interest captured by the second capture device. In particular, the node computing system can identify the location of a first point of interest of a point correspondence within the field of view of the first capture device. Because the direction and position of the first capture device are known in the 3D coordinate space, in some implementations, the field of view of the first capture device can itself be represented in the 3D coordinate space. In addition, the field of view of a second capture device can be represented in the 3D coordinate space. By using epipolar geometry, and by matching the corresponding points of interest between the first frame from the first capture device and the second frame from the second capture device, the 3D location of each correspondence can be mapped to a 3D coordinate space.

The node computing system can generate a flightpath score for the dynamic object (STEP 1908). To calculate a flightpath score, the node computing system can first detect one or more dynamic objects in the frames. To detect a dynamic object, the node computing system can determine that a 3D displacement of a subset of the 3D points of interest satisfies a threshold. For example, as a dynamic object moves in the field of view of each of the first capture device and the second capture device, the movement of the dynamic object is captured chronologically across a sequence of frames by each capture device. The points of interest that correspond to the dynamic object as represented in each sequence also change in coordinates over time and are tracked by the node computing system as described herein. As each point of interest changes in position over time, the node computing system can map changes in position of the corresponding 3D point of interest in the 3D coordinate space.

The node computing system can iteratively (e.g., each time new frames are captured by the first and second capture devices) determine changes in position of each tracked 3D point in the 3D coordinate space. These changes in position can be stored in association with any relevant data for further processing, including identifiers of frames from which the 3D points of interest were determined, timestamps, identifiers of individual points of interest in corresponding frames, or identifiers of point correspondences identified by the node computing system. The subset of the 3D points of interest can be the points of interest in the sequences of frames that have a displacement that exceeds a displacement amount threshold, suggesting that the 3D points of interest represent a dynamic object. In some implementations, the node computing system can group subsets of the 3D points of interest mapped from the sequences of frames based on average velocity and proximity. For example, if a group of 3D points of interest are close to one another in the 3D coordinate space, and exhibit a similar displacement over time, the node computing system can group these 3D points of interest as a subset (e.g., by storing them in a data structure of variable size, etc.).

In some implementations, the node computing system can determine that a subset of the 3D points of interest correspond to a dynamic object if the displacement of the subset exceeds a predetermined threshold. For example, if the 3D displacement of the subset indicates that the subset is moving at a relatively constant velocity relative to other 3D points of interest, the 3D points of interest in the subset can be identified as likely corresponding to a dynamic object. In contrast, 3D points of interest that do not exhibit significant changes in position relative to other 3D points of interest are not classified as corresponding to a dynamic object. In some implementations, multiple subsets of 3D points of interest can be detected and classified as corresponding to separate dynamic objects. In some implementations, the displacement threshold can be defined based on the average and standard deviation motion of all 3D points of interest. A 3D point of interest can be identified as dynamic when its displacement exceeds the displacement threshold. Although the foregoing is described in the context of detecting a single dynamic object, it should be understood that many dynamic objects can be detected and tracked in parallel (e.g., multiple dynamic objects detected in each frame, etc.).

The node computing system can generate a flightpath score for the dynamic object based on a predicted trajectory of the dynamic object and a predetermined region in the 3D coordinate space (e.g., a protected volume). As described herein above, the flightpath score of the dynamic object can indicate an overall level of risk that a dynamic object will penetrate a protected volume. To calculate the dynamic object flightpath score, the node computing system can first determine one or more predict trajectories for the dynamic object. As described in greater detail in Section E, the predicted trajectories of the dynamic objects can be calculated based on an estimated velocity of each of the subset of 3D points of interest corresponding to the dynamic object. The estimated velocity is calculated by dividing a 3D displacement of the subset of the 3D points of interest by the amount of time that has passed between frames depicting the point correspondences used to map to the 3D points of interest. In addition, and as described in greater detail herein above in Sections D and E, the predicted trajectories for the dynamic object can also be calculated based on a classification for the dynamic object.

The node computing system can generate the classification of the dynamic object based on the first sequence of frames and the second sequence of frames. To determine the classification of the dynamic object, the node computing system can first perform a filtering process by comparing the 3D volume surrounding the dynamic object to a predetermined size threshold, as described herein. If the threshold is not satisfied, the node computing system can classify the dynamic object as "not of interest," and cease further processing on the dynamic object. If the size threshold is satisfied, the node computing system can provide frames depicting the dynamic object as input to a classification model, such as the classification model described in Section D. The classification model can generate an output that identifies a classification of the dynamic object. Some examples of classifications can include "airplane," "helicopter," or "drone," among others. In some implementations, a final classification for the dynamic object can be determined based on an agreement between the node computing system and the other node computing systems 1805A-1505N, as described in Sections D and E. The classification of the dynamic object can be used by the node computing system to estimate one or more dynamic object trajectories for the dynamic object.

To estimate a dynamic object trajectory, the node computing system can perform a lookup in a lookup table using the classification of the dynamic object to identify one or more movement rules. In some implementations, default movement rules for detected dynamic objects can be used. The movement rules for a dynamic object can indicate one or more predicted directions the dynamic object having a particular velocity can travel. For example, airplanes generally travel in a straight line, and do not make many tight turns. Airplanes also constantly move forward. In contrast, helicopters can perform more dynamic maneuvers than airplanes, and can hover in a constant position in mid-air. The node computing system can apply the previously determined velocity and position values to these movement rules to identify one or more dynamic object trajectories. In some implementations, the movement rules may indicate probability values for various maneuvers or movements that a dynamic object may perform at various velocity ranges.

Upon determining the predicted trajectories for the dynamic object, the node computing system can generate a flightpath score for each dynamic object detected in the frames. The flightpath score can be calculated as function of the total probability that the dynamic object will intersect with the protected volume. To calculate the overall probability of intersection, the node computing system can identify each of the predicted trajectories of the dynamic object that result in the dynamic object intersecting with the protected volume. The node computing system can then sum the probability values for each of the paths that result in the dynamic object intersecting with the protected volume. Generally, dynamic objects with a higher probability of intersection with the protected volume can be associated with a higher risk, and therefore be assigned a higher score.

Another factor in calculating the dynamic object flightpath score can be the amount of time until the dynamic object is predicted to intersect with the protected volume. For example, a dynamic object that is likely to intersect with the protected volume in a short amount of time can result in a higher dynamic object flightpath score than a dynamic object that is predicted to intersect with the protected volume in a large amount of time. The node computing system can also estimate an amount of time that a dynamic object is likely to be present in the protected volume as a factor in calculating the dynamic object flightpath score. The amount of time can be estimated by applying the predicted pathway for the dynamic object to the current speed of the dynamic object to estimate a time that the dynamic object will exit the predicted volume. The time that the dynamic object is expected to enter the protected volume can be subtracted from the estimated exit time to calculate the estimated time the dynamic object will intersect with the protected volume. The node computing system can iteratively calculate each of these factors, and the score for dynamic flightpath score for each detected dynamic object each time a new frame is captured by the capture device.

The node computing system can determine maneuver instructions for moveable entities in a protected volume (STEP 1910). Once the flightpaths scores for one or more dynamic objects have been generated, the node computing system can determine maneuver instructions for one or more moveable entities (e.g., aerial vehicles navigating within the protected volume, any other type of vehicle or computer-controlled vehicle, etc.) based on the flightpath score and a predicted trajectory of the dynamic object. In some implementations, the node computing system can generate the maneuver instructions if the flightpath score for one or more detected dynamic objects satisfies a threshold. For example, in some cases, a dynamic object may intersect with a small, or otherwise insignificant portion of the protected volume, or may intersect with the protected volume for a very short amount of time, thereby resulting in a low flightpath score. In such cases, the safe volumes of the moveable entities within the protected volume may be maintained without additional maneuvering, and the node computing system may not generate the maneuver instructions. In contrast, if a dynamic object poses a high risk to moveable entities within the protected volume (e.g., having a high flightpath score, etc.), the node computing system can generate the maneuver instructions to include instructions for the one or more moveable entities to change course and maintain safe volumes.

Generating the maneuver instructions can include comparing known flight paths of moveable entities within the protected volume (e.g., transmitted by the flight computing system in response to a request from the node computing system, provided as part of a flight plan accessed by the node computing system, provided by one or more operators of the moveable entities, etc.) to the predicted trajectory of one or more detected dynamic objects. If the predicted trajectories for the one or more dynamic objects are within a predetermined distance of the known or expected pathways of the one or more moveable entities, the node computing system can generate the maneuver instructions to include instructions for the one or more moveable entities to alter their current trajectory to avoid the predicted trajectory of the one or more dynamic objects by a predetermined distance (e.g., a safe volume amount). In some implementations, the changes in trajectory for the moveable entities can be determined using a deep reinforcement learning model. The deep reinforcement learning model can be trained, for example, on training data including simulated occurrences of dynamic object intersection and moveable entity positions to maintain safe volumes (e.g., Well Clear or avoiding NMAC) around each simulated moveable entity.

The input of the deep reinforcement learning model can be, for example, the predicted trajectory of each detected dynamic object, and the known location and trajectories of the one or more moveable entities in the protected volume. The output of the deep reinforcement learning model can be movement instructions for each of the one or more moveable entities in the protected volume. For example, using the reinforcement learning model, the node computing system can select from pre-configured maneuvers, generate maneuvers, or generate step-by-step instructions as the maneuver instructions for the one or more moveable entities in the protected volume. As described herein, the maneuver instructions can be executed by the flight computing system, or carried out by a pilot operating the moveable entities, to cause the moveable entities to change course. The node computing system can account for pilot delay inherent in executing instructions manually when generating the maneuver instructions. In some implementations, an indication of whether each moveable entity is operated by a pilot or a flight computing system can be provided as input to the deep reinforcement learning model when generating the maneuver instructions. The node computing system can generate maneuver instructions for each of the moveable entities in the protected volume.

The node computing system can transmit the maneuver instructions to a flight computing system (e.g., the flight computing system 1860) (STEP 1912). The node computing system can transmit the maneuver instructions to the flight computing system associated with the respective movable entity for which the maneuver instructions were generated.

Because the maneuver instructions may require fast execution to maintain safe volumes, the node computing system can transmit the maneuver instructions via a network (e.g., the network 1810) as soon as they are generated. In some implementations, the node computing system can communicate one or more alerts to the flight computing system (or other external computing systems) indicating attributes of the detected dynamic objects that initiated generation of the maneuver instructions. For example, the alerts transmitted by the node computing system can include a classification of each detected dynamic object, the location of each dynamic object, the velocity of each dynamic object, and any timestamps corresponding to the detection and expected or actual intrusion times (e.g., of the protected volume) of each dynamic object. The alerts transmitted by the node computing system can be provided in order of priority. For example, alerts corresponding to dynamic objects having higher flightpath scores can be provided before alerts for dynamic objects having lower flightpath scores.

H. Computing Environment

FIGS. 20A and 20B depict block diagrams of a computing device 2000. As shown in FIGS. 20A and 20B, each computing device 2000 includes a central processing unit 2021, and a main memory unit 2022. As shown in FIG. 20A, a computing device 2000 can include a storage device 2028, an installation device 2016, a network interface 2018, an I/O controller 2023, display devices 2024a-2024n, a keyboard 2026 and a pointing device 2027, e.g., a mouse. The storage device 2028 can include, without limitation, an operating system, software, and software of a dynamic object tracking platform 2020, which can be implemented by the node computing systems as described herein. As shown in FIG. 20B, each computing device 2000 can also include additional optional elements, e.g., a memory port 2032, a bridge 2070, one or more input/output devices 2030a-2030n (generally referred to using reference numeral 2030), and a cache memory 2040 in communication with the central processing unit 2021.

The central processing unit 2021 is any logic circuitry that responds to and processes instructions fetched from the main memory unit 2022. In many embodiments, the central processing unit 2021 is provided by a microprocessor unit, e.g., those manufactured by Intel Corporation of Mountain View, California; those manufactured by Motorola Corporation of Schaumburg, Illinois; the ARM processor (from, e.g., ARM Holdings and manufactured by ST, TI, ATMEL, etc.) and TEGRA system on a chip (SoC) manufactured by Nvidia of Santa Clara, California; stand-alone ARM processors; the POWER7 processor, those manufactured by International Business Machines of White Plains, New York; or those manufactured by Advanced Micro Devices of Sunnyvale, California; or field programmable gate arrays ("FPGAs") from Altera in San Jose, CA, Intel Corporation, Xilinx in San Jose, CA, or MicroSemi in Aliso Viejo, CA, etc. The computing device 2000 can be based on any of these processors, or any other processor capable of operating as described herein. The central processing unit 2021 can utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5, and INTEL CORE i7.

Main memory unit 2022 can include one or more memory chips capable of storing data and allowing any storage location to be directly accessed by the microprocessor 2021. Main memory unit 2022 can be volatile and faster than storage 2028 memory. Main memory units 2022 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 2022 or the storage 2028 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 2022 can be based on any of the above described memory chips, or any other available memory chips capable of operating as described herein. In the embodiment shown in FIG. 20A, the processor 2021 communicates with main memory 2022 via a system bus 2050 (described in more detail below). FIG. 20B depicts an embodiment of a computing device 2000 in which the processor communicates directly with main memory 2022 via a memory port 2032. For example, in FIG. 20B the main memory 2022 can be DRDRAM.

FIG. 20B depicts an embodiment in which the main processor 2021 communicates directly with cache memory 2040 via a secondary bus, sometimes referred to as a backside bus. In other embodiments, the main processor 2021 communicates with cache memory 2040 using the system bus 2050. Cache memory 2040 typically has a faster response time than main memory 2022 and is typically provided by SRAM, BSRAM, or EDRAM. In the embodiment shown in FIG. 20B, the processor 2021 communicates with various I/O devices 2030 via a local system bus 2050. Various buses can be used to connect the central processing unit 2021 to any of the I/O devices 2030, including a PCI bus, a PCI-X bus, or a PCI-Express bus, or a NuBus. For embodiments in which the I/O device is a video display 2024, the processor 2021 can use an Advanced Graphics Port (AGP) to communicate with the display 2024 or the I/O controller 2023 for the display 2024. FIG. 20B depicts an embodiment of a computer 2000 in which the main processor 2021 communicates directly with I/O device 2030b or other processors 2021 via HYPERTRANSPORT, RAPIDIO, or INFINIBAND communications technology. FIG. 20B also depicts an embodiment in which local busses and direct communication are mixed: the processor 2021 communicates with I/O device 2030a using a local interconnect bus while communicating with I/O device 2030b directly.

A wide variety of I/O devices 2030a-2030n can be present in the computing device 2000. Input devices can include keyboards, mice, trackpads, trackballs, touchpads, touch mice, multi-touch touchpads and touch mice, microphones (analog or MEMS), multi-array microphones, drawing tablets, cameras, single-lens reflex camera (SLR), digital SLR (DSLR), CMOS sensors, CCDs, accelerometers, inertial measurement units, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 2030a-2030n can include a combination of multiple input or output devices, including, e.g., Microsoft KINECT, Nintendo Wiimote for the WII, Nintendo WII U GAMEPAD, or Apple IPHONE. Some devices 2030a-2030n allow gesture recognition inputs through combining some of the inputs and outputs. Some devices 2030a-2030n provides for facial recognition which can be utilized as an input for different purposes including authentication and other commands. Some devices 2030a-2030n provides for voice recognition and inputs, including, e.g., Microsoft KINECT, SIRI for IPHONE by Apple, Google Now or Google Voice Search.

Additional devices 2030a-2030n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 2030a-2030n, display devices 2024a-2024n or group of devices can be augmented reality devices. The I/O devices can be controlled by an I/O controller 2023 as shown in FIG. 20A. The I/O controller 2023 can control one or more I/O devices, such as, e.g., a keyboard 126 and a pointing device 2027, e.g., a mouse or optical pen. Furthermore, an I/O device can also provide storage and/or an installation medium 206 for the computing device 2000. In still other embodiments, the computing device 2000 can provide USB connections (not shown) to receive handheld USB storage devices. In further embodiments, an I/O device 2030 can be a bridge between the system bus 2050 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 2024a-2024n can be connected to I/O controller 2023. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g., stereoscopy, polarization filters, active shutters, or autostereoscopy. Display devices 2024a-2024n can also be a head-mounted display (HMD). In some embodiments, display devices 2024a-2024n or the corresponding I/O controllers 2023 can be controlled through or have hardware support for OPENGL or DIRECTX API or other graphics libraries.

In some embodiments, the computing device 2000 can include or connect to multiple display devices 2024a-2024n, which each can be of the same or different type and/or form. As such, any of the I/O devices 2030a-2030n and/or the I/O controller 2023 can include any type and/or form of suitable hardware, software, or combination of hardware and software to support, enable or provide for the connection and use of multiple display devices 2024a-2024n by the computing device 2000. For example, the computing device 2000 can include any type and/or form of video adapter, video card, driver, and/or library to interface, communicate, connect or otherwise use the display devices 2024a-2024n. In one embodiment, a video adapter can include multiple connectors to interface to multiple display devices 2024a-2024n. In other embodiments, the computing device 2000 can include multiple video adapters, with each video adapter connected to one or more of the display devices 2024a-2024n. In some embodiments, any portion of the operating system of the computing device 2000 can be configured for using multiple displays 2024a-2024n. In other embodiments, one or more of the display devices 2024a-2024n can be provided by one or more other computing devices 2000a or 2000b connected to the computing device 2000, via a network (e.g., any of the networks 110, 610, 910, 1110, 1310, 1510, or 1810 described herein). In some embodiments software can be designed and constructed to use another computer's display device as a second display device 2024a for the computing device 2000. For example, in one embodiment, an Apple iPad can connect to a computing device 2000 and use the display of the device 2000 as an additional display screen that can be used as an extended desktop. One ordinarily skilled in the art will recognize and appreciate the various ways and embodiments that a computing device 2000 can be configured to have multiple display devices 2024a-2024n.

Referring again to FIG. 20A, the computing device 2000 can comprise a storage device 2028 (e.g., one or more hard disk drives or redundant arrays of independent disks) for storing an operating system or other related software, and for storing application software programs such as any program related to the software for the dynamic object tracking platform 2020, which can implementation any of the functionality of the node computing systems described herein. Examples of storage device 2028 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 2028 can be non-volatile, mutable, or read-only. Some storage device 2028 can be internal and connect to the computing device 2000 via a bus 2050. Some storage device 2028 can be external and connect to the computing device 2000 via an I/O device 2030 that provides an external bus. Some storage device 2028 can connect to the computing device 2000 via the network interface 2018 over a network, including, e.g., the Remote Disk for MACBOOK AIR by APPLE. Some computing devices 2000 may not require a non-volatile storage device 2028 and can be thin clients or zero clients. Some storage device 2028 can also be used as an installation device 2016, and can be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Computing device 2000 can also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc.

Furthermore, the computing device 2000 can include a network interface 2018 to interface to a network (e.g., any of the networks described herein) through a variety of connections including, but not limited to, standard telephone lines LAN or WAN links (e.g., 802.20, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.20a/b/g/n/ac CDMA, GSM, WiMax and direct asynchronous connections). In one embodiment, the computing device 2000 communicates with other computing devices 2000 via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Florida. The network interface 2018 can comprise a built-in network adapter, network interface card, PCMCIA network card, EXPRESSCARD network card, card bus network adapter, wireless network adapter, USB network adapter, modem or any other device suitable for interfacing the computing device 2000 to any type of network capable of communication and performing the operations described herein.

A computing device 2000 of the sort depicted in FIG. 20A can operate under the control of an operating system, which controls scheduling of tasks and access to system resources. The computing device 2000 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 20000, WINDOWS Server 2012, WINDOWS CE, WINDOWS Phone, WINDOWS XP, WINDOWS VISTA, and WINDOWS 20, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, can be used on zero clients or thin clients, including, e.g., CHROMEBOOKS.

The computer system 2000 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 2000 has sufficient processor power and memory capacity to perform the operations described herein. In some embodiments, the computing device 2000 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 2000 is a gaming system. For example, the computer system 2000 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, or an XBOX 360 device manufactured by the Microsoft Corporation of Redmond, Washington, or an OCULUS RIFT or OCULUS VR device manufactured by OCULUS VR, LLC of Menlo Park, California.

In some embodiments, the computing device 2000 is a digital audio player such as the Apple IPOD, IPOD Touch, and IPOD NANO lines of devices, manufactured by Apple Computer of Cupertino, California. Some digital audio players can have other functionality, including, e.g., a gaming system or any functionality made available by an application from a digital application distribution platform. For example, the IPOD Touch can access the Apple App Store. In some embodiments, the computing device 2000 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 2000 is a tablet e.g., the IPAD line of devices by Apple; GALAXY TAB family of devices by Samsung; or KINDLE FIRE, by Amazon.com, Inc. of Seattle, Washington. In other embodiments, the computing device 2000 is an eBook reader, e.g., the KINDLE family of devices by Amazon.com, or NOOK family of devices by Barnes & Noble, Inc. of New York City, New York.

In some embodiments, the communications device 2000 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 2000 is a laptop or desktop computer equipped with a web browser and a microphone and speaker system, e.g., a telephony headset. In these embodiments, the communications devices 2000 are web-enabled and can receive and initiate phone calls. In some embodiments, a laptop or desktop computer is also equipped with a webcam or other video capture device that enables video chat and video call.

In some embodiments, the status of one or more machines 2000 in the network are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Having now described some illustrative implementations and implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided can be useful for generating test cases for a simulator based on simulator failure events, the systems and methods described herein can be applied to other environments. The foregoing implementations are illustrative rather than limiting of the described systems and methods. The scope of the systems and methods described herein can thus be indicated by the appended claims, rather than the foregoing description, and changes that come within the meaning and range of equivalency of the claims are embraced therein.

What is claimed is:

1. A method for detecting dynamic objects using a mesh network of nodes coupled to cameras, comprising:
    receiving, by one or more processors coupled to memory, a first sequence of frames captured by a first capture device having a first pose and a second sequence of frames captured by a second capture device having a second pose;
    tracking, by the one or more processors, a first indication of an object across the first sequence of frames over time, and a second indication of the object across the second sequence of frames over time;
    mapping, by the one or more processors, the first indication and the second indication to one or more three-dimensional (3D) points in a 3D coordinate space based on (i) a co-registration between the first indication in the first sequence of frames and the second indication in the second sequence of frames, and (ii) the first pose and the second pose;
    determining, by the one or more processors, a 3D displacement of a 3D position of the object based on the first sequence of frames and the second sequence of frames; and
    generating, by the one or more processors, based on the 3D displacement satisfying a displacement threshold, a 3D volume surrounding the 3D position based on a first bounding box surrounding the object in a first frame in the first sequence of frames, and a second bounding box surrounding the object in a corresponding second frame in the second sequence of frames, the first bounding box and the second bounding box corresponding to respective faces of the 3D volume.

2. The method of claim 1, wherein tracking the first indication and the second indication comprises providing the first sequence and the second sequence as input to a machine learning model, the machine learning model trained to generate the first indication and the second indication to each represent at least a portion of the object.

3. The method of claim 2, wherein the machine learning model is trained using training data comprising image data of objects and labels assigned to the objects of the image data, the image data representing objects in a plurality of poses.

4. The method of claim 2, wherein at least one corresponding characteristic of the first indication and the second indication comprises a parameter associated with at least one layer of the machine learning model, the at least one layer comprising an input layer, an output layer, and a plurality of hidden layers between the input layer and the output layer.

5. The method of claim 1, further comprising detecting, by the one or more processors using the first sequence and the second sequence, that the object is a dynamic object.

6. The method of claim 5, further comprising assigning, by the one or more processors, a particular object class of a plurality of object classes to the dynamic object based on the first sequence of frames and the second sequence of frames.

7. The method of claim 5, further comprising determining, by the one or more processors, a predicted trajectory for the dynamic object.

8. The method of claim 1, further comprising:
determining, by the one or more processors, a classification of the object and a movement profile for the object based on the first sequence of frames; and
storing, by the one or more processors, the classification and the movement profile in a dynamic object registry in association with an identifier of the object.

9. The method of claim 8, further comprising:
receiving, by the one or more processors from a remote capture device remote from the first capture device, a second classification of a second object and a second movement profile of the second object; and
updating, by the one or more processors, the second movement profile of the second object in the dynamic object registry based on a third sequence of frames captured by the first capture device.

10. A system, comprising:
one or more processors; and
one or more memory devices storing instructions thereon that, when executed by the one or more processors, cause the one or more processors to:
receive a first sequence of frames captured by a first capture device having a first pose and a second sequence of frames captured by a second capture device having a second pose;
track a first indication of an object across the first sequence of frames over time, and a second indication of the object across the second sequence of frames overtime;
map the first indication and the second indication to one or more three-dimensional (3D) points in a 3D coordinate space based on (i) a co-registration between the first indication in the first sequence of frames and the second indication in the second sequence of frames, and (ii) the first pose and the second pose;
determine a 3D displacement of a 3D position of the object based on the first sequence of frames and the second sequence of frames; and
generate, responsive to the 3D displacement satisfying a displacement threshold, a 3D volume surrounding the 3D position based on a first bounding box surrounding the object in a first frame in the first sequence of frames and a second bounding box surrounding the object in a corresponding second frame in the second sequence of frames, the first bounding box and the second bounding box corresponding to respective faces of the 3D volume.

11. The system of claim 10, wherein the one or more processors are to:
track the first indication and the second indication by providing the first sequence and the second sequence as input to a machine learning model, the machine learning model trained to generate the first indication and the second indication to each represent at least a portion of the object.

12. The system of claim 10, wherein the one or more processors are to:
detect, using the first sequence and the second sequence, that the object is a dynamic object.

13. The system of claim 12, wherein the one or more processors are to:
assign a particular object class of a plurality of object classes to the dynamic object based on the first sequence of frames and the second sequence of frames.

14. A method for detecting dynamic objects using a mesh network of nodes coupled to cameras, comprising:
receiving, by one or more processors coupled to memory, a first sequence of frames captured by a first capture device having a first pose and a second sequence of frames captured by a second capture device having a second pose;
tracking, by the one or more processors, a first plurality of points of interest across the first sequence of frames over time, and a second plurality of points of interest across the second sequence of frames over time;
mapping, by the one or more processors, the first plurality of points of interest and the second plurality of points of interest to a plurality of three-dimensional (3D) points in a 3D coordinate space based on (i) a co-registration between the first plurality of points of interest and the second plurality of points of interest, and (ii) the first pose and the second pose;
determining, by the one or more processors, a 3D displacement of a subset of the plurality of 3D points based on the first sequence of frames and the second sequence of frames; and
generating, by the one or more processors, responsive to the 3D displacement satisfying a displacement threshold, a 3D volume surrounding the subset of the plurality of 3D points based on a first bounding box for the subset of the plurality of 3D points in a first frame in the first sequence of frames and a second bounding box for the subset of the plurality of 3D points in a corresponding second frame in the second sequence of frames, the first bounding box and the second bounding box corresponding to respective faces of the 3D volume.

15. The method of claim 14, wherein generating the 3D volume further comprises:
detecting, by the one or more processors, the first bounding box for the subset of the plurality of 3D points as represented in the first frame; and
detecting, by the one or more processors, the second bounding box for the subset of the plurality of 3D points as represented in the corresponding second frame.

16. The method of claim 14, wherein tracking the first plurality of points of interest across the first sequence of frames and the second plurality of points of interest across the second sequence of frames is further based on a first mask applied to the first sequence of frames and a second mask applied to the second sequence of frames.

17. The method of claim 14, further comprising determining, by the one or more processors, that the subset of the plurality of 3D points corresponds to a dynamic object.

18. The method of claim 17, wherein generating the 3D volume surrounding the subset of the plurality of 3D points is responsive to determining that the subset of the plurality of 3D points corresponds to the dynamic object.

19. The method of claim 18, further comprising determining, by the one or more processors, a predicted trajectory for the dynamic object.

20. The method of claim 17, further comprising classifying, by the one or more processors, the dynamic object corresponding to the subset of the plurality of 3D points based on the first sequence of frames and the second sequence of frames.

* * * * *